(12) United States Patent
Green

(10) Patent No.: US 12,087,178 B2
(45) Date of Patent: Sep. 10, 2024

(54) SYSTEMS, APPARATUSES, AND METHODS FOR PRESENTING AN ANATOMICAL SIMULANT

(71) Applicant: Abbott Cardiovascular Systems, Inc., Santa Clara, CA (US)

(72) Inventor: Michael L. Green, Pleasanton, CA (US)

(73) Assignee: Abbott Cardiovascular Systems, Inc., Santa Clara, CA (US)

(*) Notice: Subject to any disclaimer, the term of this patent is extended or adjusted under 35 U.S.C. 154(b) by 722 days.

(21) Appl. No.: 17/173,821

(22) Filed: Feb. 11, 2021

(65) Prior Publication Data
US 2021/0248923 A1    Aug. 12, 2021

Related U.S. Application Data

(60) Provisional application No. 62/975,373, filed on Feb. 12, 2020.

(51) Int. Cl.
*G09B 23/28* (2006.01)

(52) U.S. Cl.
CPC ......... *G09B 23/285* (2013.01); *G09B 23/286* (2013.01)

(58) Field of Classification Search
CPC ............................ G09B 23/285; G09B 23/286
USPC ......................................................... 434/268
See application file for complete search history.

(56) References Cited

U.S. PATENT DOCUMENTS

| | | | | |
|---|---|---|---|---|
| 2,871,579 A * | 2/1959 | Nuranen | ................ | G09B 23/28 417/326 |
| 5,230,630 A * | 7/1993 | Burgett | ................ | G09B 23/28 434/262 |
| 5,620,326 A * | 4/1997 | Younker | ................ | G09B 23/28 434/272 |
| 6,488,507 B1 * | 12/2002 | Stoloff | ................ | G09B 23/28 434/272 |
| 6,517,354 B1 * | 2/2003 | Levy | ................ | G09B 23/28 434/262 |
| 9,301,747 B2 | 4/2016 | Zung et al. | | |
| 10,217,380 B2 * | 2/2019 | Parry | ................ | G09B 9/003 |
| 10,398,418 B2 | 9/2019 | Palermo et al. | | |
| 2005/0008997 A1 * | 1/2005 | Herman | ............... | G09B 23/285 434/262 |

(Continued)

OTHER PUBLICATIONS

Depstech Endoscope Screenshot Dec. 27, 2017, Obtained from Wayback Machine—Internet Archive https://web.archive.org/web/20171227154822/http:/www.depstech.com:80/portfolio-category/endoscope/, on Mar. 17, 2023, 1 page.

(Continued)

*Primary Examiner* — Jay Trent Liddle
*Assistant Examiner* — Alyssa N Brandley
(74) *Attorney, Agent, or Firm* — Workman Nydegger; Randy Shen

(57) ABSTRACT

A system and method for simulating an anatomical access site includes a model assembly selectively disposed within a carrying structure, the model assembly configured to present an anatomical simulant. The model assembly includes a liquid storage container configured to selectively hold a liquid, a pump configured to move the liquid at least around the anatomical simulant, and a model support assembly configured to support the anatomical simulant.

20 Claims, 43 Drawing Sheets

(56) References Cited

U.S. PATENT DOCUMENTS

| | | | | |
|---|---|---|---|---|
| 2007/0238081 | A1* | 10/2007 | Koh | G09B 23/285 434/262 |
| 2013/0196301 | A1* | 8/2013 | Carson | G09B 23/281 434/268 |
| 2014/0272872 | A1* | 9/2014 | Vozenilek | G09B 23/28 434/268 |
| 2017/0051736 | A1* | 2/2017 | Okayama | F04B 49/22 |
| 2017/0103682 | A1* | 4/2017 | Okayama | G06T 7/0012 |
| 2018/0263655 | A1* | 9/2018 | Fjelland | A61B 17/3403 |
| 2019/0139452 | A1* | 5/2019 | Hall-Jackson | G09B 23/34 |

OTHER PUBLICATIONS

Nanuk 910 Case Screenshot Nov. 4, 2016, Obtained from Wayback Machine—Internet Archive https://web.archive.org/web/20161104061910/https://www.plasticase.com/shop/medium/nanuk-910/, on Mar. 17, 2023, 2 pages.

Makita DC18RC 18V LXT Lithium-Ion Rapid Optimum Charger Screenshot Jun. 29, 2019, Obtained from Wayback Machine—Internet Archive https://web.archive.org/web/20190629052124/http://www.makitatools.com/products/details/DC18RC, on Mar. 17, 2023, 2 pages.

Makita BL1820B 18V LXT Lithium-Ion Compact 2.0Ah Battery Screenshot Jun. 29, 2019, Obtained from Wayback Machine—Internet Archive https://web.archive.org/web/20190629052124/http://www.makitatools.com/products/details/BL1820B on Mar. 17, 2023, 2 pages.

Abbott Perclose Proglide Vascular Closure Screenshot Aug. 4, 2018, Obtained from Wayback Machine—Internet Archive https://web.archive.org/web/20180804153710/https://vascular.abbott.com/perclose-proglide-vascular-closure?utm_source=veith&utm_medium=vanityurl&utm_campaign=vessel-closure-us-hcp-veith-2017&utm_term=&utm_content=abbott-vessel-closure-com on Mar. 17, 2023, 3 pages.

Abbott Perclose Proglide Suture-Medicated Closure System Sep. 5, 2019. Obtained from Wayback Machine—Internet Archive https://web.archive.org/web/20190905121254/https://www.cardiovascular.abbott/us/en/hcp/products/peripheral-intervention/perclose-proglide-suture-mediated-closure-system.html on Mar. 17, 2023, 3 pages.

Abbott Starclose SE Vascular Closure System Screenshot Sep. 5, 2019, Obtained from Wayback Machine—Internet Archivehttps://web.archive.org/web/20190905123424/https://www.cardiovascular.abbott/us/en/hcp/products/peripheral-intervention/starclose-se-vascular-closure-system.html on Mar. 17, 2023, 3 pages.

* cited by examiner

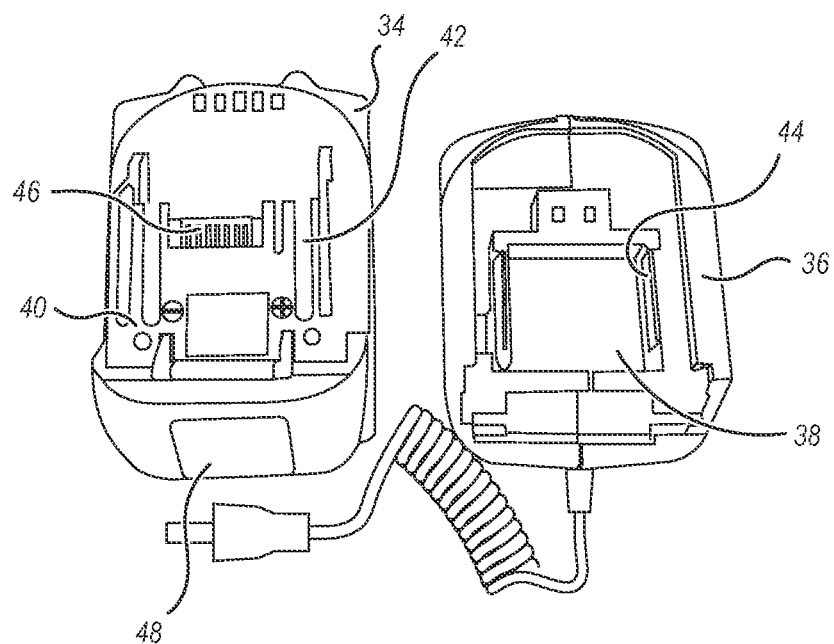
FIG. 7D
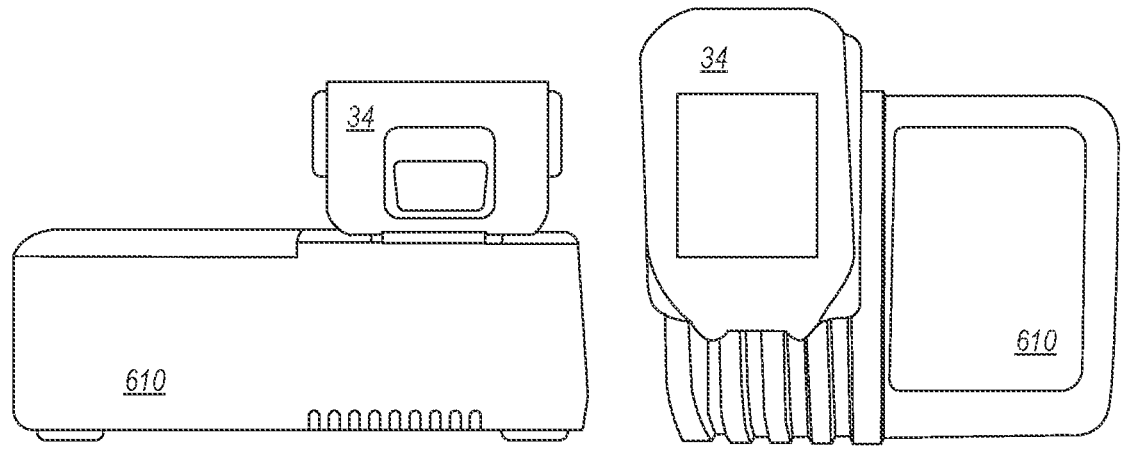
FIG. 7E  FIG. 7F

SYSTEMS, APPARATUSES, AND METHODS FOR PRESENTING AN ANATOMICAL SIMULANT

CROSS-REFERENCE TO RELATED APPLICATIONS

This application claims the priority benefit of Provisional Application No. 62/975,373 filed on Feb. 12, 2020, and titled "SYSTEM, APPARATUSES, AND METHODS FOR PRESENTING AND ANATOMICAL SIMULANT," the entire contents of which are incorporated herein by reference.

BACKGROUND OF THE INVENTION

1. The Field of the Invention

The present disclosure relates generally to systems, apparatuses and methods for simulating anatomical tissue, such as for teaching, demonstrating, or medical device testing systems, apparatuses, and methods.

2. The Relevant Technology

Catheter assemblies are widely used in the field of medicine in order to treat various physical ailments, including heart problems, circulatory system problems, coronary artery disease, plaque buildup, stenosis, and a wide variety of physical conditions that can be treated through the use of catheters and catheter procedures. Once a procedure is completed, it is necessary to close an access site into the patient's vasculature, such as an access site at the patient's femoral, brachial or radial artery. It is important that the medical staff involved in closing an access site have the skills necessary to close an access site efficiently and effectively and to prevent blood loss and associated complications.

Since it is the best practice to understand and become comfortable with the operation of those systems used to close an access site, it is useful to employ training or teaching aids and systems that will provide training to physicians, clinicians, and technicians prior to actual patient procedures in a hospital setting.

However, existing training, teaching, and testing systems are often cumbersome, heavy, expensive, and are difficult to assemble and use.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 7D illustrates a battery and a separate battery adapter, according to one embodiment of the invention.

FIGS. 7E-7F illustrate different views of an optional battery charger on which a battery is being charged, according to one embodiment of the invention.

DETAILED DESCRIPTION OF THE PREFERRED EMBODIMENTS

Figure 1:
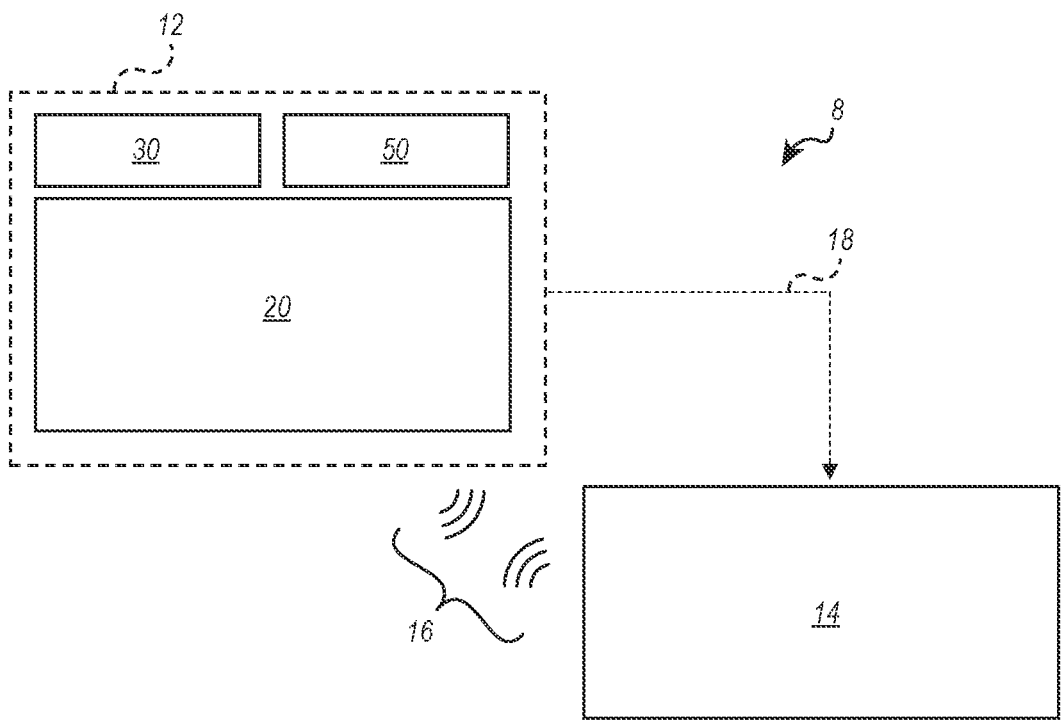
FIG. 1 illustrates schematically a system, according to one embodiment of the invention.

One or more specific embodiments of the present disclosure will be described below. In an effort to provide a concise description of these embodiments, some features of an actual embodiment may be described in the specification. It should be appreciated that in the development of any such actual embodiment, as in any engineering or design project, numerous embodiment-specific decisions will be made to achieve the developers' specific goals, such as compliance with system-related and business-related constraints, which may vary from one embodiment to another. It should further be appreciated that such a development effort might be complex and time consuming, but would nevertheless be a routine undertaking of design, fabrication, and manufacture for those of ordinary skill having the benefit of this disclosure.

One or more embodiments of the present disclosure may generally relate to a training or teaching apparatuses, systems, and methods to simulate closure of an access site following a procedure, such as a percutaneous coronary intervention (PCI) or other procedure performed through femoral, brachial or radial access sites. The training apparatuses, systems, and methods can be used to simulate an access site and allow its closure using a medical device, such as a closure system using one or more sutures, plugs, clips, glues, combinations thereof, or the like to close an access site. Illustrative medical devices or closure systems can include, but are not limited to, those devices sold under the trademarks STARCLOSE and PROGLIDE by Abbott Laboratories.

Additionally, the one or more embodiments of the present disclosure may generally relate to apparatuses, systems, and methods used to test medical devices, such as, but not limited to, those used to closure an access site following a procedure, such as a percutaneous coronary intervention (PCI) or other procedure performed through femoral, brachial or radial access sites. The apparatuses, systems, and methods can also be associated, more generally, with testing a medical device and/or teaching or training using a medical device as part of a procedure.

With the above in mind, the apparatuses and systems can provide a vascular model, such as a vessel closure model, that facilitates training of physicians, clinicians, etc. or other user in a simpler and more efficient manner. The apparatuses and systems provide a compact form factor to aid with easy transportation, while accommodating different medical devices, such as vessel closure devices, and different access site simulants. This provides an enhanced training environment and experience over existing training models and systems.

While the present disclosure will describe a particular implementation of apparatuses and systems, with associated methods, for training or teaching, it should be understood that any of systems, apparatuses, and methods described herein may be applicable to other uses, including and not limited to testing medical devices using any of the described systems, apparatuses, and methods. Additionally, elements described in relation to any embodiment depicted and/or described herein may be combinable with elements described in relation to any other embodiment depicted and/or described herein.

Figure 2:
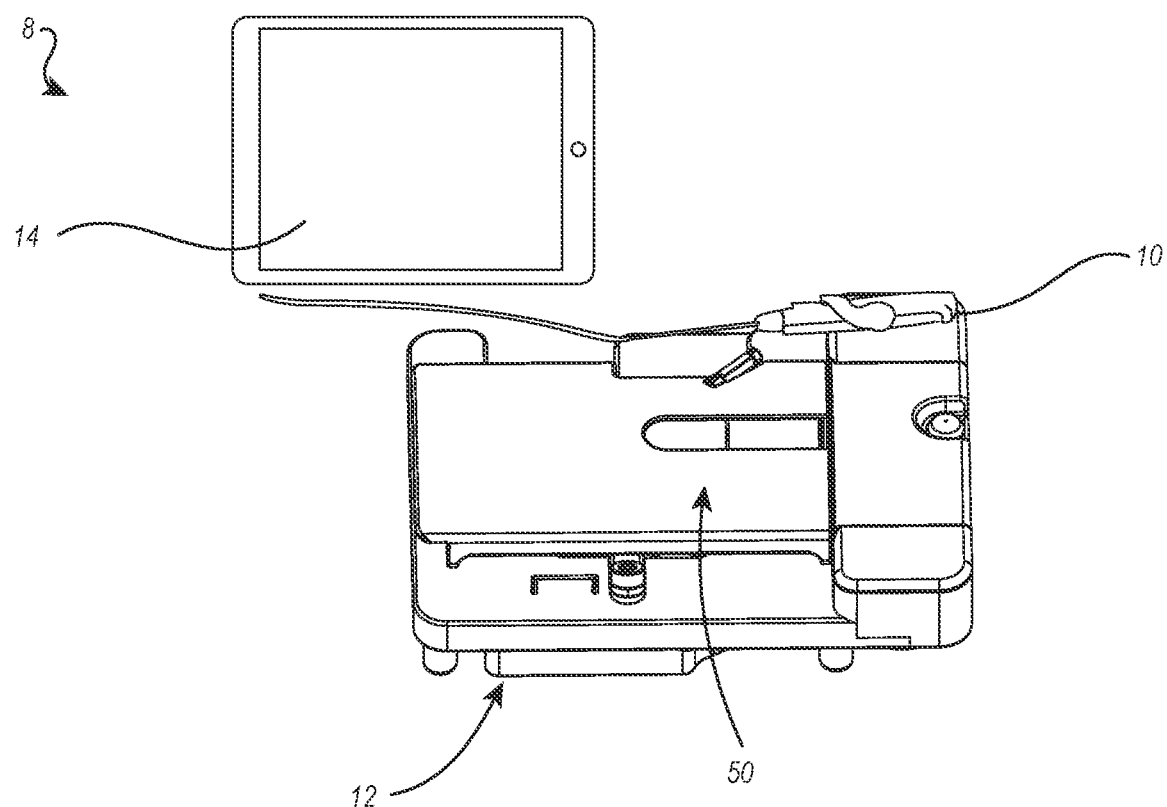
FIG. 2 illustrates another view of a system, according to one embodiment of the invention.

Turning to FIGS. 1 and 2 that, respectively, schematically illustrate and provide a photograph of a system 8, such as a training or medical device testing system, usable to train users simply and efficiently, such as physicians, clinicians, nurses, technicians, or others to use a medical device 10 during a medical procedure. As mentioned above, reference will be made to system 8, and associated "training" models, assemblies, etc. understanding that the system 8, and associated "training" models, assemblies, etc., can be used in a variety of other manners where an anatomical simulant is presented to a user, and different actions are taken with respect to the anatomical simulant. The use of the term "training" modifying the systems, models, assemblies, etc., is in no way limiting the usage of the systems, models, assemblies, etc., for other non-training uses and functions. For instance, and not by way of limitation, the system 8, and associated systems, models, assemblies, etc. can be used for anastomosis training, deploying medical devices, such as scaffolds, stents, filters, balloons, etc. or delivery therapeutic agents to a simulated body lumen or treatment location, manipulating or deploying medical devices during other simulated vascular surgical procedures, testing medical devices, or the like. Furthermore, while one medical device 10 is illustrated, such as a medical device sold under the trademark PROGLIDE by Abbott Laboratories, it will be understood that medical device 10 can be any of a variety of access site closure or non-access site closure device depending upon the particular configuration or setup of the system 8. For instance, the system 8 can accommodate a closure system using one or more sutures, plugs, clips, glues, gels, sealants, anchors, combinations or modifications thereof or the like.

As illustrated the system 8 includes a system assembly 12, such as a training system assembly or medical device testing system assembly, and an image viewing assembly or device 14. The image viewing assembly 14 can receive data, such as real-time streaming video, individual images, and combinations thereof from the system assembly 12 and present those to a user. Where the image viewing assembly 14 is a device operating using IOS or Android operating systems, the image viewing assembly 14 and the system assembly 12 can communicate through a wireless connection 16, such as through Wi-Fi, Bluetooth, Infrared, or other communication using electromagnetic waves to send the data from the system assembly 12 to the image viewing assembly 14. The image viewing assembly 14 can optionally include an installed application to aid with accessing and viewing the data from the system assembly 12. Alternatively, or in addition to the wireless communication, data communication can be provided through a hardwire connection, such as via cable 18, such as High-Definition Multimedia Interface (HMDI) cable, component video cable, digital visual interface (DVI) cable, Ethernet cable, or some other cable capable of delivery video images from the system assembly 12 to the image viewing device 14.

In either case, the system 8 is not limited to use with only devices operating with iOS and Android operating systems. For instance, devices using WINDOWS, macOS, LINUX, or other operating systems can also be used as part of the system 8. In other configurations, while the image viewing device 14 can be used to view the images or real-time streaming video, it will be understood that that system assembly 12 can alternatively communicate with other devices to view the images, such as projectors, flat-panel displays, etc. Additionally, the image viewing device 14 can be associated with an ultrasound system, fluoroscopy system, or some other system so the user has a training experience that more closely approximates use of the medical device 10 and technique for closing the access site, for example. In such situations, the wireless communication 16 or cable 14 transmits data to the displays associated with the ultrasound system, fluoroscopy system, or some other system.

Figure 3:
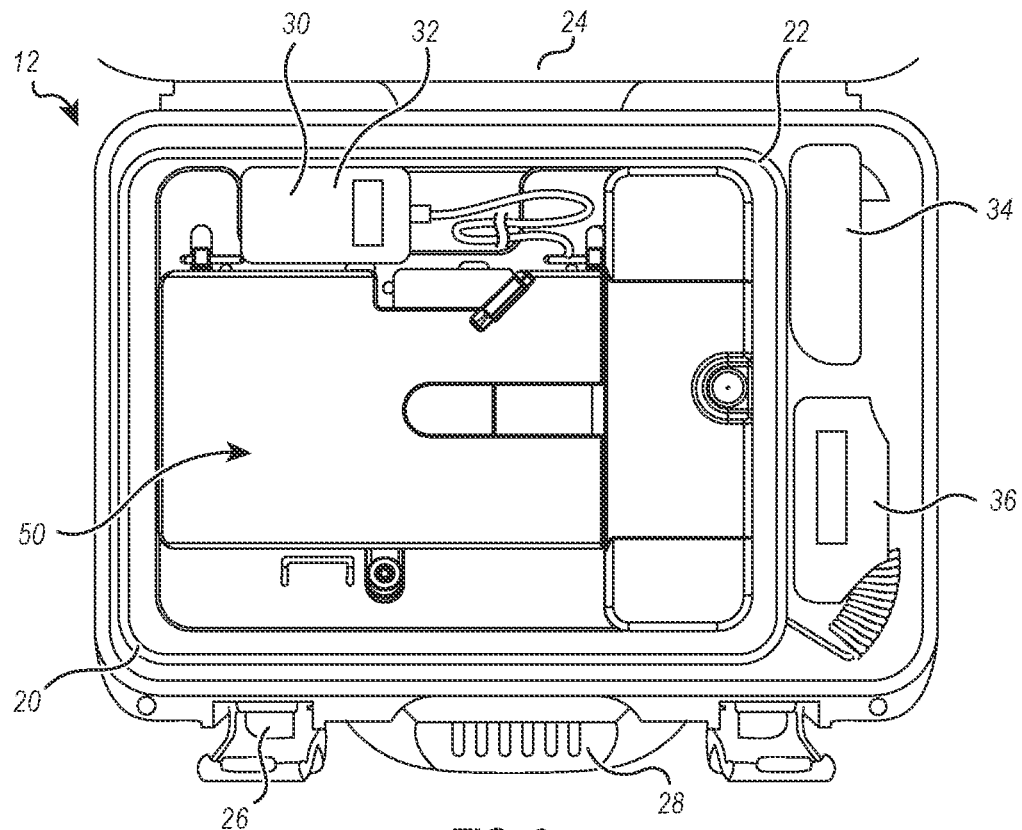
FIG. 3 illustrates a view of a case and a model assembly, according to one embodiment of the invention.

With continued reference to FIGS. 1-3, the system assembly 12 includes a case 20 within which is a power assembly 30 and a model assembly 50, such as a training model assembly or medical device testing model assembly. The power assembly 30 provides power to the components and elements of the model assembly 50, as will be discussed in more detail hereinafter. The power assembly 30 can include a power adapter 32 to connect the model assembly 50 to an electrical outlet or receptacle at the location where the system 8 is used or to a transportable power source, such as a battery 34 through a battery adapter 36. The power adapter 32 and/or the battery adapter 36 can optionally include hardware and/or software modules or components, such as a transformer, to control the voltage and current delivered to the model assembly 50. For instance, the power adapter 32 and/or the battery adapter 36 can include circuitry to provide stable voltage and direct current output to the model assembly 50, efficient power conversion, accommodate for alternating current and/or direct current input voltages and current, etc. For instance, in one embodiment, the power adapter 32 is an 18 volt, 0.5-2.0 Ah, AC to DC power adapter that can be used when the battery 34 is an 18 volt, 2 Ah battery. Alternatively, the battery 34 can be 12 volts to about 60 volts having different power capacities dependent upon how long the intended use of the model and the battery adapter 36 can accommodate those batteries. It will be understood, however, that the power adapters, battery adapters, and batteries can provide or accommodate various other voltages and currents while providing the desire power or electricity to the model assembly 50. Additionally, the system 8 can optionally include a battery charger that can be used to charge the battery 34.

Figure 7A:
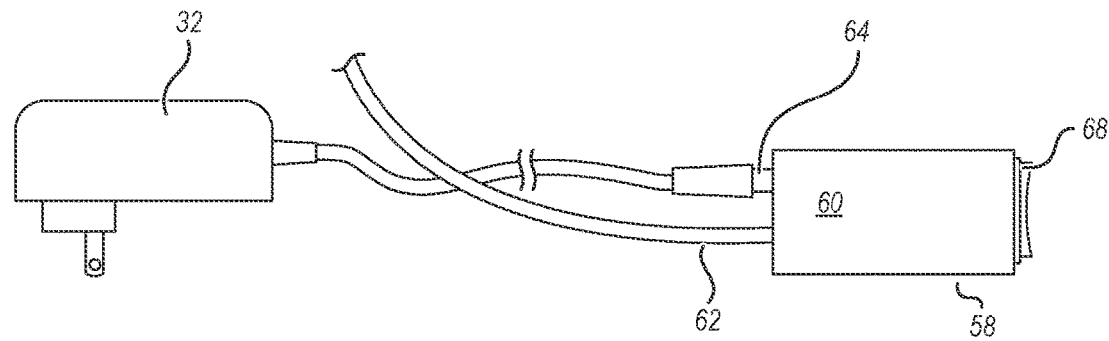
FIG. 7A illustrates a portion of a control assembly and a power assembly, according to one embodiment of the invention.
Figure 7B:
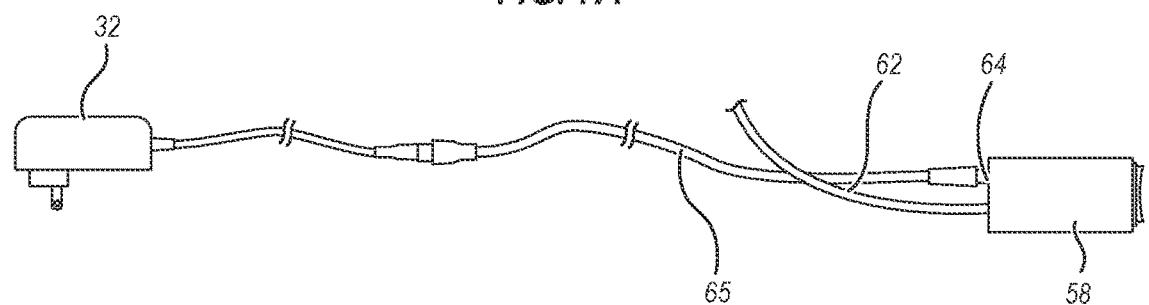
FIG. 7B illustrates a portion of a control assembly and a power assembly, with an extension cord, according to one embodiment of the invention.
Figure 7C:
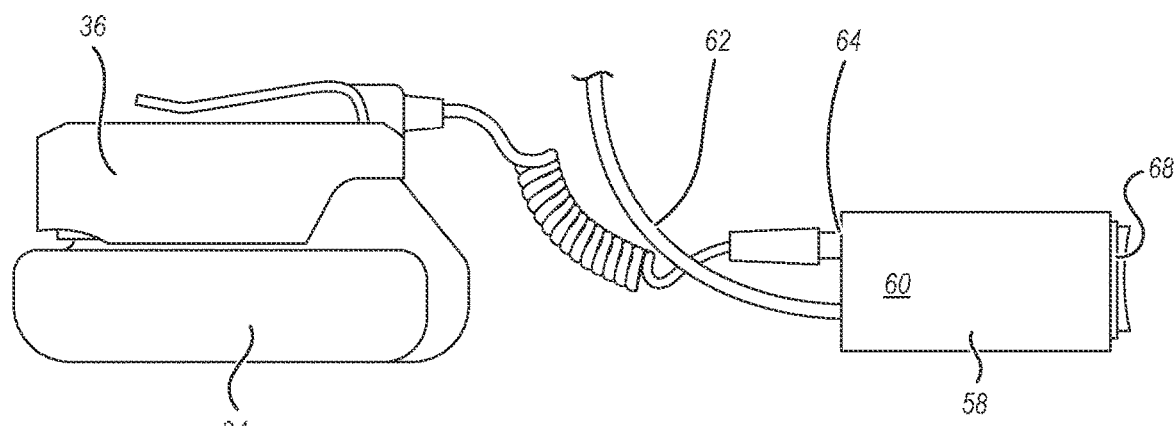
FIG. 7C illustrates a portion of a control assembly and a power assembly, with a battery and battery adapter connected to the control assembly, according to one embodiment of the invention.

The battery adapter 36, as illustrated in FIGS. 7C-7D, includes a battery receiving slot 38 that accommodates a battery protrusion 40. The battery protrusion 40 is locked within the battery receiving slot 38 to make electrical contact between battery contacts 42 and battery adapter contacts 44, such as through complementary locking structures 46, and can be released by activating, such as depressing, a battery release button 48. FIGS. 7E and 7F illustrate a top view and a side view of a battery charger 610 configured to receive and charge a battery 34.

Referring to FIGS. 3 and 54-57, the case 20 provides a secure container to transport components of the system 8. The case 20 has a cavity 22 holding the model assembly 50 and the power assembly 30. The case 20 also can include a lid 24 for closing the cavity 22, locks 26 to retain the lid 24 in place, and a handle 28 for carrying or transport. The case 20 can also optionally securely transport supplies or equipment to use the system 8. Alternatively, those supplies, and equipment can be contained in a separate container (e.g., a storage tray 602 illustrated in FIGS. 54-56) or bag, which can form part of the system 8. The supplies and equipment can include, but are not limited to, additional electrical cables other than those associated with the power assembly 30, collapsible stand, surgical cloths, drapes, and gowns, substitute or replacement anatomical simulants 404 (as will be discussed hereinafter), forceps, scissors, retractors, needle holders, needles, clamps, introducer sheaths 612, guidewires 614, syringes, cones 608, suction instruments, water or liquid guards 350, trays (e.g., storage tray 602, tray cover 604), drape 606, anti-slip mat, exam gloves, hemostats, tablecloth, absorbent wipes, dilators, funnel, splash shield, and other instruments, components or elements that a user might need to train using the training system.

Generally, the weight of the system assembly 12 and case 20, with associated supplies and equipment, can range from about 5 pounds to about 20 pounds, about 7 pounds to about 15 pounds, about 9 pounds to about 12 pounds, about 9 pounds to about 11 pounds, or about 10 pounds.

Even though case 20 can optionally store and transport the identified supplies and equipment, in addition to the model assembly 50 and the power assembly 30, the case 20 can have a small form factor so the case 20 can be portable and easily transportable and can have a weigh of about 5 pounds to about 10 pounds, but it will be understood that the case 20 can be heavier or lighter than this weight, such as having a weight about 2 pounds to about 5 pounds, about 5 pounds to about 8 pounds, or about 8 pounds to about 10 pounds. In one configuration, the case 20 can have a length of about 10 inches to about 18 inches, a height of about 3 inches to about 6 inches, and a width of about 7 inches to about 12 inches. One such case can be the NANUK 910 case from Plasticase Inc. It will be understood that the case 20 can have various other lengths, heights, and width, whether longer or shorter than this identified herein, depending upon the desired size and configuration of the components of the system 8.

Figure 4:
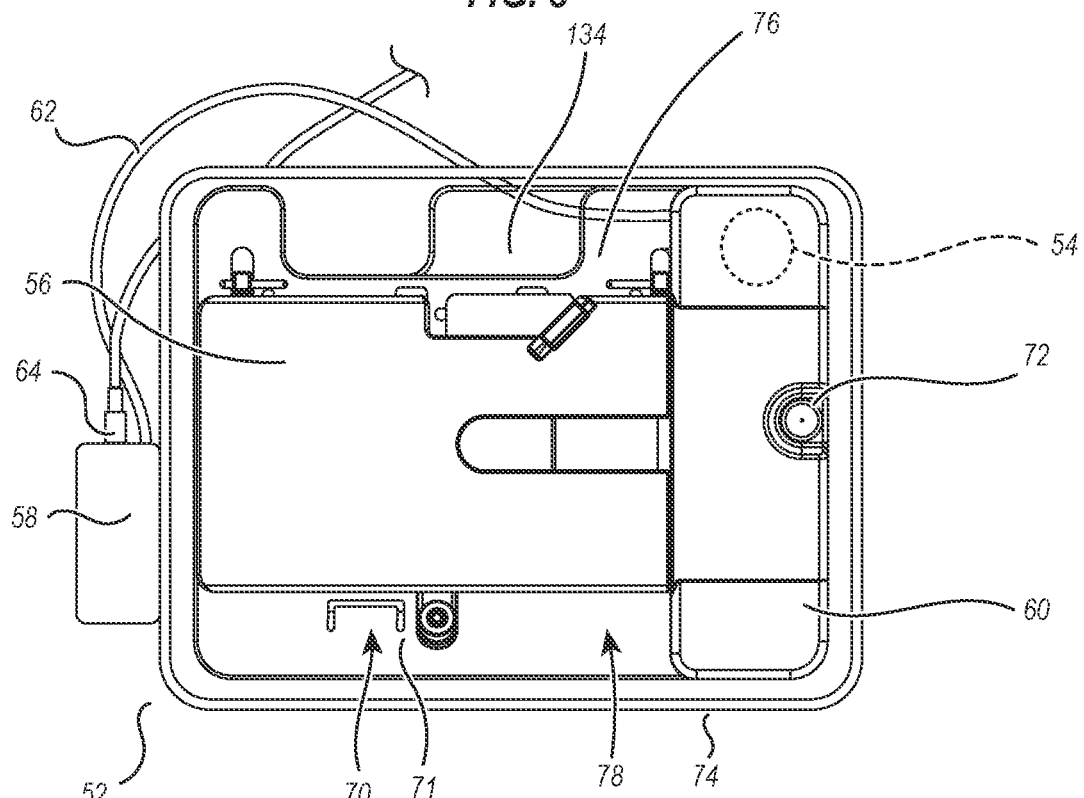
FIG. 4 illustrates the model assembly out of the case, according to one embodiment of the invention.

The model assembly 50, which is selectively removably stored in the case 20 can include, as illustrated in FIG. 4, a liquid storage container 52 that receives and holds liquid that is to flow through and around an anatomical simulant or model representing an access site to a vessel or other body lumen within a vasculature of a patient, a pump 54 to move the contained liquid through and around the anatomical simulant or model, a model support assembly 56 that supports the anatomical simulant or model, a controller 58 through which power is supplied to the model support assembly 56 and the pump 54 is controlled, and a control housing 60 within which certain electrical and mechanical components are located, as will be discussed in more detail hereinafter.

The liquid storage container 52 can accommodate various different types and quantities of liquids, such as water, saline, Glycerol, blood simulant, liquids containing a dye or radiative isotope for visualization using the image viewing devices, or other liquids, without adversely impacting a structural integrity of the liquid storage container 52. For instance, the liquid storage container 52 can hold about 20 oz to about 40 oz of liquid, about 12 oz to about 42 oz of liquid, about 16 oz to about 32 oz of liquid, about 16 oz to about 20 oz of liquid, or about 32 oz of liquid. To accommodate for different liquids, appropriate materials for the liquid storage container 52, such as a non-reactive metal, polymer, composite, or other materials, can be chosen. Additionally, selecting a thin-wall structure or a material having a lower density, and so lower mass or weight aids with reducing an overall weight of the system 8.

Figure 5:
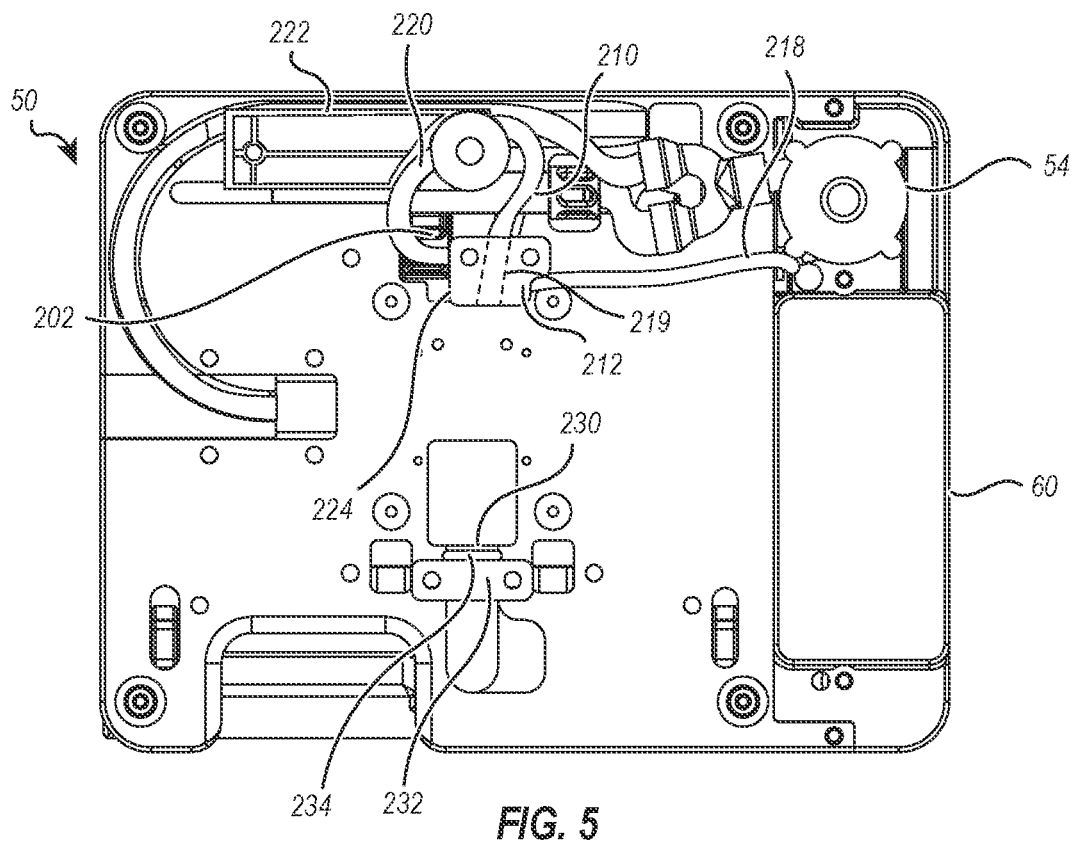
FIG. 5 illustrates a bottom view of a portion of the model assembly, according to one embodiment of the invention.

With reference to FIGS. 4 and 5, disposed within the liquid storage container 52, and at least partially supported by the control housing 60, is the pump 54 that moves the contained liquid through and around the anatomical simulant. The pump 54 can be a positive displacement pump, a centrifugal pump, or an axial-flow pump, and can be controlled, in one configuration, by the controller 58. Optionally, the pump 54 can purge the liquid in the liquid storage container 52 following use. One example of the pump 54 is a DC brushless motor circulation pump provided by Weil Bao Motor & Electric Appliance Co. Ltd that has a flow rate of about 4.8 Liters/minute and can pressurize or pump the liquid at about 0.4 psi to about 1.5 psi. It will be understood that flow rates and pressures associated with the pumped liquid can be larger or smaller than the identified flow rates and pressures based upon the particular flow path lengths, volume of liquid to move through the system assembly 12. For instance, the flow rate can range from about 1 liter/minute to about 10 liters/minute, about 2 liters/minute to about 8 liters/minute, about 3 liters/minute to about 6 liters/minute, greater than about 4 liters/minute, greater than about 5.5 liters/minute, less than about 6 liters/minute, or other flow rates. The pressure of the liquid can range from about 20 mmHg to about 150 mmHg, from about 20 mmHg to about 50 mmHg, from about 50 mmHg to about 80 mmHg, from about 80 mmHg to about 120 mmHg, greater than about 20 mmHg, less than about 150 mmHg, or other pressure ranges.

Figure 6:
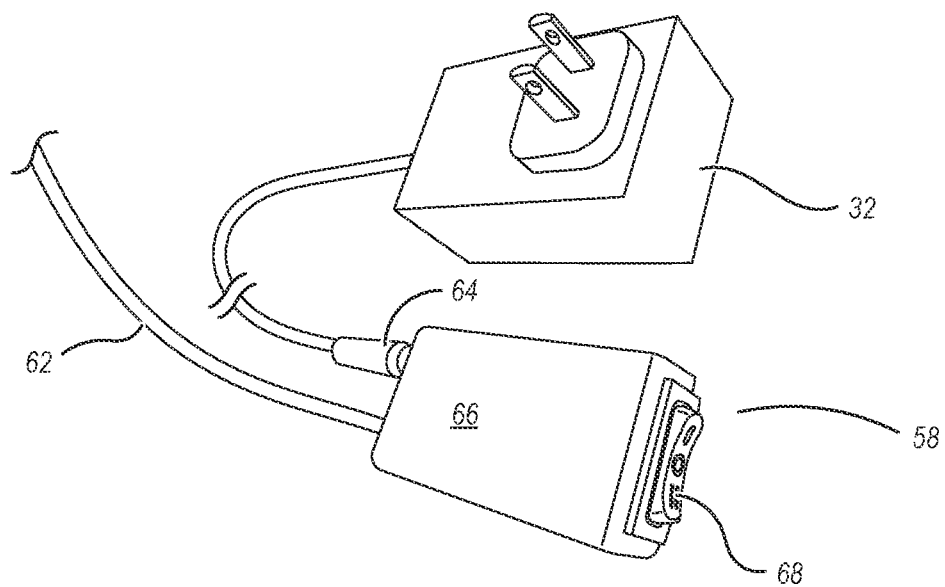
FIG. 6 illustrates a portion of a control assembly and a power assembly, according to one embodiment of the invention.

As mentioned above, the flow of liquid from the pump 54 is controlled by the controller 58 and the electrical communication between the pump 54 and the controller 58 via the control cable 62 that passes into the control housing 60, as illustrated in FIGS. 4-5. The controller 58 also provides power to the model support assembly 56 via the power adapter 32 and a connector 64, such as a water-tight electrical connector, on the controller 58, as illustrated in FIGS. 4, 6, and 7A-7B. One end of the power adapter 32 includes a connector complementary to the connector 64 of the controller 58, while the other end can be received by an electrical outlet or receptacle at the location where the system 8 is used. Alternatively, a complementary connector of the battery adapter 36 can cooperate with the connector 64 to allow for powering by the battery 34. In the configuration of FIG. 7B, an extension cable 65 can be used to increase a length of the cable associated with the power adapter 32. In such a case, the extension cable 65 and the power adapter cable has complementary connector ends, and can be received or cooperate with the connector 64.

The controller 58 in the illustrated configuration is adapted to be held by a user to operate the system 8, such as the model assembly 50. As illustrated in FIGS. 6 and 7, the controller 58 includes a controller case 66 with a switch 68 to allow user to adjust the flow rate. The switch 68 has three positions: off, steady state or pulse state. Using those different states, in addition to changing the position of a pressure controller 70 (FIG. 4) associated with the model support assembly 56, and discussed hereinafter, the switch 68 operates the pump 54 to delivery liquid to model support assembly 56 to simulate arterial (high pressure pulsatile) or venous (low pressure steady) flow. For instance, to create venous flow, an actuator arm 71 of the pressure controller 70 can be moved to the "V" position and the switch 68 moved to "Steady." To create the arterial flow, the actuator arm 71 of the pressure controller 70 can be moved to the "A" position and the switch 68 moved to "Pulse." It will be understood that any combination of the pressure controller 70 and the switch 68 can be used to achieve a desired flow, whether or not such flow simulates the arterial or venous flow. The high pressure arterial pulsed flow can have a pressure of about 50 mmHg to about 200 mmHg, about 50 mmHg to about 100 mmHg, about 100 mmHg to about 150 mmHg, or about 150 mmHg to about 200 mmHg. The low pressure steady or continuous venous flow can have a pressure of about 20 mmHg to about 50 mmHg, about 20 mmHg to about 30 mmHg, about 30 mmHg to about 40 mmHg, or about 40 mmHg to about 50 mm Hg. It will be understood that the system 8 can be adapted to create flow rates and fluid pressures higher or lower than those indicated depending upon the particular medical procedure which the user is to be trained on and/or the particular medical device associated with the training. Also, the flow rates and fluid pressures can be adjusted to vary the training environment and change the difficulty of the medical procedure based upon the simulated patient's underlying simulated health-such as simulating a patient with hypertension or some other condition.

Returning to FIGS. 3 and 4, the model support assembly 56 is depicted to a side of the control housing 60 within the liquid storage container 52 with a gap 72 between a lip or edge 74 of the liquid storage container 52. The control housing 60 extends along a short side of the liquid storage container 52 with the model support assembly 56 adjacent to a long side of the control housing 60, or more particularly, a long side of the control housing 60. Alternatively, the control housing 60 can extend in an elongate fashion along a long side of the liquid storage container 52 with the model support assembly 56 extending from the control housing 60 to a perimeter of the liquid storage container 52. Positioning model support assembly 56 to a side of the control housing 60 as illustrated in FIGS. 4, provides a power supply receiving region 76 and a control assembly receiving region 78 on opposite sides of a portion of the model support assembly 56 and the liquid storage container 52. This maintains compactness of the model assembly 50 through containing the majority of the structures associated with the model assembly 50 within the bounds of the liquid storage container 52. For instance, as illustrated in FIG. 3, only the battery 34 and the battery adapter 36 are outside of the liquid storage container 52, but within the case 20, as shown in FIG. 3.

While the model assembly 50 is discussed as including the model support assembly 56 and control housing 60 as separate structures. It will be understood that the control housing 60 can form part of the model support assembly 56 such that portions of each are connected through use of various permanent or non-permanent fasteners, such as threaded fasteners, general fasteners, or the like, integrally formed as a monolithic piece, joined through adhesives, chemical bonds, thermal bonds, combinations or modifications thereof, or the like.

With reference to FIGS. 4 and 8-10, the model support assembly 56 includes an upper cover 80 that is pivotally mounted to a lower support 82 at hinge position 84. A leg portion 86 of the upper cover 80 is disposed in and passes through an opening 88 in the lower support 82 with a pivot pin 90 passing through the leg portion 86. The upper cover 80 pivots about the pivot pin 90, with the upper cover 80 being retained against the lower support 82 through attraction between a cover magnet 92 and a fixation member 140. Optionally, and/or alternatively, the upper cover 80 can be biased to a closed position by a spring or other biasing member that limits pivoting movement of the upper cover 80 relative to the lower support 82, such as when a spring extends from an interior surface of the upper cover 80 to the lower support 82.

Figure 12:
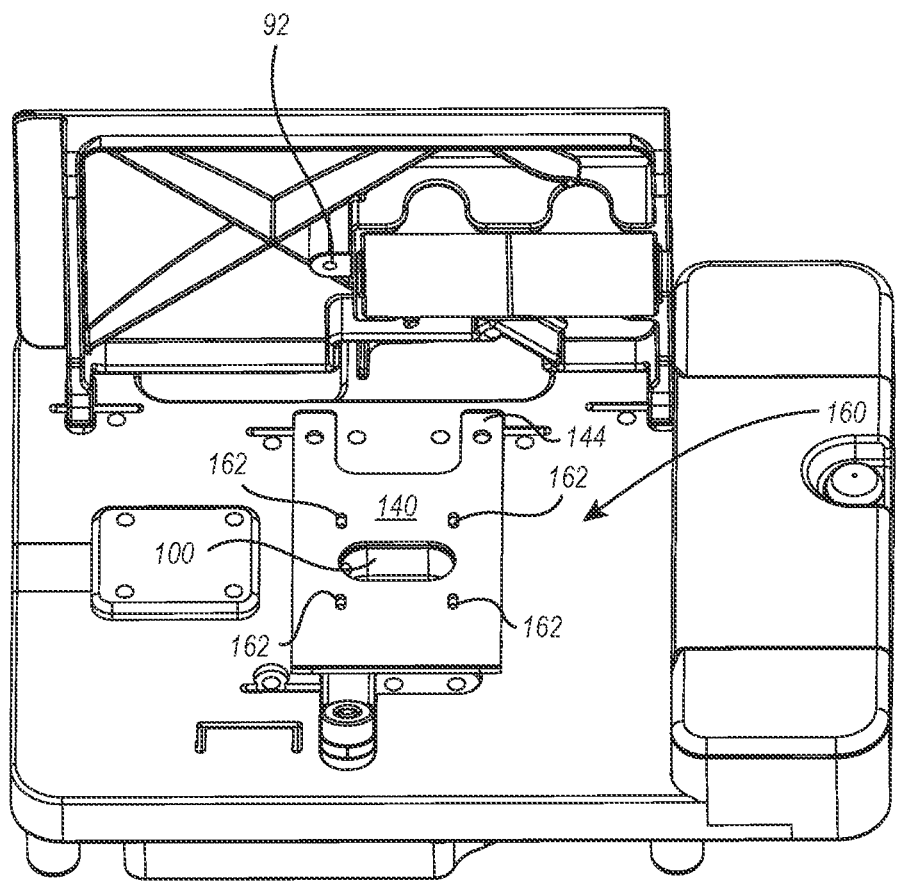
FIG. 12 illustrates another view of the model assembly with an anatomical simulant mounted below a fixation member with a guidewire extending through the anatomical simulant, according to one embodiment of the invention.
Figure 13:
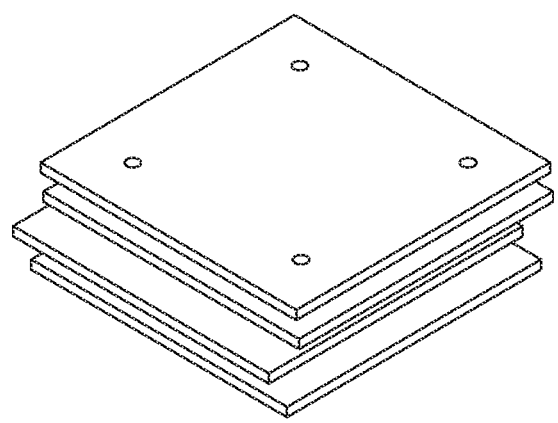
FIG. 13 illustrates an example of chamois patches serving as an anatomical simulate, according to one embodiment of the invention.
Figure 14:
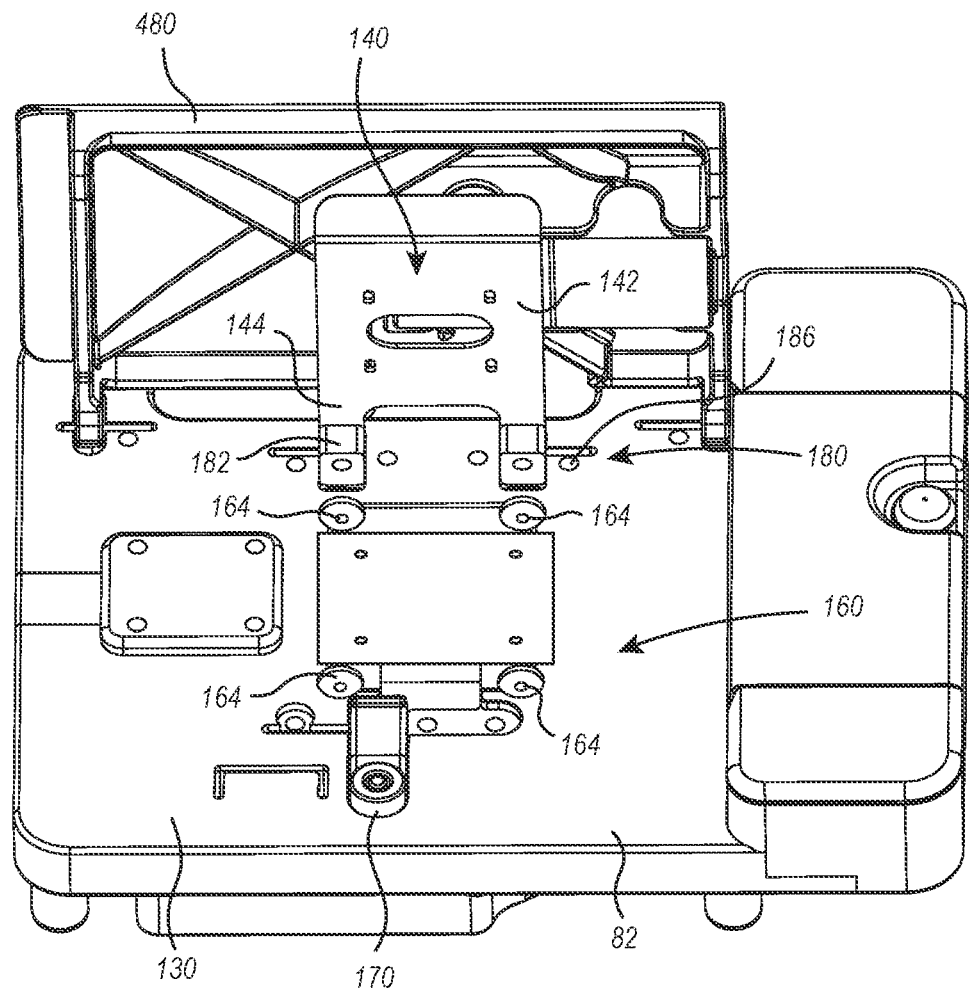
FIG. 14 illustrates another view of the model assembly with an anatomical simulant mounted in a mounting region with a fixation member in an open state, according to one embodiment of the invention.
Figure 49:
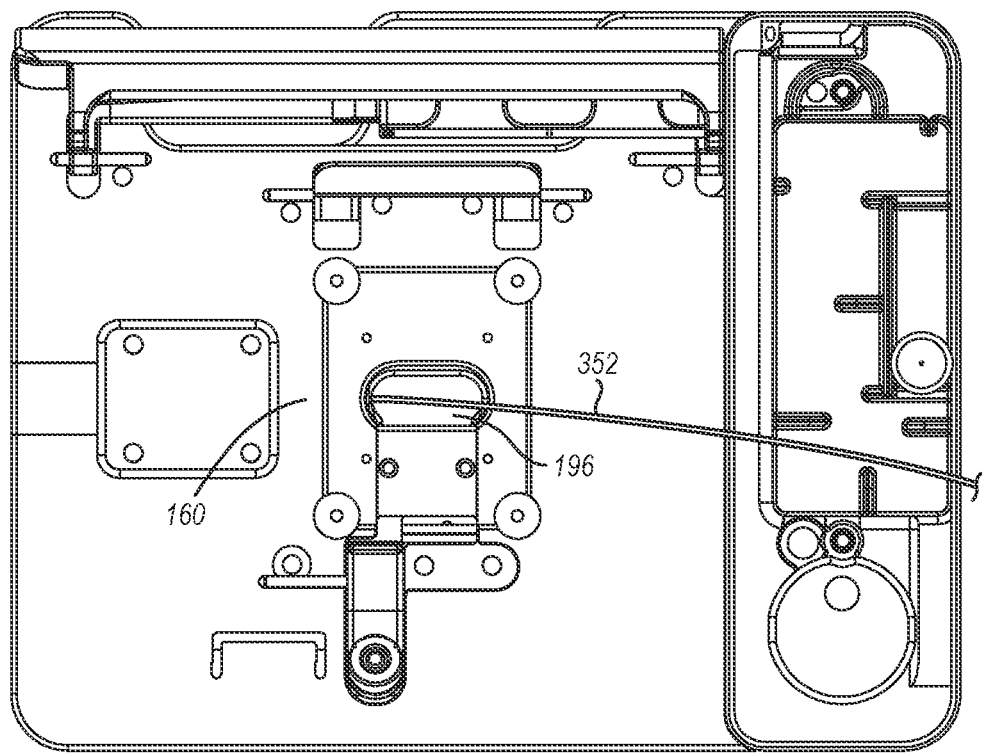
FIG. 49 illustrates a lit-up mounting region of another training model assembly having a port without an anatomical simulant mounted thereon, and having a guidewire passes therethrough, according to one embodiment of the invention.
Figure 50:
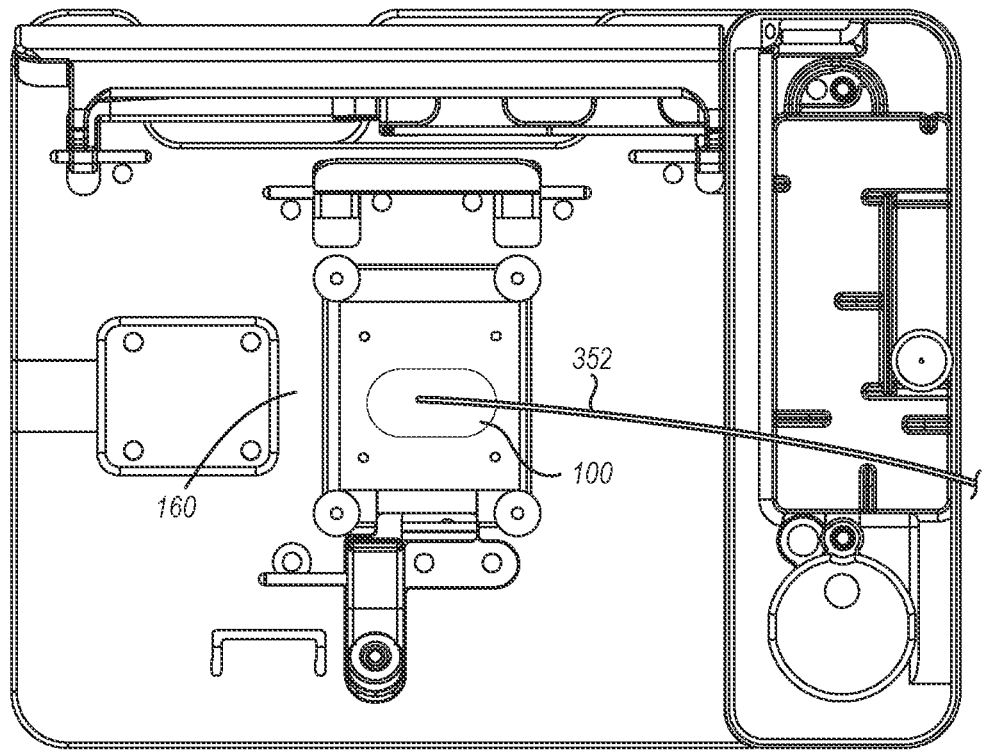
FIG. 50 illustrates a lit-up mounting region of another training model assembly having an anatomical simulant mounted thereon, and having a guidewire passing therethrough, according to one embodiment of the invention.

The upper cover 80 includes a through-hole or inlet 94 through which an anatomical simulant 100 can be accessed during use of the model assembly 50, the anatomical simulant 100 being illustrated in FIGS. 12-14, and 50. FIG. 12 illustrates a mounting region 160, in which an anatomical simulant 100 is placed under a fixation member 140. FIG. 14 illustrates the mounting region 160, in which the fixation member 140 is lifted up, exposing the anatomical simulant 100 fixed thereunder. The anatomical simulant 100 provides a representation of tissue, such as vessels walls, through which a closure device or other medical device 10 can be advanced. Various materials can be used to approximate the tissue. For instance, the anatomical simulant 100 can be formed of a chamois patch, cloth, fabric, latex, polymer, composites, foam, rubber, silicone, combinations or modifications thereof, or the like. FIG. 13 illustrates a stack of chamois patches in a package, and each of the chamois patches in the stack is configured to be used as an anatomical simulant. FIG. 50 further illustrates that the mounting region 160 under the anatomical simulant 100 is illuminated, and a guidewire 352 penetrates the anatomical simulant into the illuminated area thereunder. As a comparison, FIG. 49 illustrates the same mounting region 160 without any anatomical simulant 100, and the guidewire 352 is inserted into the port recess 196.

Figure 8:
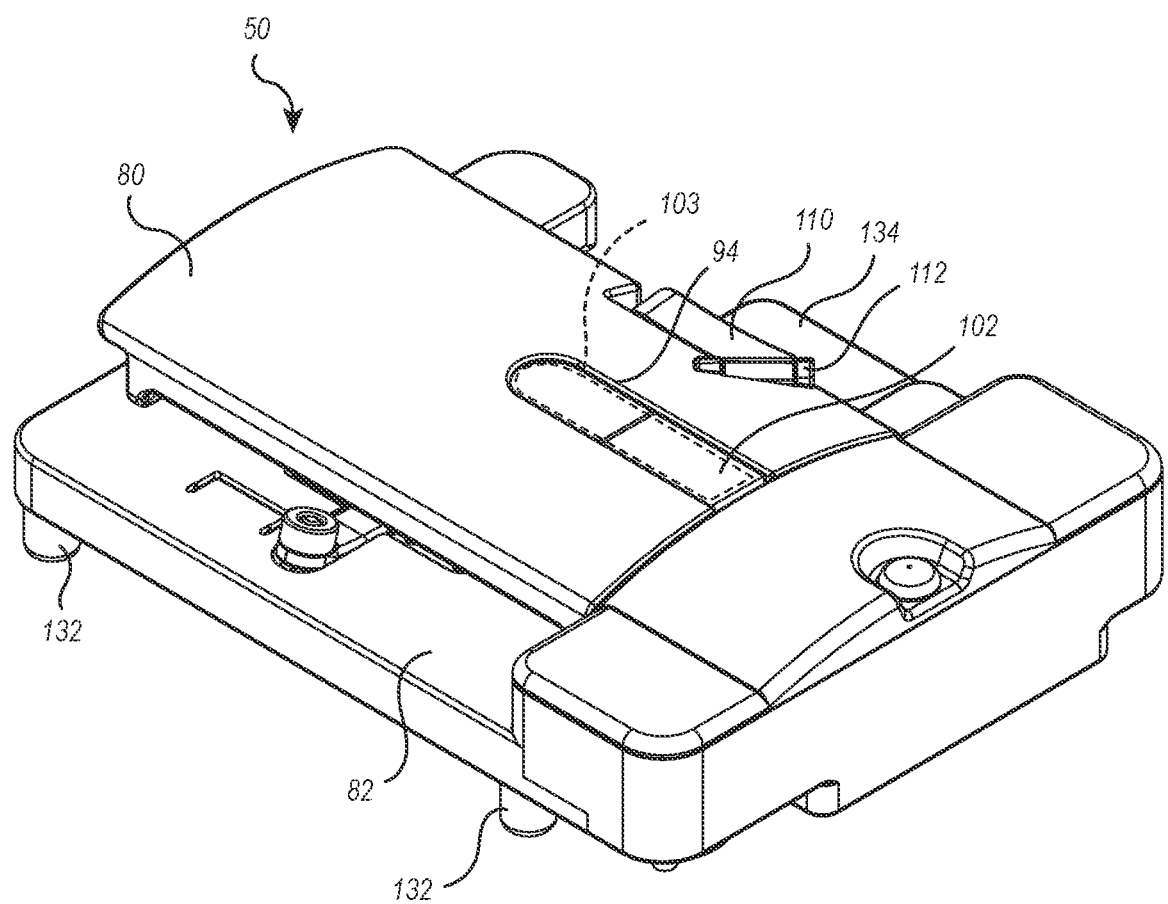
FIG. 8 illustrates a perspective view of a model assembly removed from a liquid storage container with an upper cover in a closed state, according to one embodiment of the invention.
Figure 9:
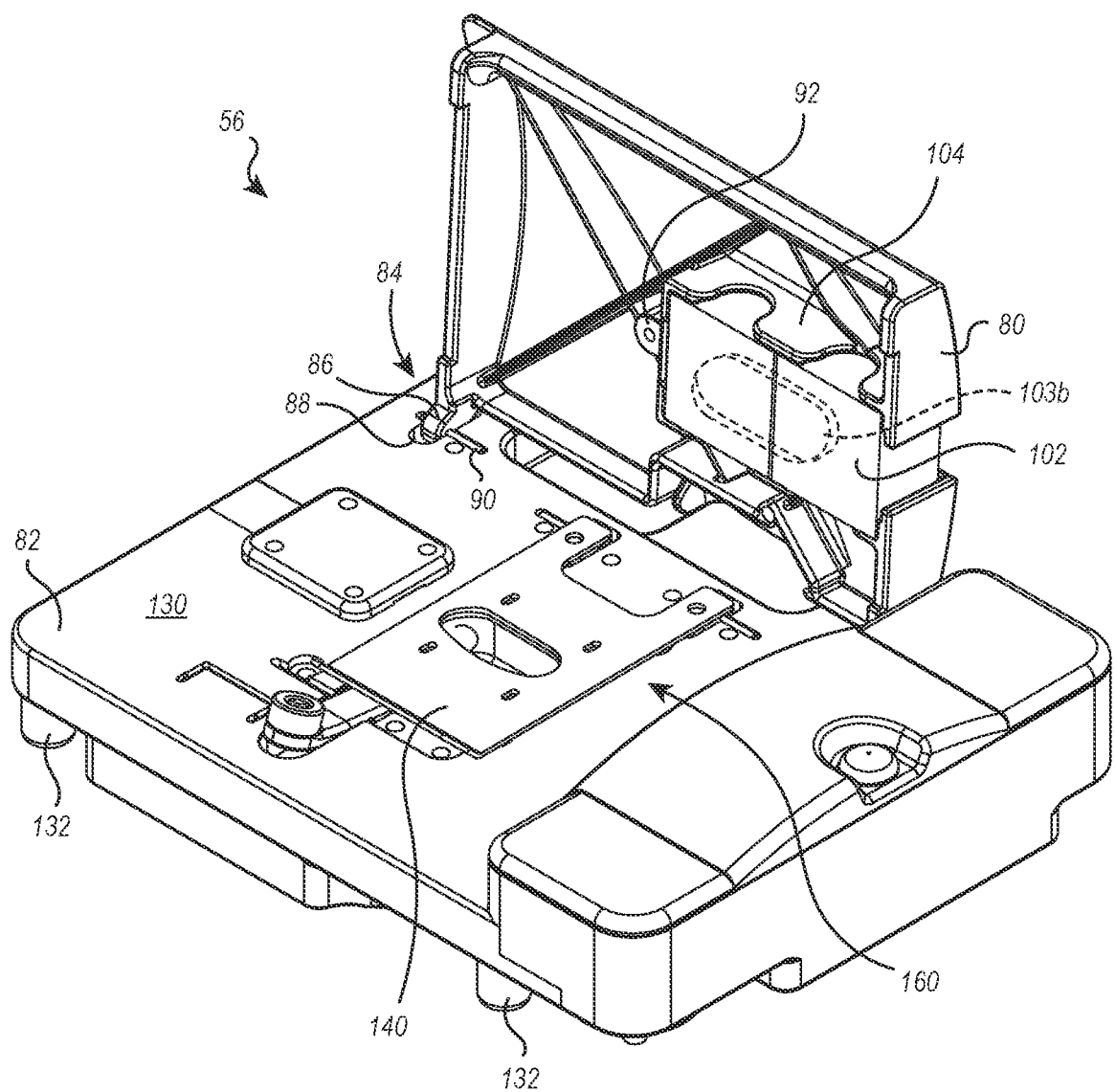
FIG. 9 illustrates a perspective view of a model assembly removed from a liquid storage container with an upper cover in an open state, according to one embodiment of the invention.
Figure 10:
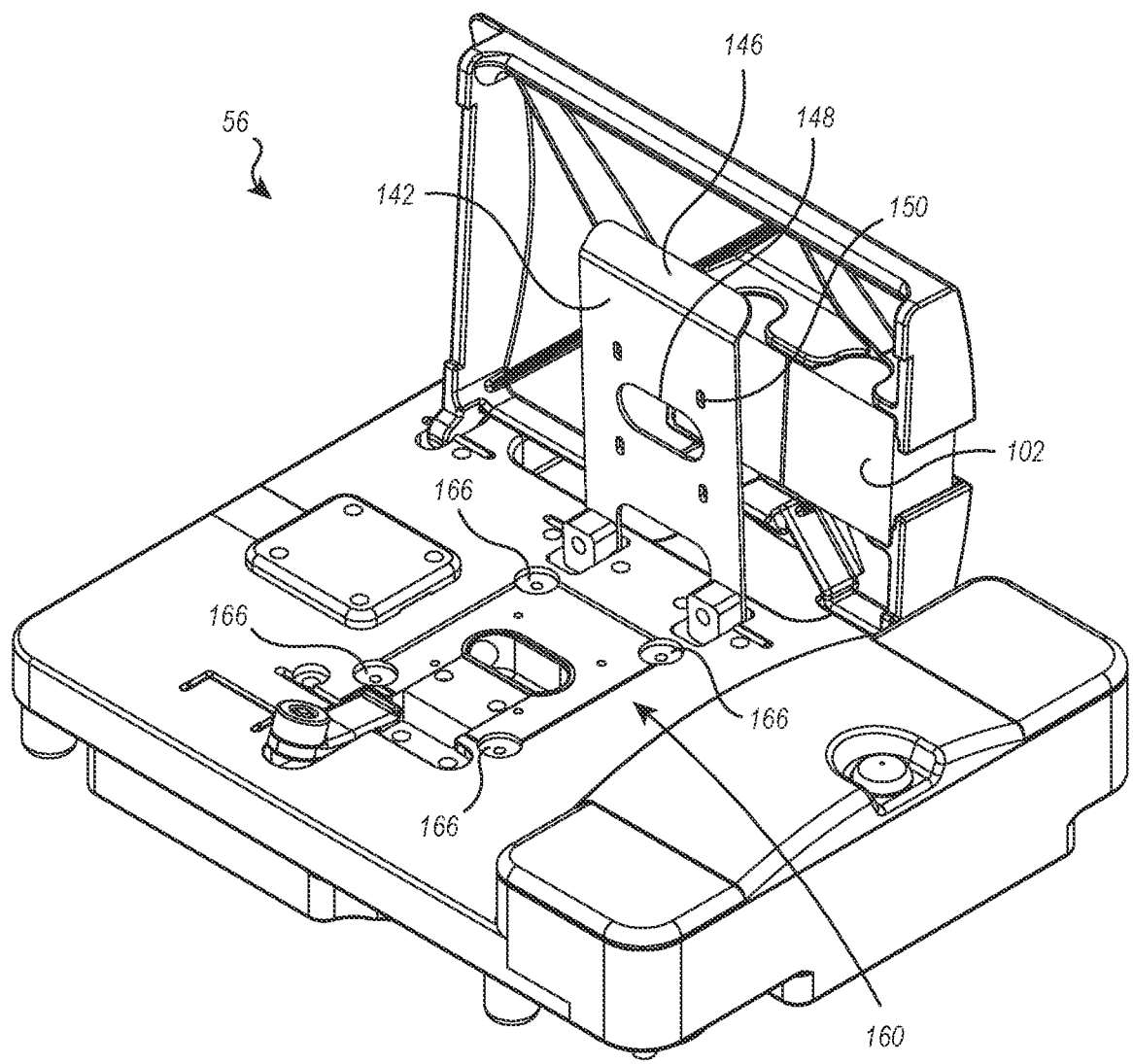
FIG. 10 illustrates a perspective view of a model assembly removed from a liquid storage container with each of an upper cover and a fixation member in an open state, according to one embodiment of the invention.

In FIGS. 4, 8, and 9 the inlet 94 is blocked by block structures 102 that protect the lower support 82 and a mounting region 160 of the lower support 82 that receives the anatomical simulant 100. The block structures 102 can also be used to simulate tissue so that a user can train advancing a needle through the tissue to the simulated access site, and subsequently advance the medical device 10 through the block structures 102. The block structures 102 can be used for a number of procedures before they can be replaced, thus avoiding track formation that reduces the difficulty of accessing the simulated access site. For instance, the block structures 102 can be replaced after about 1 use to about 50 per hole, from about 2 to about 50 uses, from about 50 uses to about 100 uses, or less than about 100 uses.

Those block structures 102 can be received within holders 104 formed on an inside of the upper cover 80 and, when not being used to simulate tissue, removed during use of the system 8. Illustrated are two block structures 102, but it will be understood that one or more block structures 102 can be used. The block structures 102 can have generally planar top and bottom surfaces or can have protruding portions 103*a* and 103*b*, as illustrated in phantom in FIGS. 8 and 9 to be received within inlet 94 or through-hole 148 of a fixation member 140, discussed hereafter. While the protruding portions 103*a* and 103*b* are illustrated being split over two block structures, it can be understood that a single block structure can include one or both of the protruding portions 103*a* and 103*b*.

The block structures 102 can be open or closed-cell foams, transparent or translucent gel, hydrogel, polyethylene glycol (PEG), polymers, natural or synthetic fabrics, composites, combinations or modifications thereof, or other materials that can prevent unwanted damage to the lower support 82 or the anatomical simulant 100. In one configuration with the block structure 102 as a transparent or translucent gel, with formed protruding portions 103*a* and 103*b* which can be securely retained within the upper cover 80 and the fixation member 140, the gel consistency and the formed protruding portion 103*b* tight against the anatomical simulant 100, the system 8 can effectively simulate an environment for training on plug and gel type closure devices where a closure component is below a vessel wall (simulated by the anatomical simulant 100) and the plug or gel type sealing portion of the closure device is between a vessel wall and the tissue layers (simulated by the anatomical simulant 100 and the block structure 102). Instead of the block structure 102 and anatomical simulant 100 being separate, they can be formed as a single unit that can be secured by the fixation member 140 and/or the upper cover 80.

Figure 11:
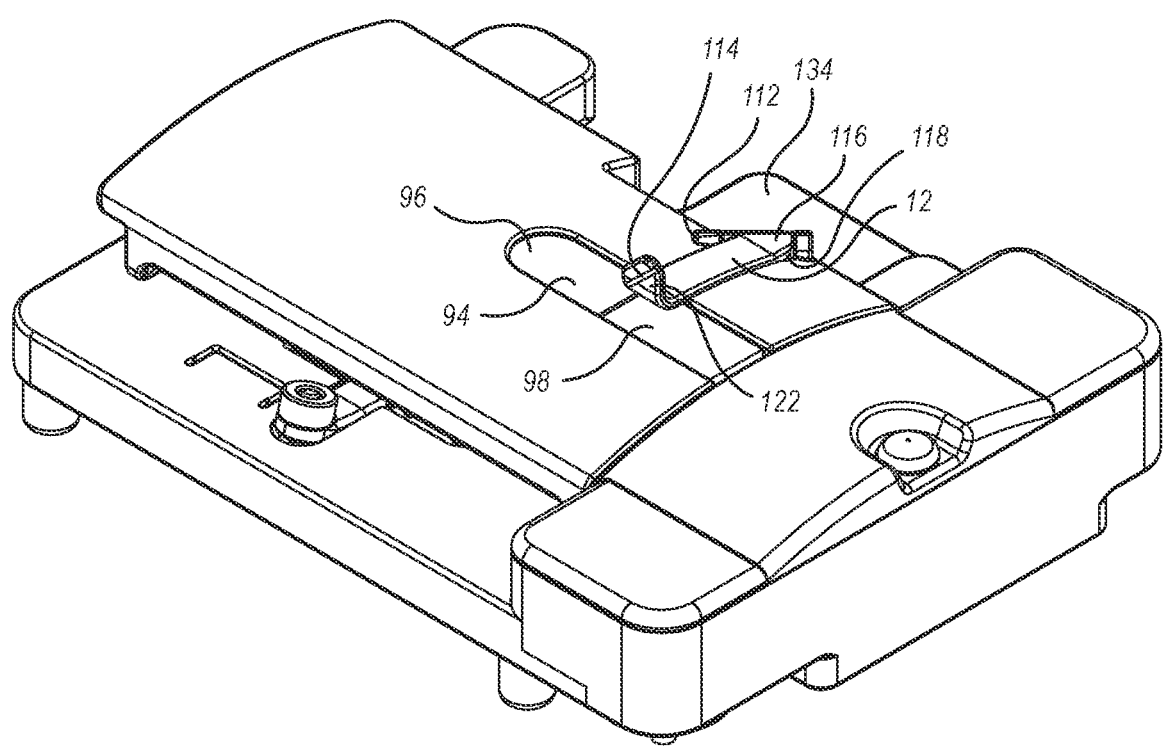
FIG. 11 illustrates a perspective view of a model assembly removed from a liquid storage container with a needle guide in a deployed state, according to one embodiment of the invention.

With reference to FIGS. 8 and 11, mounted to the upper cover 80 is a needle guide 110 that can be moved, such as pivoted, relative to a mounting structure 112 of the upper cover 80 to position a needle guide channel 114 in alignment with the inlet 94, as illustrated in FIG. 11. The needle guide channel 114 aids a user to position a needle at the desired angular orientation relative to the anatomical simulant 100 to simulate a needle stick as part of a medical procedure. A first end 116 of the needle guide 110 includes a recess 118 that receives the mounting structure 112, such as an elongate, generally round member, of the upper cover 80. An elongate body 120 extends from the first end 116 to a needle guide channel end 122 having the needle guide channel 114. The first end 116 and the mounting structure 112 are generally inclined relative to a longitudinal length of the inlet 94. This results in the needle guide channel end 122 following a path from a position toward or in front of an end 96 of the inlet 94 to an intermediate position 98 of the inlet 94.

The first end 116 can be selectively removed from the mounting structure 112, in one configuration, to allow changing of the needle guide 110 and so allow for variations in an angular inclination of the needle guide channel 114 relative to the anatomical simulant 100 and the block structures 102. This allows for variations in the simulated tissue track through the block structures 102 and so variations on how the medical procedure, such as access site closure, can be performed. The needle guide channel 114 can be inclined at about 45 degrees relative to the upper surface of the anatomical simulant 100 in one configuration. In other configurations, the inclination can be from about 10 degrees to about 80 degrees, from about 20 degrees to about 70 degrees, from about 30 degrees to about 60 degrees, less than about 45 degrees, greater than about 45 degrees, or combinations or modifications thereof.

While reference is made to the needle guide 110 being mounted to the upper cover 80, and so move with the upper cover 80, it will be understood that in other configurations, the needle guide 110 can be disposed on the lower support 82 or control housing 60 instead of the upper cover 80. For instance, the needle guide 110 can be disposed below the upper cover 80 within a recess or channel and rotated from that channel while the upper cover 80 is open. In another configuration, the needle guide 110 can extend from the control housing 60. In still another configuration, the needle guide 110 can be selectively, removably attached to the lip or edge 74 of the liquid storage container 52.

Returning to FIGS. 4 and 8-11, the lower support 82 to which the upper cover 80 pivotally mounts is raised from a base of the liquid storage container 52 so the liquid is below an upper surface 130 of the lower support 82 with a space formed between the lower support 82 and the base of the liquid storage container 52. The feet 132 or other structures selectively lower or raise the lower support 82 relative to the base of the liquid storage container 52 to vary an amount of liquid to be retained or stored in the liquid storage container 52.

To aid with identifying the desired quantity of liquid to be stored in the liquid storage container 52, as shown in FIGS. 4, 8, and 11, the lower support 82 includes a fill level plateau 134 identifying a desired level of the liquid held in the liquid storage container 52; this level being lower than the upper surface 130 of the lower support 82 in the illustrated configuration. Depending upon the particular procedure and/or medical device on which the user is training, the fill level plateau 134 can be higher than the upper surface 130 of the lower support 82. With the liquid storage container 52 filled with the liquid, the pump 54 can move at least a portion of the liquid from within the liquid storage container 52 toward the anatomical simulant 100 so the anatomical simulant 100 provides additional resistance to needle penetration at the simulated access site and subsequent training surrounding closing the access site.

Disposed between the upper cover 80 and the lower support 82 is the fixation member 140, as illustrated in FIGS. 9, 10, 12-14, and 53 that aids with securing the anatomical simulant 100 to the mounting region 160 of the lower support 82 and provides a target opening to aid a user to advance medical devices to the anatomical simulant 100. The fixation member 140 includes a fixation plate 142 with a hinged end 144 and a grasping end 146 that is inclined in relation to the fixation plate 142. Notably, the hinged end 144 can be implemented at any side of the fixation member 140. As illustrated in FIGS. 9-10 and 12-14, the hinged end 144 is placed at a top side near a hinge of the cover 480; such that the fixation member 140 opens in the same direction as the cover 480. However, in FIG. 53, the hinged end 144 is placed at the left side, such that the fixation member 140 opens in a direction that intersects a plane of the cover 480.

A target opening or through hole 148 is formed in the fixation plate 142, with securing holes 150 disposed around the through hole 148. The through hole 148 receives the medical device 10 on which the user is training and is optionally aligned with a center of the anatomical simulant 100. The through hole 148 is illustrated as being a stadium shape when viewed in plan view, however it will be understood that the through hole 148 can be square, circular, rectangular, triangular, polygonal, elliptical, oval, combinations thereof or other configurations. Additionally, while the through hole 148 is generally aligned with the center of the anatomical simulant 100, it will be understood that this need not be the case and the through hole 148 can be aligned towards a side or corner or another portion of the anatomical simulant 100.

The securing holes 150 are disposed about the through hole 148 and can receive securing pins 162 to which the anatomical simulant 100 mounts in the mounting region 160. The securing pins 162 limit rotational and lateral movement of the anatomical simulant 100. The securing pins 162 can pass completely through (as illustrated in FIGS. 12-14) or partially through the securing holes 150. While the securing holes 150, and the securing pins 162, are generally orientated at corners of a virtual square, as illustrated in FIGS. 12-14, the securing holes 150, and the securing pins 162, can be positioned at a variety of different locations. For instance, the securing holes 150, and the securing pins 162, can be positioned on a perimeter of a virtual rectangle, triangle, polygon, circle, ellipse, oval, or the like.

The fixation member 140 aids with fixing or limiting movement of the anatomical simulant 100 by applying a downward pressure to the anatomical simulant 100 and preventing the anatomical simulant 100 from becoming detached from the securing pins 162. The downward pressure limits sliding or torquing of the anatomical simulant 100 during training, i.e., during position of the medical device 10 to training or practice closing the access site. This downward pressure can be achieved by a pull force or magnetic attraction exerted on the fixation member 140 by the magnets 164 mounted in magnet recesses 166 in the upper surface 130 of the lower support 82, such as around a portion of the mounting region 160, as illustrated in FIGS. 11 and 14. The pull force of the magnets 164 can range from about 2 lbs. to about 30 lbs.

While reference is made to using magnets 164 to maintain the fixation member 140 in a closed state, it will be understood that other techniques and structures can be used to position the fixation member 140 in a closed state maintain the fixation member 140 in the closed state. For instance, in another configuration, a spring-loaded locking mechanism is used to hold the fixation member 140 in place, the locking mechanism engaging with a portion of the fixation plate 142 to hold it in place. In another configuration, the locking mechanism can be a cam latch, a push-to-close latch, a sliding latch, or other latches or catches, combinations or modifications thereof, or other locking mechanisms.

Figure 15A:
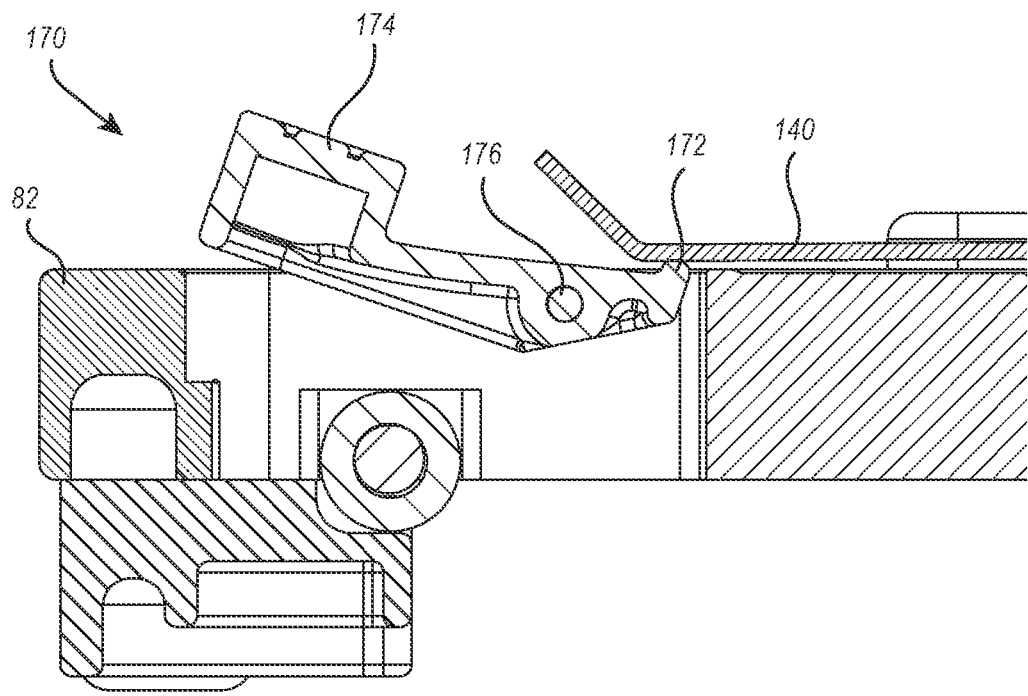
FIGS. 15A and 15B illustrate a cross-sectional view of a release lever in a first position and a second position, and in the second position, the release lever has moved the fixation member upwardly, according to one embodiment of the invention.
Figure 15B:
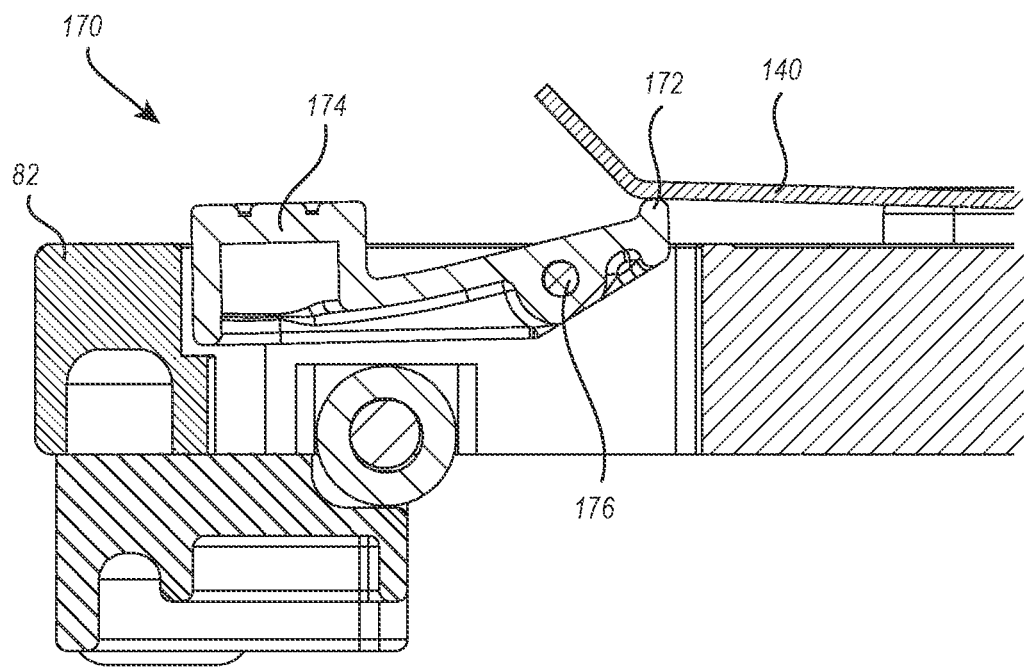

Because of the magnetic forces associated with the magnets 164 in this particular configuration, to aid with releasing the fixation member 140 from the magnets 164, a release lever 170 is pivotally mounted to the lower support 82, as illustrated in FIGS. 14 and 15A-15B. A release lever first end 172 is positioned below the fixation member 140 when the fixation member 140 is in a downward state, or a state aiding with retaining the anatomical simulant 100 to the mounting region 160, while a release lever second end 174 extends upwardly from the upper surface 130 of the lower support 82. A pivot region 176 is positioned between the release lever first end 172 and the release lever second 174 so that downward movement of the release lever second end 174 moves the release lever first end 172 upwardly to release the fixation member 140 from engagement with the magnets 164. This separation is sufficient so that a user can manipulate the grasping end 146 to pivot the fixation member 140 away from the anatomical simulant 100. The release lever first end 172 is illustrated as including a protrusion, detent, or raised surface, but it will be understood that in other configurations, the release lever first end 172 can be planar or generally flat. In still other configurations, and more generally, the release lever first end 172 can include an engagement surface, i.e., the surface that contacts the fixation member, that is convex, concave, combinations thereof, or modifications thereof. Additionally, the engagement surface can be roughened or have a surface finish and/or coating to increase frictional engagement between the release lever 170 and the fixation member 140.

As mentioned above, and with reference to FIG. 14, the fixation member 140 pivots about the hinged end 144 at a fixation hinge position 180 so as to pivot separately from the pivotal movement of the upper cover 80. A fixation leg portion 182 of the fixation member 140 is disposed in and passes through a fixation opening 184 in the lower support 82 with a fixation pivot pin 186 passing through the fixation leg portion 182. The fixation member 140 pivots about the fixation pivot position 182, with the fixation member 140 optionally being biased to a closed position by a spring or other biasing member. While this is one configuration, it will be understood that the fixation member 140 can alternatively pivot with upper cover 80. Additionally, while reference is made to pivoting movement of the upper cover 80 and the fixation member 140, this need not be the only movement possible of the upper cover 80 and the fixation member 140. For instance, one or both of the upper cover 80 and the fixation member 140 can slide in a direction parallel or transverse to the long or short sides of the liquid storage container 52. In still another configuration, one or both of upper cover 80 and the fixation member 140 can rotate in a plane parallel to a plane of an upper surface of the lower support 82. It can also be understood that movements of the upper cover 80 and the fixation member 140 are not limited to the identified directions and paths so long as the particular movements allow for, in the case of the upper cover 80, to close and protect the anatomical simulant and the mounting region 160, and in the case of the fixation member 140, to aid with positioning the anatomical simulant in the mounting region 160. The fixation member 140 may be comprised of one or more elements, for example, two shutter doors.

Figure 16:
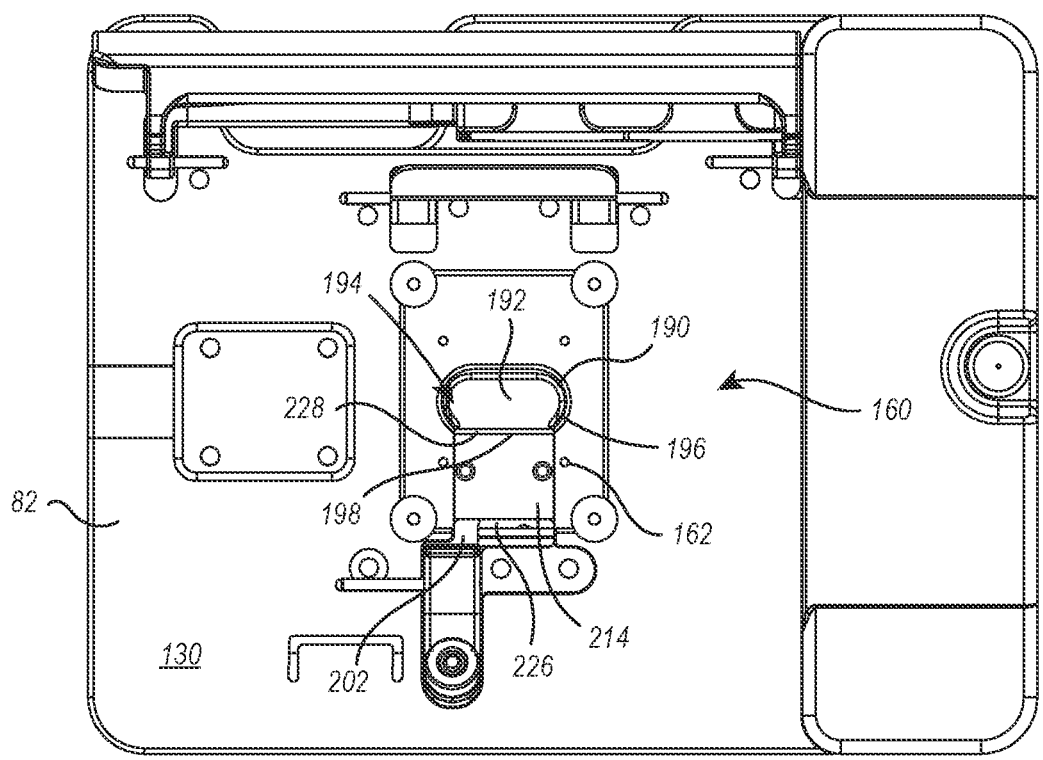
FIG. 16 illustrates a plan view of the model assembly removed from a liquid storage container with an upper cover and a fixation member in an upwardly pivoted position, such as an open state, according to one embodiment of the invention.
Figure 17:
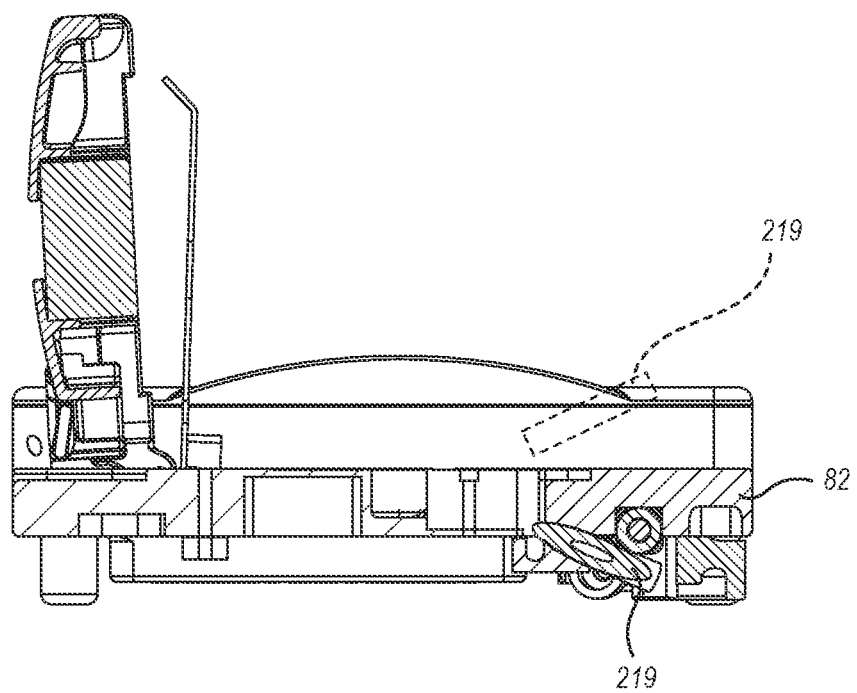
FIG. 17 illustrates a cross-section view of a portion of the model removed from a liquid storage container, assembly according to one embodiment of the invention.
Figure 18:
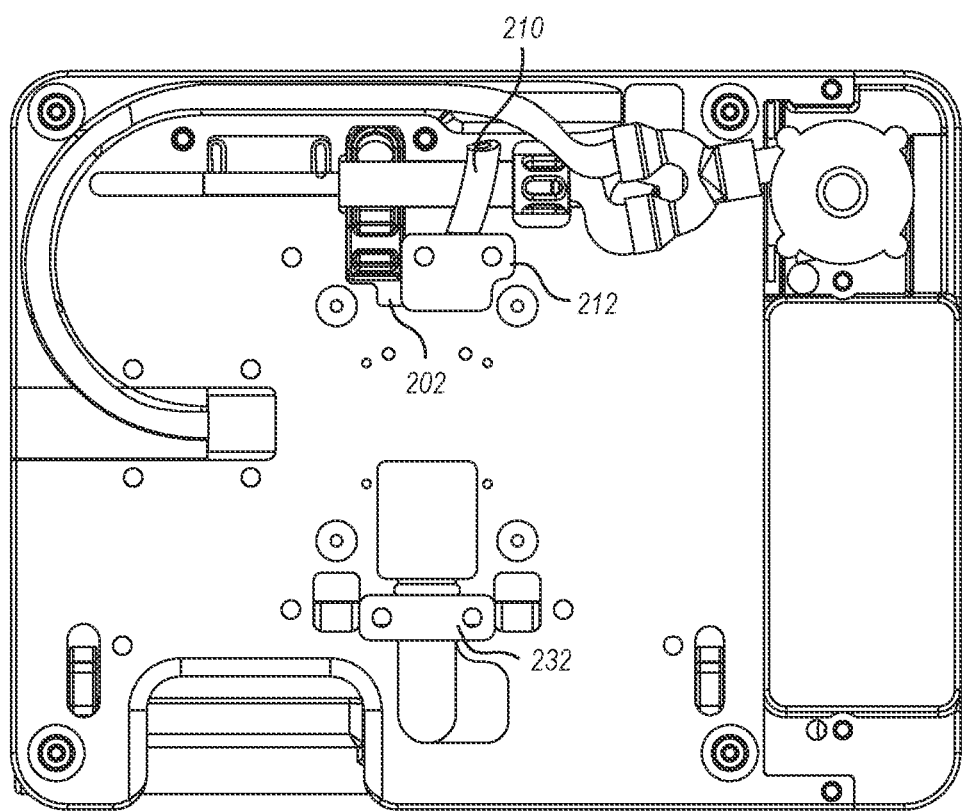
FIG. 18 illustrates a bottom view of the model assembly removed from a liquid storage container, according to one embodiment of the invention.

The mounting region 160 also includes a port 190 that provides access to a chamber 192 below the upper surface 130 of the lower support 82, as illustrated in FIGS. 16 and 17. The port 190 has a first portion 194 that approximates the size and dimensions of the through hole 148. The port 190 can optionally include a port recess 196 to receive a seal 198 to aid with forming a seal between the port 190 and the anatomical simulant 100. Optionally, a thin, flexible member 200 (FIG. 30) can cover the port 190 prior to positioning the anatomical simulant 100 on the securing pins 162. The flexible member 200 can be formed of latex film, however, it will be understood that other material can be used, such as but not limited to, open or closed foam, rubber, silicone, urethane, polymers, hydrogels, composites, combinations or modifications thereof, or the like.

The port 190 includes as a second portion 202 that provides access to an imaging device 210, such as a camera, mounting in an imaging device support 212, as illustrated in FIGS. 5 and 16-18. The imaging device support 212 inclines the imaging device 210 so that its field of view is through an optical block 214 that separates the chamber 192 and the imaging device 210 and toward the anatomical simulant 100 disposed above the port 190. This allows the imaging device 210 to view the anatomical simulant 100 and medical devices passing through the anatomical simulant 100 during training. Video or images from the imaging device 210 are transmitted to the image viewing device 14 (FIG. 2), so users or trainees can visualize the medical device 10 during training for the medical procedure.

The imaging device 210, as illustrated in FIGS. 5, and 16-19, is mounted to the lower support 82 through the imaging device support 212. In the illustrated configuration, the imaging device 210 is an endoscopic-type device having a flexible tube 218 extending from the lens or lens system associated with a camera portion 219, secured within the imaging device support 212, to the control housing 60. The flexible tube 218 extends within a channel 220 of a guide block 222 mounted to the lower support 82, passes through a hole 224 in the imaging device support 212, before entering the control housing 60. One example of the imaging device 210 is a WF010 HD 2.0 MP Wi-Fi Waterproof Endoscope from DEPSTECH. In an alternate configuration, the camera side of the imaging device 210 wirelessly communicates either directly with the image viewing assembly 14 or with a control device in the control housing 60. While reference is made to the imaging device 210 including a camera portion 219, it will be understood that the imaging device or assembly can include a plurality of camera portions, such as at least one camera portion 219 disposed above the lower support 82 and at least one camera portion 219 disposed below the lower support 82. With multiple camera portions, the imaging device or assembly can deliver images or real-time streaming video from two locations to the image viewing assembly 14 (FIGS. 1 and 2), such as from above and below the anatomical simulant 100. This can include a view between the anatomical simulant 100 and one or more block structures 102 (FIGS. 8-10), such as at a junction between the anatomical simulant 100 and one or more block structures 102, when the procedure uses a closure technique having a closure component below a vessel wall (simulated by the anatomical simulant 100) and a plug or gel type sealing portion of a closure device between a vessel wall and the tissue layers or in a tissue tract (simulated by the anatomical simulant 100 and the block structure 102). With a transparent or translucent gel used for the block structure 102 the camera portion 219 can view the region between, for instance, the protruding portion 103a and the anatomical simulant 100.

While the above-described configuration includes the imaging device support 212 and the guide block 222, it will be understood that the lower support 82 can include the channel 220 and/or the hole 224. Additionally, if another type of imaging device 210 is used, the model support assembly 50 need not include the flexible tube 218 and associated structures or components.

As mentioned above, the imaging device 210 views the chamber 192 and the location of the anatomical simulant 100 through the optical block 214. The optical block 214 has first polished surface 226 and a second polished surface 228 and is optically transmissive so the imaging device 210 can view the chamber 192 and the anatomical simulant 100 disposed above the port 190. The optical block 214 also forms one wall of the chamber 192. The optical block 214 can be formed of glass or a polymer, such as polycarbonate, acrylic, so long as the material allows the optical block 214 to function as a window, and optionally a lens, for the imaging device 210.

Disposed on an opposite side of the chamber 192 from the imaging device 210 is an illumination source 230, as illustrated in FIGS. 5, and 16-19. The illumination source 230, such as one or more light-emitting diodes, halogen bulbs, compact fluorescent light bulbs, or other light sources, can be positioned and retained by a source mount 232. If the illumination source 230 includes an illumination source housing 234, as illustrated in FIG. 5, the illumination source housing 234 can be retained within a source retention slot 236 (FIG. 19) and clamped in place with the source mount 232.

Figure 19:
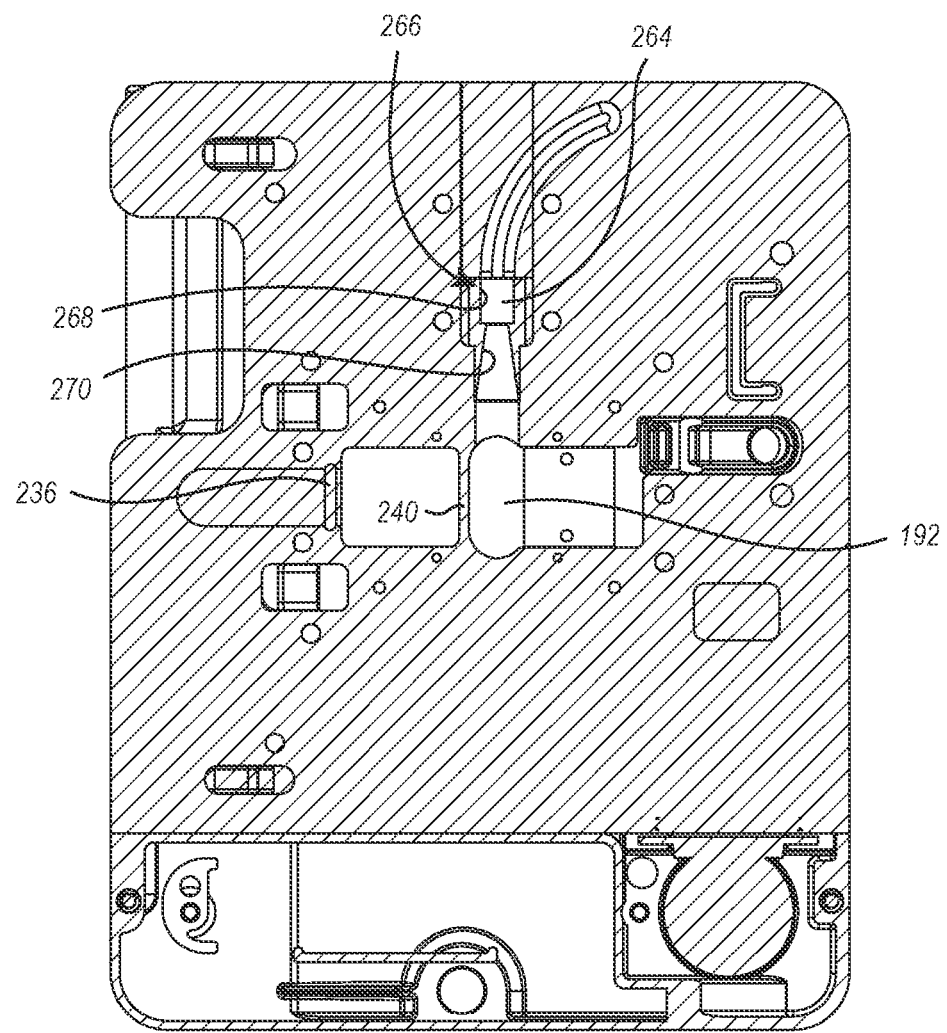
FIG. 19 illustrates a cross-sectional view of a portion of the model removed from a liquid storage container, assembly according to one embodiment of the invention.
Figure 20:
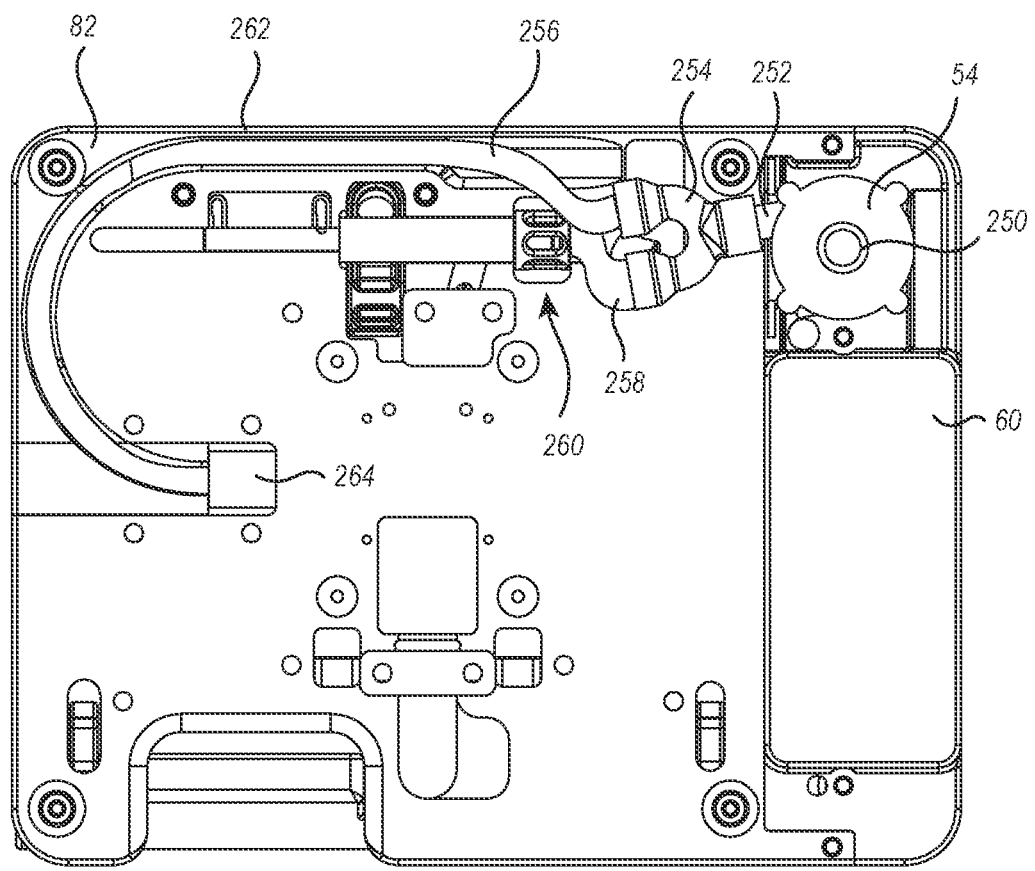
FIG. 20 illustrates a bottom view of the model assembly removed from a liquid storage container with a mounting block removed, according to one embodiment of the invention.
Figure 21:
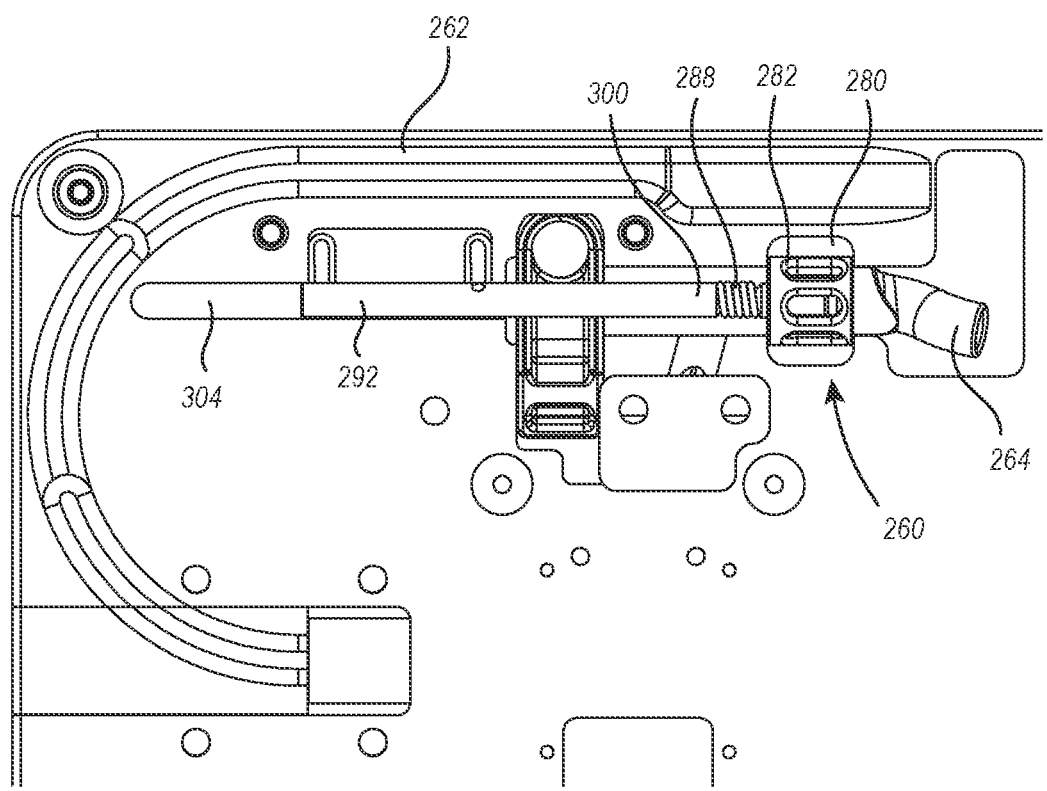
FIG. 21 illustrates a bottom view of a check valve of the model assembly removed from a liquid storage container, according to one embodiment of the invention.
Figure 22:
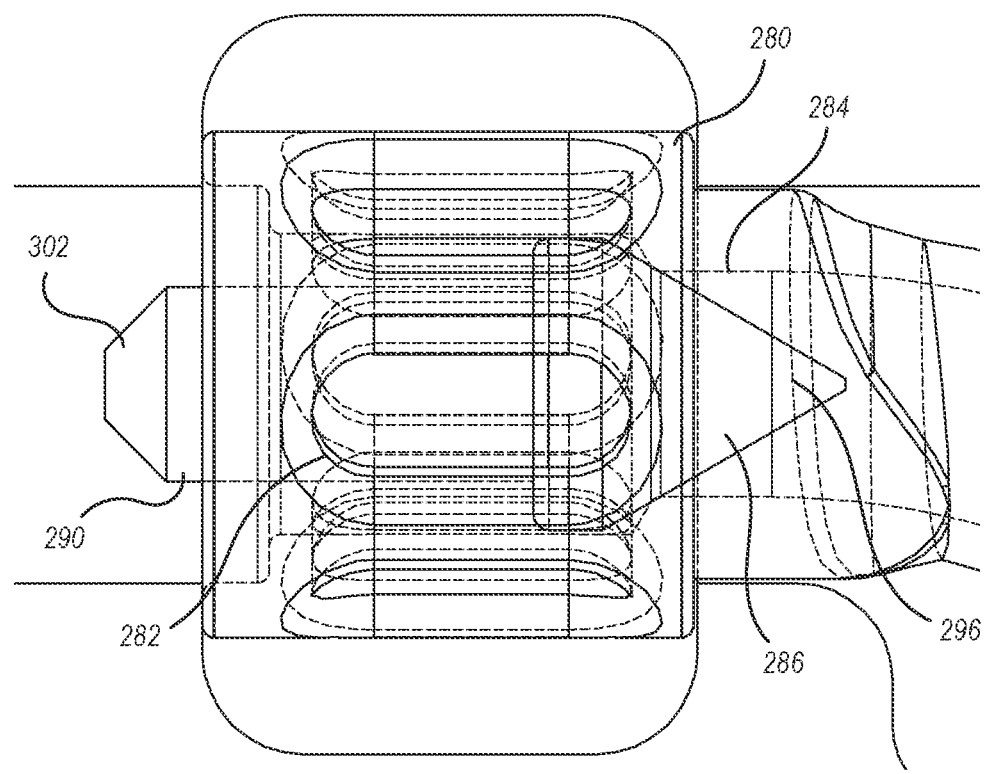
FIG. 22 illustrates a bottom view of a check valve of the model assembly removed from a liquid storage container, according to one embodiment of the invention.

The illumination source 230 directs light toward a wall 240 of the chamber 192 opposite from the optical block 214, illustrated in FIG. 19. The wall 240 is thin enough that the light from the illumination source 230 still illuminates the chamber 192. For instance, the wall 240 is formed of a PolyOxyMethylene (POM), polymer, composite, combinations or modifications thereof, and can have a thickness of about 0.5 mm to about 6.0 mm, from about 2 mm to about 3 mm, from about 1 mm to about 4 mm, less than about 6 mm, greater than about 0.5 mm, to illuminate the chamber 192. It will be understood that a combination of the output lumens of the illumination source, the opacity of the material forming the wall 240, and the thickness of the wall 240 can be varied while still achieving a desired illumination of the chamber 192.

As illustrated in FIGS. 5 and 17-19, the imaging device 210 and the illumination source 230 are disposed on opposite sides of the chamber 192. This need not be the case and the imaging device 210 and the illumination source 230 can be positioned on the same side or on sides of the chamber 192 transverse to each other. At least one of the imaging device 210 and the illumination source 230 are positioned on an opposite side of the anatomical simulant 100 from the through hole 148. Additionally, while no additional optical components are illustrated, it is also contemplated that other lenses, mirrors, optical fibers, or other optical components can be used to direct the light towards the chamber 192 or visualize the chamber 192 and/or the anatomical simulant 100.

With reference to FIGS. 5 and 18-24, when the liquid storage container 52 is filled with the liquid, the pump 54 can move at least a portion of the liquid from within the liquid storage container 52 toward the anatomical simulant 100 so the anatomical simulant 100 provides additional resistance to needle penetration at the simulated access site and subsequent training surrounding closing the access site. The pump 54 extends from a lower surface of the control housing 60 with a pump inlet port 250 facing the base of the liquid storage container 52 and a pump outlet port 252 extending transversely to the pump inlet port 250. A split conduit 254, such as a Y-connector, separates flow from the pump outlet port 252 to a first conduit 256 extending toward the chamber 192 and a second conduit 258 extending to a check valve 260, which with the first conduit 256 and a second conduit 258 forms part of the pressure controller 70. The first conduit 256 is disposed in a conduit cavity 262 formed in the lower surface of the lower support 82 and terminates in a guide chamber 264 that directs the liquid flow into the chamber 192. The guide chamber 264 tapers towards the chamber from a first conduit mounting recess 266 within which the first conduit 256 can be retained, such as through mechanical fit, frictional engagement, adhesives, thermal bonds, combinations or modifications thereof, or the like. The combination of the first conduit 256 and the guide chamber 264 can receive an end of the medical device 10 as it passes through the anatomical simulant 100 during training. To limit catching of the medical device 10, there is a substantially smooth transition between an inner lumen 268 of the first conduit 256 and a tapering surface 270 of the guide chamber 192.

Figure 23:
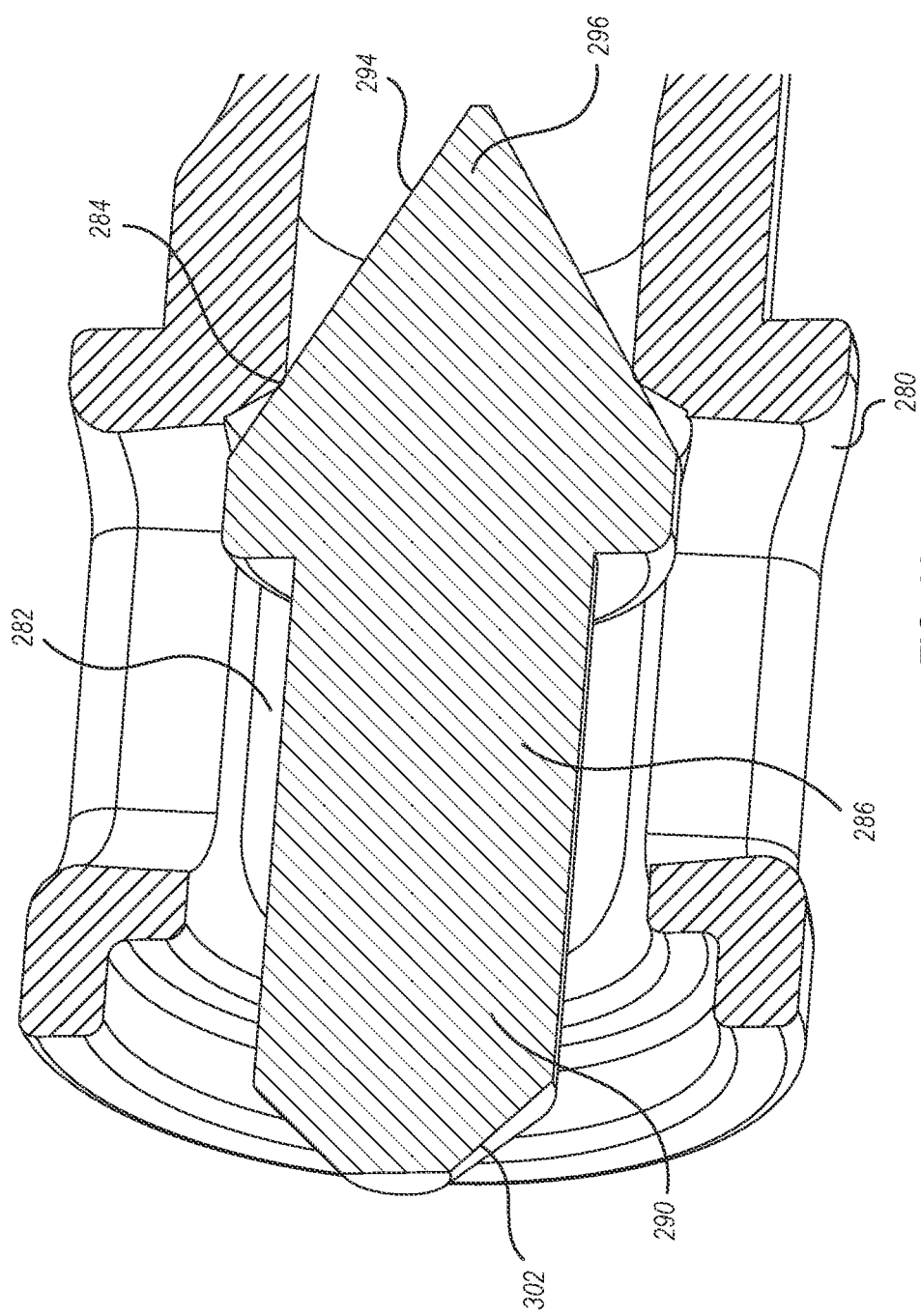
FIG. 23 illustrates a cross-sectional view of a portion of a check valve of the model assembly removed from a liquid storage container, according to one embodiment of the invention.

With reference to FIGS. 18-24, the second conduit 258 provides liquid flow to the check valve 260. The check valve 260 has an outer body 280 with a number of openings 282 extending through the outer body 280. A seating portion 284 is formed at the upstream end of the outer body 280 and can cooperate with a valve member 286 that is seated against the seating portion 284 under the influence of a biasing member 288 positioned between a stem 290 of the valve member 286 and an actuator rod 292. The biasing member 288 maintains a tapered end 296 of the valve member 286 in contact with the seating portion 284 until the pressure exerted by the liquid moved by the pump 54 is sufficient to overcome the biasing force. As illustrated in FIG. 23, for instance, a valve member outer surface 294 is seated against the seating portion 284. When the biasing force is over come, the liquid passes around the seating portion 284 and exits through the openings 282 so the liquid is returned to the liquid storage container 52.

Figure 24:
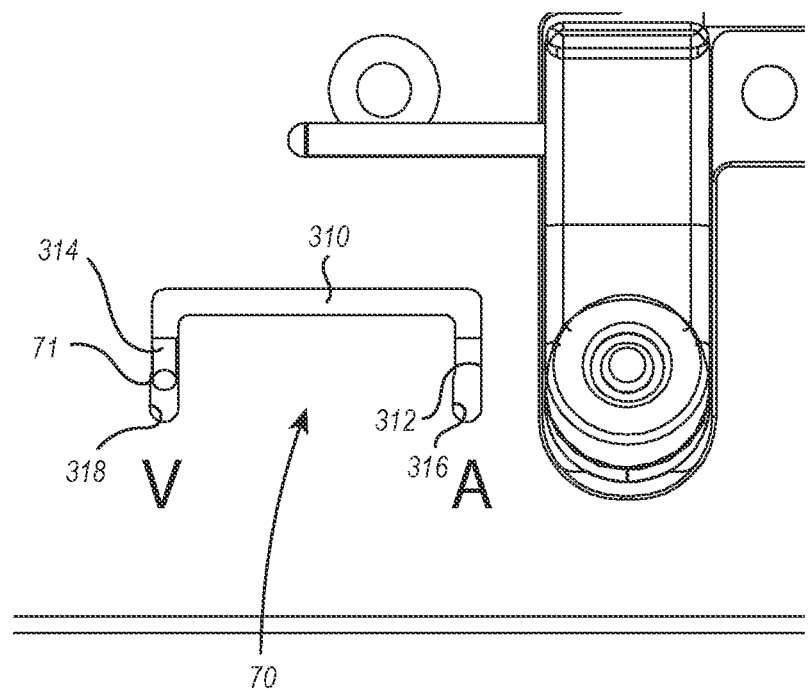
FIG. 24 illustrates a pressure controller of the model assembly, according to one embodiment of the invention.

The actuator rod 292 can adjust the biasing force exerted by the biasing member 288 by changing relative positions of an actuator rod end 300 of the actuator rod 292 and a stem end 302 of the stem 290 The actuator rod 292 can slide within an actuator rod channel 304 formed on the lower support 82 to adjust the relative positions of the actuator rod end 300 and the stem end 302. Adjustments to actuator rod 292 position can be made by moving the actuator arm 71 of the pressure controller 70 that extends from the actuator rod 292 through the lower support 82 as illustrated in FIG. 24, The actuator arm 71 of the pressure controller 70 rides or slides within a slot 310 between a first slot leg 312 and a second slot leg 314 and being retained in either of the first slot leg 312 or the second slot leg 314 by, respectively, first retaining notch 316 and second retaining notch 318. Changing the position of the pressure controller 70 between the first slot leg 312 and the second slot leg 314 can slide the actuator rod 292 toward or away from the valve member 286. When the pressure controller 70 is at a first slot leg 312 the biasing force of the biasing member 288 is increased to simulate arterial flow through the chamber 192, while positioning the pressure controller 70 in the second slot leg 314 decreased the biasing force of the biasing member 288 to simulate venous flow through the chamber 192.

During use of the system 8, when the pump 54 is turned on to provide either steady or pulsating flow, the flexible member 200 and the anatomical simulant 100 over the port 190 of the chamber 192 act as a fluid stop preventing the liquid from escaping through the port 190. A back pressure of the liquid causes the liquid to preferentially flow towards the check valve 260 and provide a sufficient force to overcome the biasing force of the biasing member 288. The liquid then passes the valve member 286 and out through the openings 282 to return to the liquid stored in the liquid storage container 52. This circulation flow continues until the flexible member 200 and the anatomical simulant 100 are punctured with a needle or other medical instrument. When this occurs, the back pressure decreases, and the liquid flows through and out from the needle. This flow continues even after the needle is removed, thereby simulating the flow of blood from an access site. Any liquid exiting the flexible member 200 and the anatomical simulant 100, or seeping through the anatomical simulant 100 flows onto the fixation member 140 and the lower support 82, running to the gap 72 between the lower support 82 and the liquid storage container 52 to return to the liquid stored in the liquid storage container 52.

Figure 25:
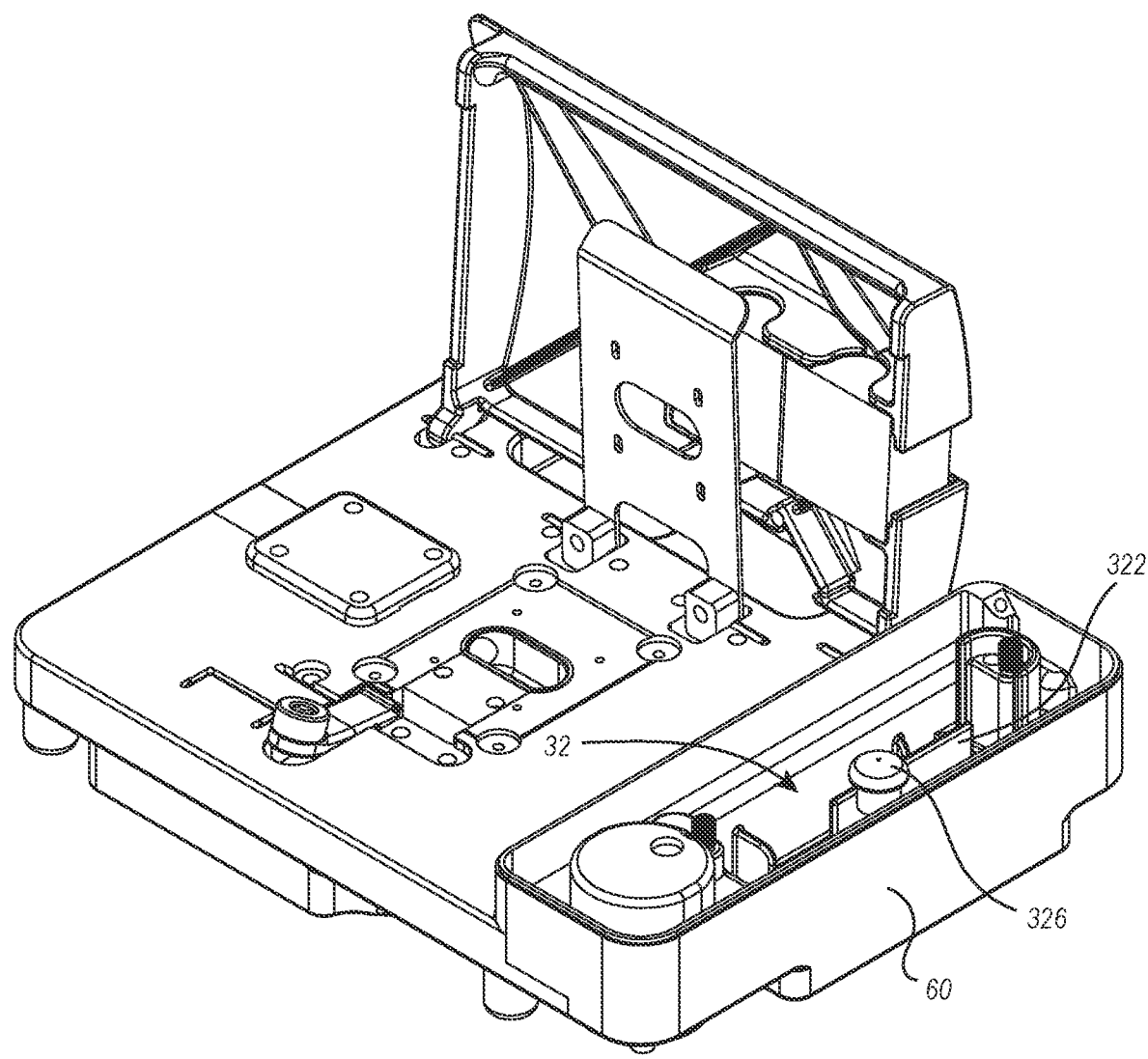
FIG. 25 illustrates a perspective view of a model assembly removed from a liquid storage container with a cover of the control housing removed, according to one embodiment of the invention.
Figure 26:
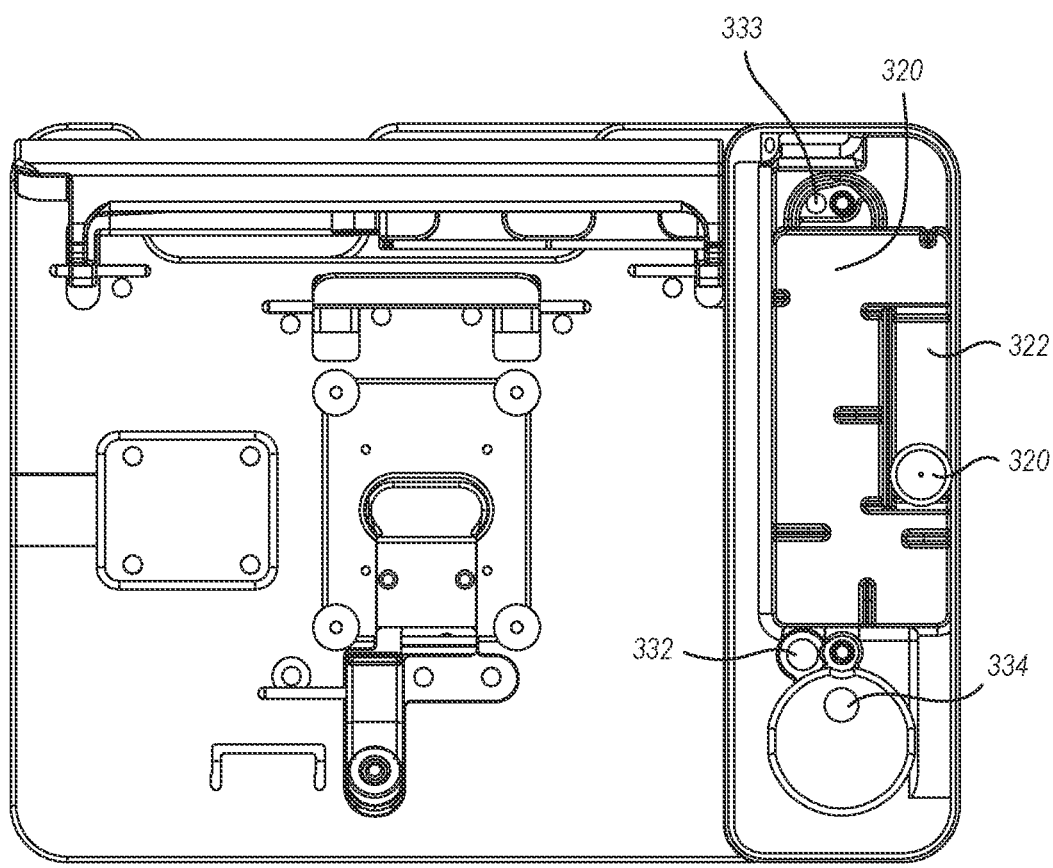
FIG. 26 illustrates a plan view of a model assembly removed from a liquid storage container with a cover of the control housing removed, according to one embodiment of the invention.
Figure 27:
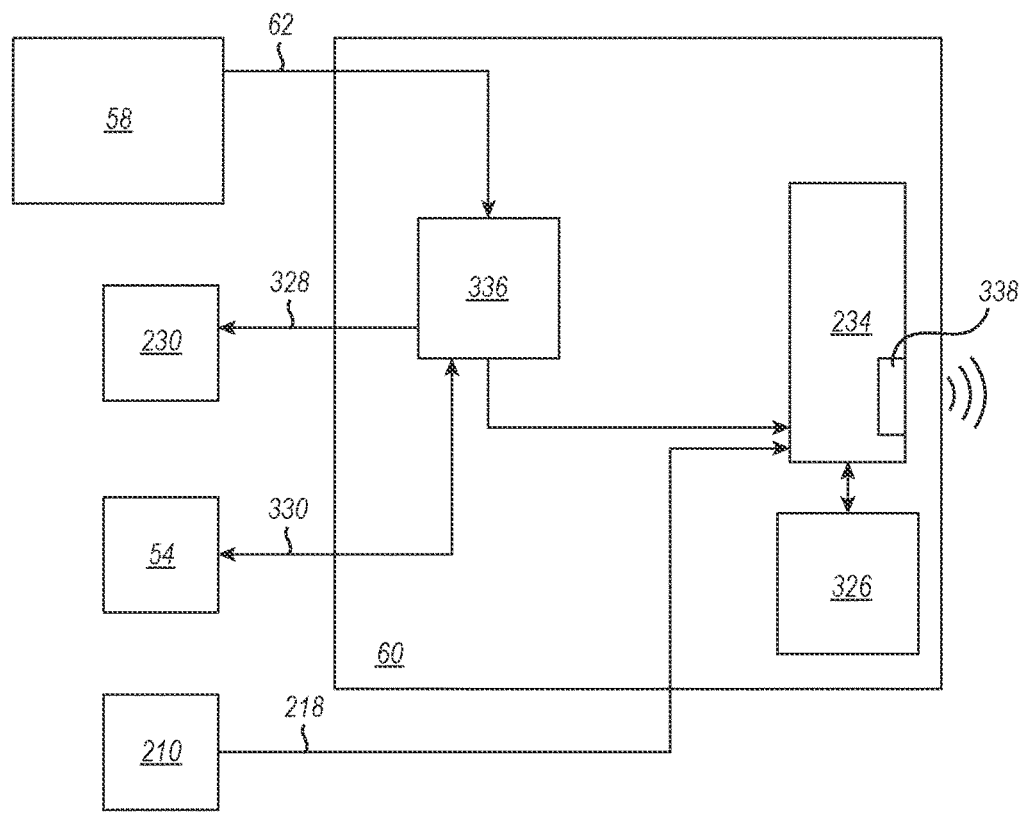
FIG. 27 illustrates a schematic representation of electrical and control connections of the model assembly, according to one embodiment of the invention.

Control of the pump 54 to create a liquid flow to the chamber 192 is controlled by the controller 58 in combination with the electrical and mechanical components located in the control housing 60. As illustrated in FIGS. 25 and 26, the control housing 60 has a housing cavity 320 with a housing recess 322 that receives an imaging device controller 324, schematically illustrated in FIG. 27.

The imaging device controller 324 can be operated by a button or switch 326. For instance, operating the button or switch 326 operates, such as pushing or turning a button or switch, of the imaging device controller 324 to initiate a wireless connection with the image viewing device 14 (FIGS. 1 and 2). Stated another way, when the imaging device controller 324 is turned on, in the sense that its associated button or switch is operated, the imaging device controller 324 operates a wireless transmitter/receiver 338 to form the wireless connection 16 (FIGS. 1 and 2) with the image viewing device 14 (FIGS. 1 and 2).

Flexible tube 218 extends through hole 332 (FIG. 26) into the housing cavity 320. Cables 328, 330 from the illumination source 230 and the pump 54 also extend into the housing cavity 320 through holes 333, 334 (FIG. 26) and receive power from the control cable 62 because they are connected to a power distribution block 336. Power received by the controller 58 is provided to the power distribution block 336 and then to the imaging device controller 324, the illumination source 230, and the pump 54. In one configuration, when the controller 58 is in the off-state, the imaging device controller 324 and the illumination source 230 are powered, with the illumination source 230 turned on to illuminate the chamber 192. The imaging device controller 324 is not activated to commence image capture and/or video streaming at that time, but it would be understood that such image capture and/or video streaming could occur at the same time as powering of the illumination source 230.

Powering of the imaging device controller 324, but not commencing image capture and/or video streaming (which occurs through pressing the button or switch 326) even in the off-state, i.e., a state in which the imaging device controller 324 is not activated to commence image capture and/or video streaming, allows for charging of an internal or backup battery of the imaging device controller 324 so the system 8 can be used unconnected to mains power. When the pump 54 has a battery backup that battery can be charged when the controller 58 is in the off-state.

When the controller 58 is switched to either of the steady state or the pulsating state, i.e., when the switch 68 is operated, the pump 54 is powdered and begins to circulate liquid. In this particular configuration, the imaging device controller 324 is not activated to commence image capture and/or video streaming, but it would be understood that such image capture and/or streaming can occur at the time the controller 58 is switched from the off-state. Instead, in this configuration, the imaging device controller 324 is not activated until the button or switch 326 is manipulated to activate the imaging device 210 and create a wireless connection, for instance, with the image viewing assembly 14. With the wireless connection image capture and/or video streaming occur, and the images and/or video is presented on the image viewing assembly 14.

Figure 28:
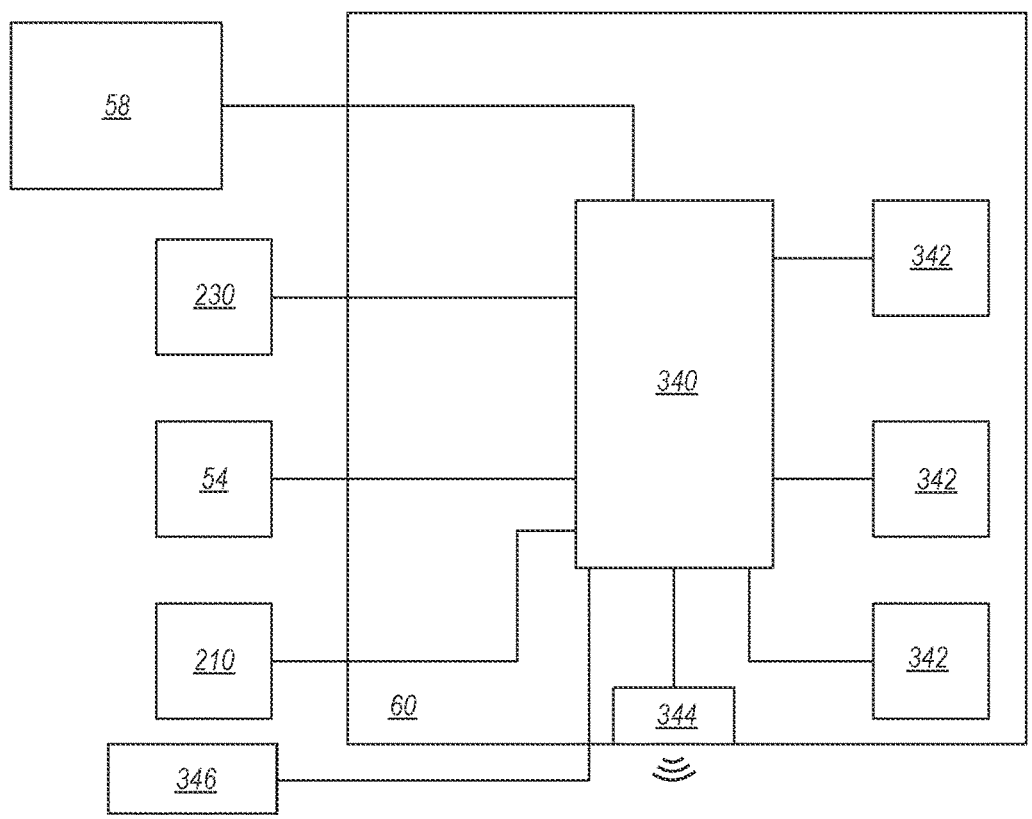
FIG. 28 illustrates a schematic representation of other electricals and control connections of the model assembly, according to one embodiment of the invention.

It will be understood by those skilled in the art that various combinations of powering and activating the imaging device controller 324, the illumination source 230, and the pump 54 can be achieved. For instance, and as schematically illustrated in FIG. 28, power can be provided to a model controller 340 in the control housing 60 that controls all operations of the model assembly 50, including making a connection with the image viewing device 14. Such a system is schematically illustrated in FIG. 28. As shown, the model controller 340 can wirelessly communicate with the image viewing device 14, such as through a wireless transmitter/receiver 344, it can control the operations of the pump 54, the illumination source 230, and the imaging device 210, and can receive instructions or signals from the controller 58. The control housing 60, therefore, can optionally include individual switches 342 to operate each of the pump 54, the imaging device 210, and the illumination source 230 independently. The model controller 340 can include operational modules or components to achieve the operation. Alternatively, the model controller 340 can also include operational modules that allow a user to operate a switch or button to automatically sequentially power and operate the illumination source 230, the imaging device 210, and the pump 54. It would be understood that any order of powering or operating the illumination source 230, the imaging device 210, and the pump 54 is possible.

In still another configuration, the model controller 340 could include operational modules to automatically place the illumination source 230, the imaging device 210, and the pump 54 in a state to provide either the arterial flow or the venous flow. This can be achieved by using an electromechanical actuator 346 operated by the model controller 340 instead of the mechanically operated check valve 260. In this way, the controller 58 would not only activate the pump 54 but also change a pressure to generate the specific arterial or venous pressure.

The schematic illustration of portions of the system 8 described here can be consider as representations of functional modules or components to perform particular operations. Generally, the operation modules described herein may refer to software objects or routines that execute on a special purpose processing device to perform a certain function or group of functions. In at least some instances, a hardware processor is provided that is operable to carry out executable instructions for performing a method or process, such as the methods and processes disclosed herein. It is contemplated that implementations in hardware or a combination of software and hardware are possible. For instance, the controllers, models, actuators, etc. described herein may include the use of computer hardware or software modules. Such hardware and software modules or structures may include a processor and computer storage media carrying instructions that, when executed by the processor and/or caused to be executed by the processor, perform any one or more of the methods disclosed herein, or any part(s) of any method disclosed. By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Figure 29:
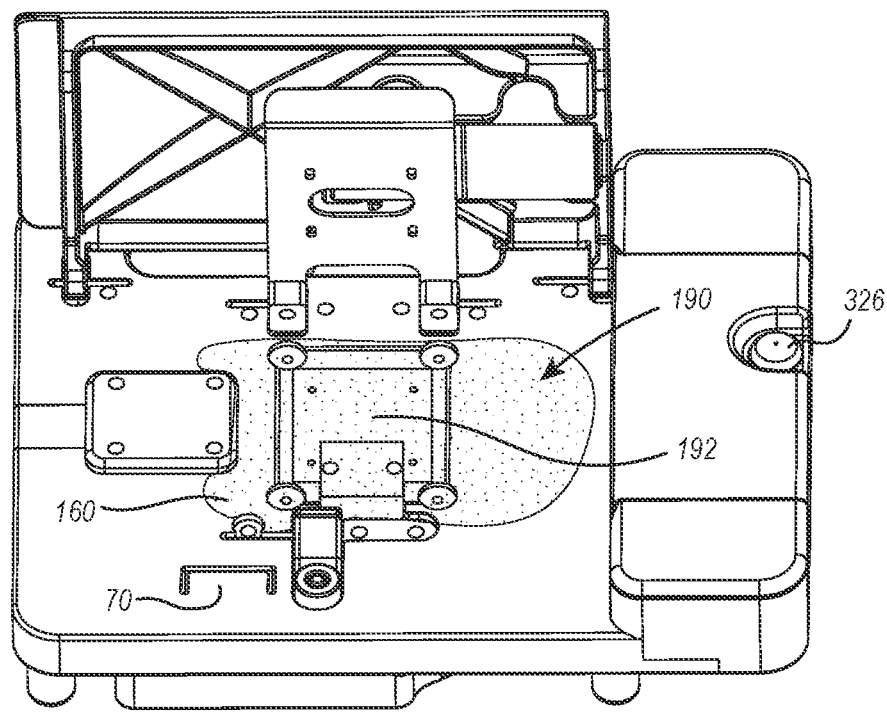
FIG. 29 illustrates a plan view of the model assembly with the flow paths primed with liquid, according to one embodiment of the invention.

A method of using the system 8 will now be described. Initially, the system 8 is positioned where the training is to occur, such as illustrated in FIG. 2. The upper cover 80 is moved to provide access to the mounting region 160, such as illustrated in FIG. 29 (which illustrates the system 8 without the liquid storage container 52, but provides a representation of the liquid). When the power assembly 30 is connected to the controller 58, the illumination source 230 is lit to illuminate the chamber 192 and mounting region 160. This can be verified by opening the upper cover 80 and the fixation member 140.

With illumination source 230 illuminated, a user can operate the button or switch 326 to activate or turn on the imaging device 210. In one configuration, the user can hold the switch 326 for 1-2 seconds to activate the imaging device 210. Once a wireless connection is achieved between the image viewing device 14 and the imaging device controller 324, which can optionally include selecting the imaging device 210 from available wireless enabled devices on a menu of the image viewing device 14 and entering a password, the imaging device 210 can be tested for real-time video streaming of the chamber 192 and port 190.

Once the imaging device 210 and the illumination source 230 are ready for use, a user can prepare a remainder of the model assembly 50 for use. Note, the imaging device does not need to be turned on first, and the model can also be used without imaging. A user can fill the liquid storage container 52 with liquid up to or covering the fill level plateau 134. With liquid at the desired level, the controller 58 and/or the pressure controller 70 can be activated to prime the flow paths and verify liquid flow through the chamber 192 and the port 190, as illustrated in FIG. 29. To test for arterial flow, and prime the flow paths, the user can manipulate the pressure controller 58 to the "A" position and the switch 68 is moved to "Pulse." Alternatively, or in addition to verifying the arterial flow, to test for venous flow, and prime the flow paths, the use can manipulate the pressure controller 70 to the "V" position and the switch 68 is moved to the "steady." Flow of the liquid can be identified by ripples forming on the liquid surface, the liquid being schematically illustrated in FIGS. 29-32.

Figure 30:
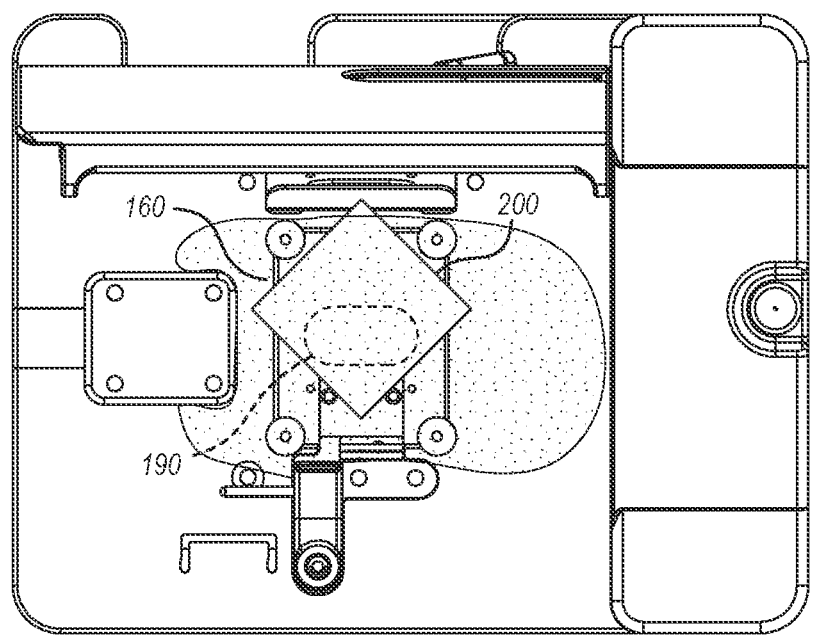
FIG. 30 illustrates a plan view of the model assembly with a flexible member mounted to over a port, according to one embodiment of the invention.
Figure 31:
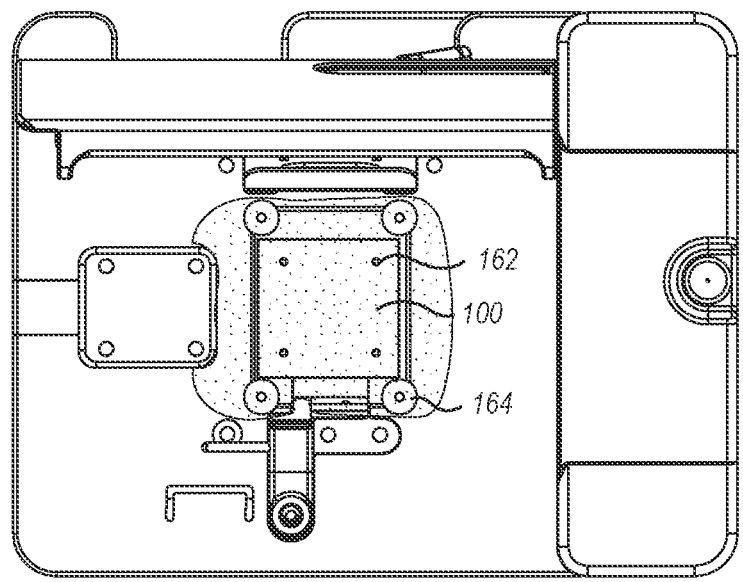
FIG. 31 illustrates a plan view of the model assembly with an anatomical simulant mounted over a flexible member mounted over a port, according to one embodiment of the invention.
Figure 32:
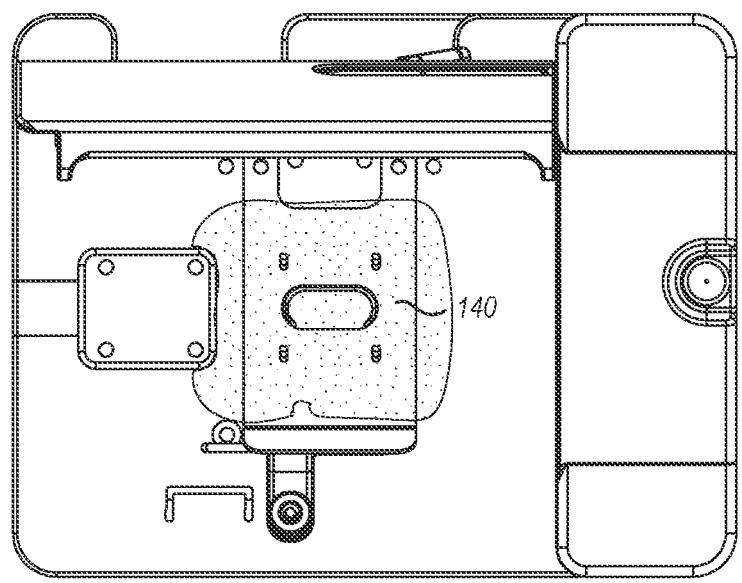
FIG. 32 illustrates a plan view of the model assembly within a fixation member disposed over the anatomical simulant, according to one embodiment of the invention.

With the model assembly 50 primed and tested, it is possible for a user to position the anatomical simulant 100 in the mounting region 160. As illustrated in FIGS. 30-32, the flexible member 200 is first placed over the port 190 in the mounting region 160. The flexible member 200 covers and seals the port 190. The flexible member 200 can be placed with sides generally parallel to the long sides of the port 190 or inclined relative to the long sides, such as diagonally. Next, the anatomical simulant 100 is placed over the securing pins 162 with them being received in the holes. Finally, the fixation member 140 is lowered to secure the anatomical simulant 100, with the fixation member 140 being maintained in place by the magnets 164 acting as one example of a locking mechanism.

Following anatomical simulant 100 positioning, the pump 54 can turned-on and the flow viewed on the image viewing device 14. In the event that air bubbles are present in the flow, the user can operate the fixation member release lever 170 to reduce the downward pressure of the fixation member 140. Releasing the pressure allows the air bubbles to migrate from below the flexible member 200 and the anatomical simulant 100.

Figure 33:
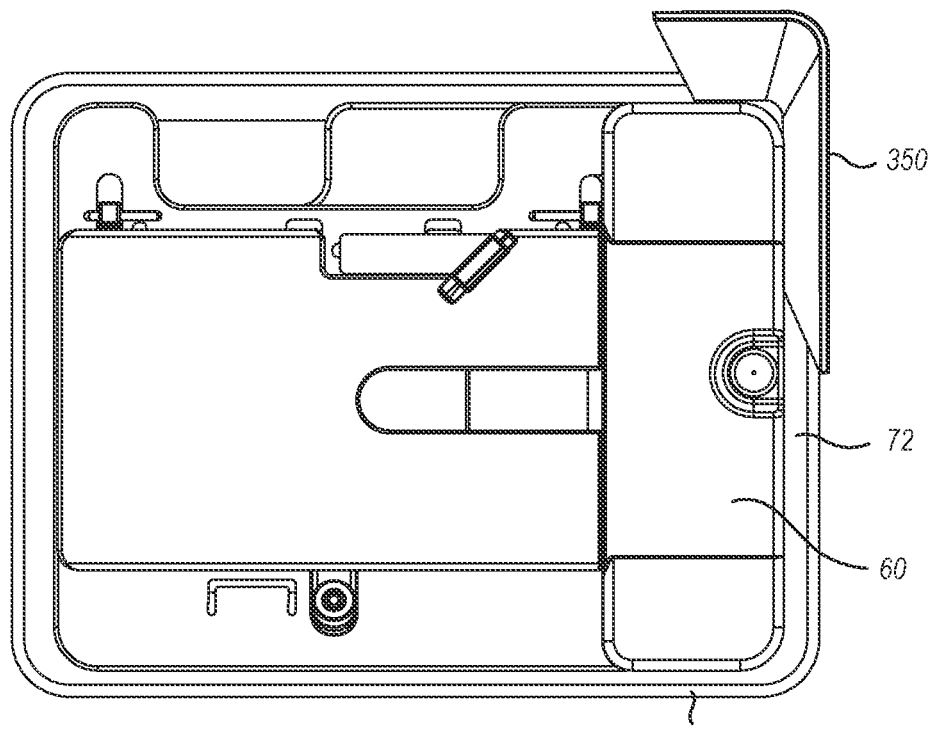
FIG. 33 illustrates a plan view of the model assembly with a liquid guard, according to one embodiment of the invention.
Figure 34:
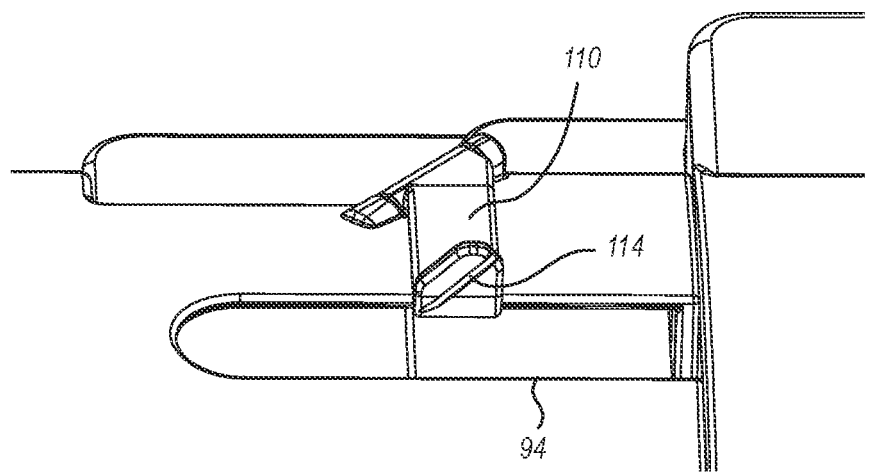
FIG. 34 illustrates a partial view of the model assembly with a needle guide in a deployed state, according to one embodiment of the invention.
Figure 35:
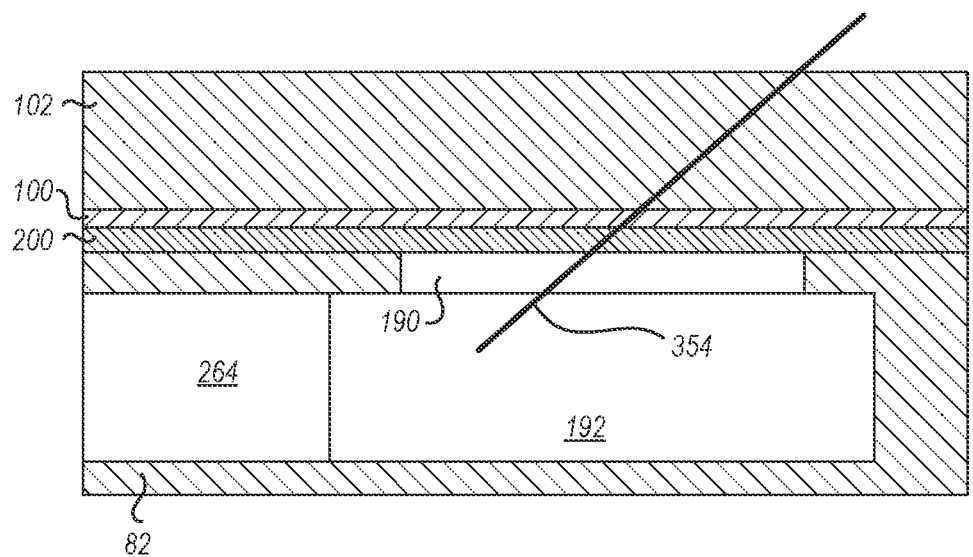
FIG. 35 illustrates a cross-sectional view of a portion of the model assembly with a needle disposed through a port and into a chamber, according to one embodiment.
Figure 51:
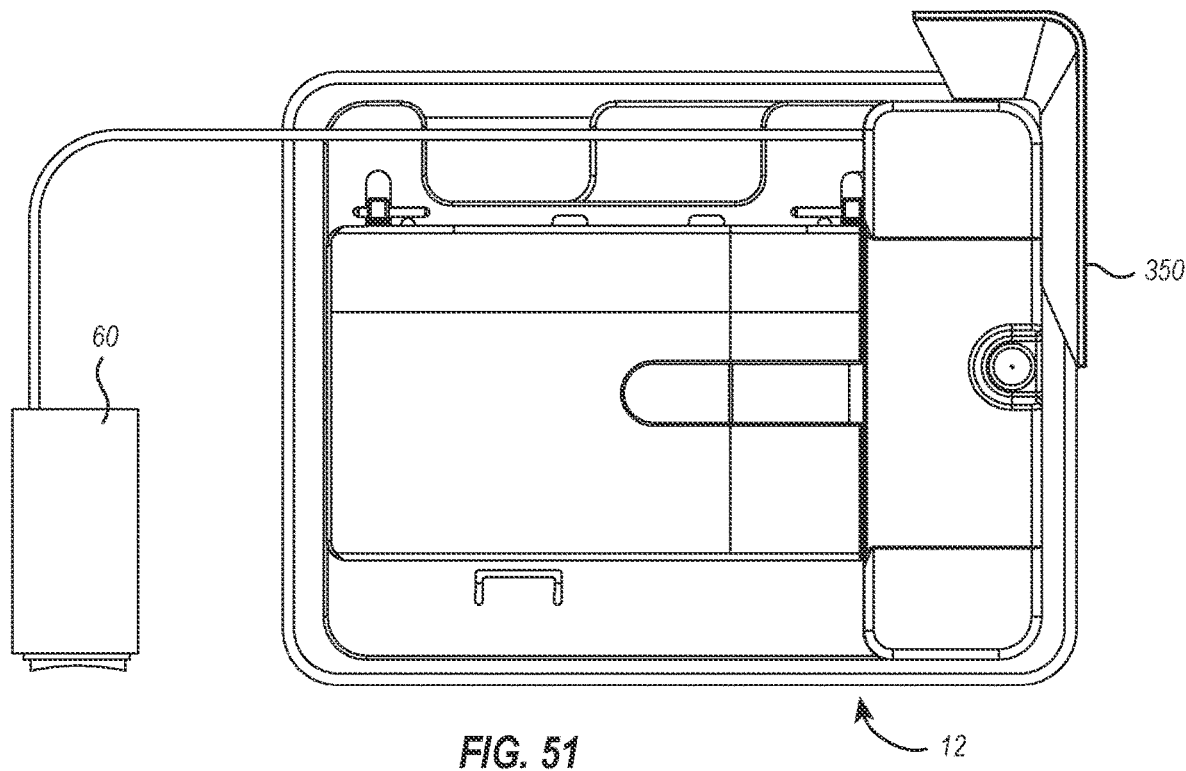
FIG. 51 illustrates a perspective view of another training model assembly having a guard, according to one embodiment of the invention.
Figure 52:
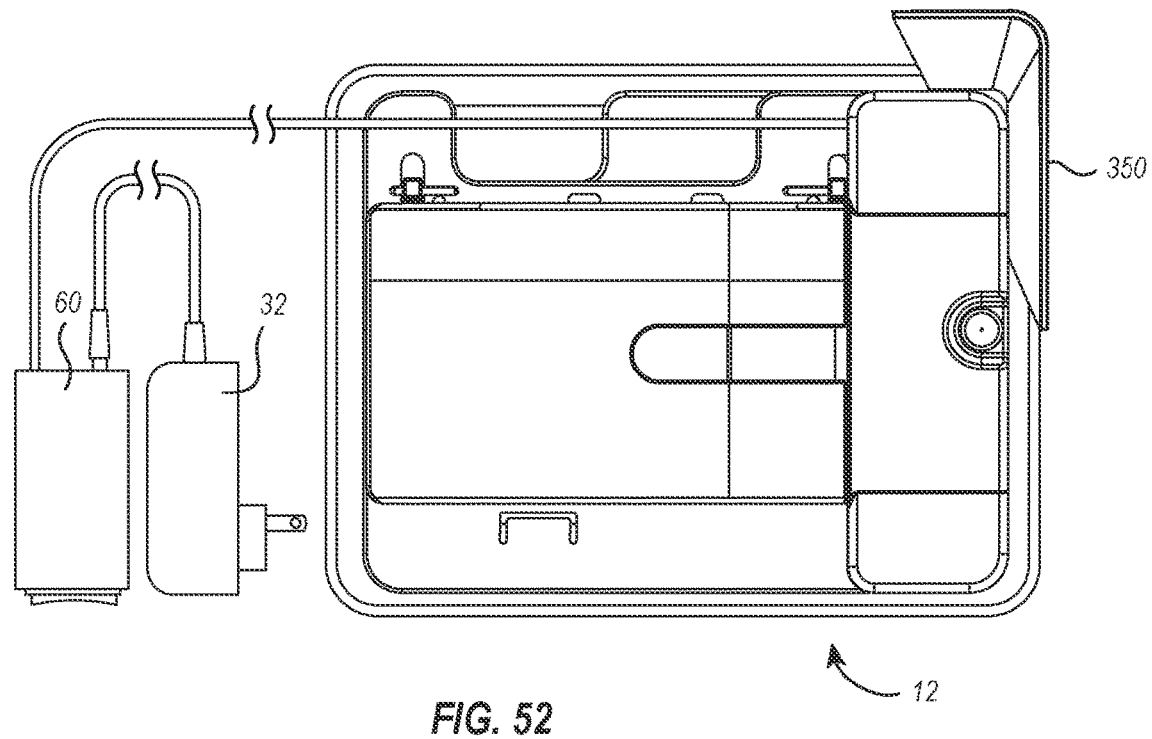
FIG. 52 illustrates a perspective view of another training model assembly having a guard and a power assembly connected to a hand-held controller, according to one embodiment of the invention.
Figure 53:
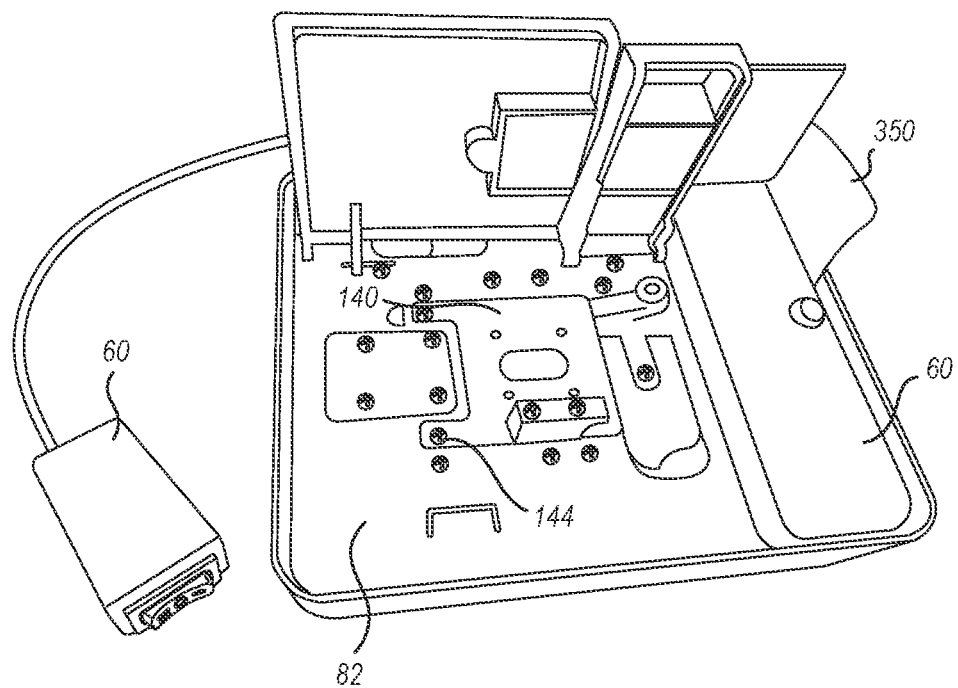
FIG. 53 illustrates a perspective view of another training model assembly having a guard and a fixation member configured in an alternative direction, according to one embodiment of the invention.
Figure 54:
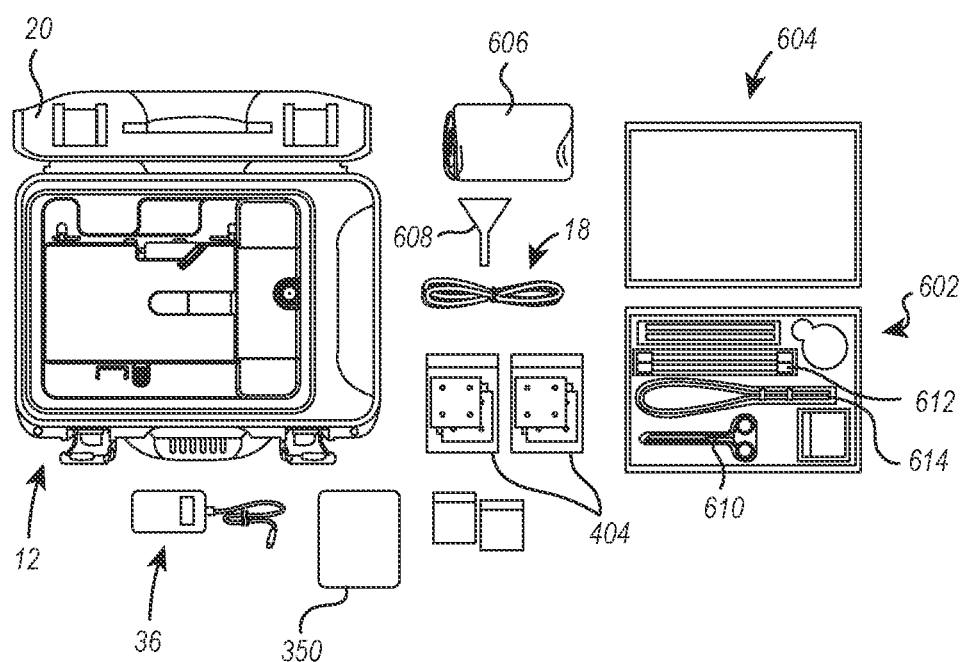
FIG. 54 illustrates a perspective view of another training model assembly having a case and a tray configured to store additional and/or different components and structures, according to one embodiment of the invention.
Figure 55:
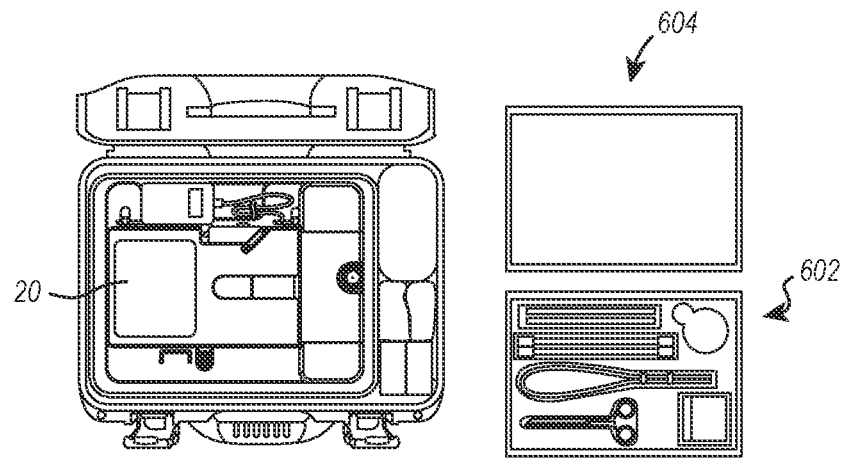
FIG. 55 illustrates a perspective view of another training model assembly including different components and structures stored in a case or a tray, where a lid of the case and a lid of the tray are both open, according to one embodiment of the invention.
Figure 56:
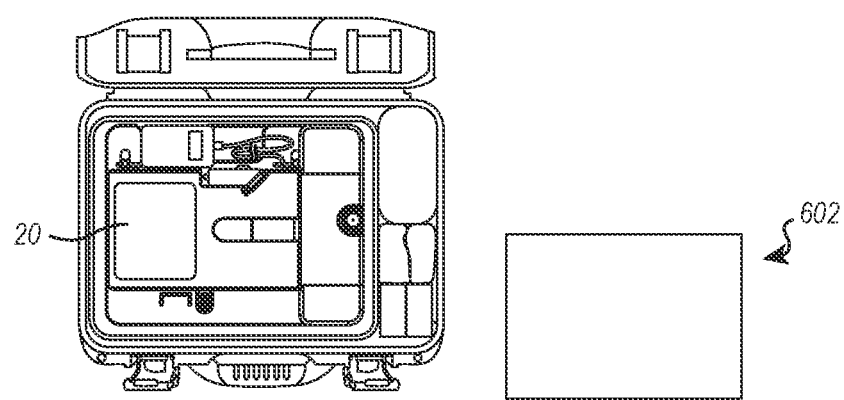
FIG. 56 illustrates a perspective view of another training model assembly including different components and structures stored in a case or a tray, where a lid of the case is open, and a lid of the tray is closed, according to one embodiment of the invention.
Figure 57:
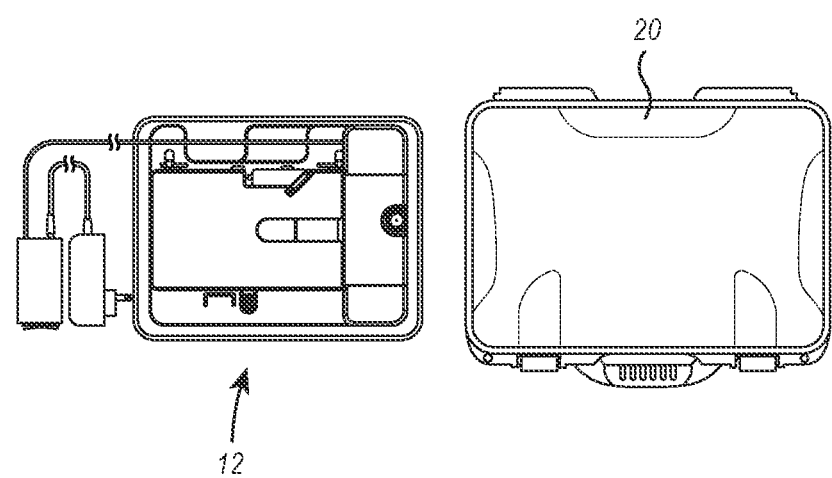
FIG. 57 illustrates a perspective view of another training model assembly having a control and a power supply, configured to fit into a case, according to one embodiment of the invention.

After the air bubbles, if any, are removed from around the flexible member 200 and the anatomical simulant 100, the upper cover 80 can be closed ready for user training, as illustrated in FIG. 33. Depending upon the particular circumstance and procedure to be performed, a liquid guard 350 can be positioned in the gap 72 between the control housing 60 and the liquid storage container 52, as illustrated in FIGS. 33 and 51-52. For example, the liquid guard 350 in FIG. 33 is much larger than the liquid guard 350 in FIGS. 51-52. Generally, when a greater the pressure is set, a larger liquid guard 350 is preferably used. Further, the needle guide 110 can be moved from the storage position to the operational position in which the needle guide channel 114 is positioned over the cover inlet 94 and the through hole 148, as illustrated in FIG. 34. Following needle puncture of the anatomical simulant 100 and the flexible member 200, as illustrated in FIG. 35 which illustrates a needle 354 passing through the port 190 and into the chamber 192, before or after placement of a guidewire through the anatomical simulant 100, the flexible member 200 the needle guide 110 can be rotated to the storage position.

Figure 36:
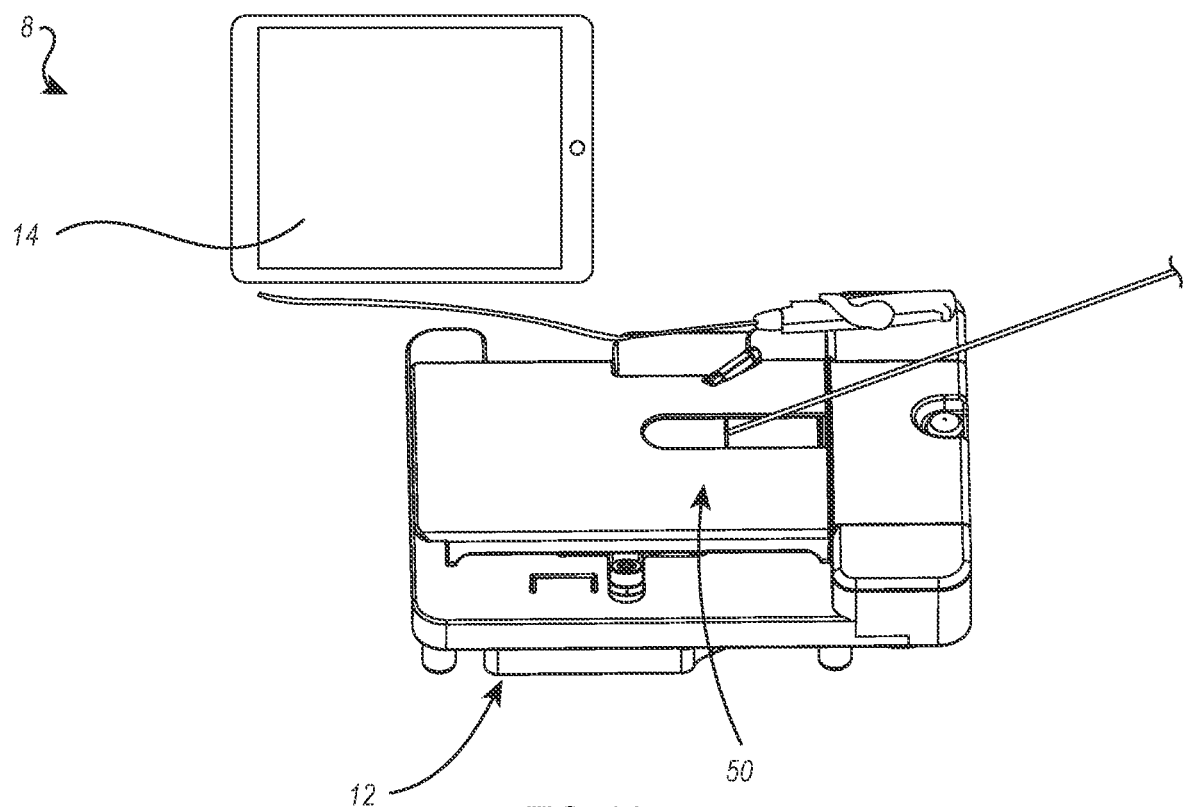
FIG. 36 illustrates a perspective view of the model assembly in use with a guidewire disposed through an inlet of an upper cover, according to one embodiment of the invention.
Figure 37:
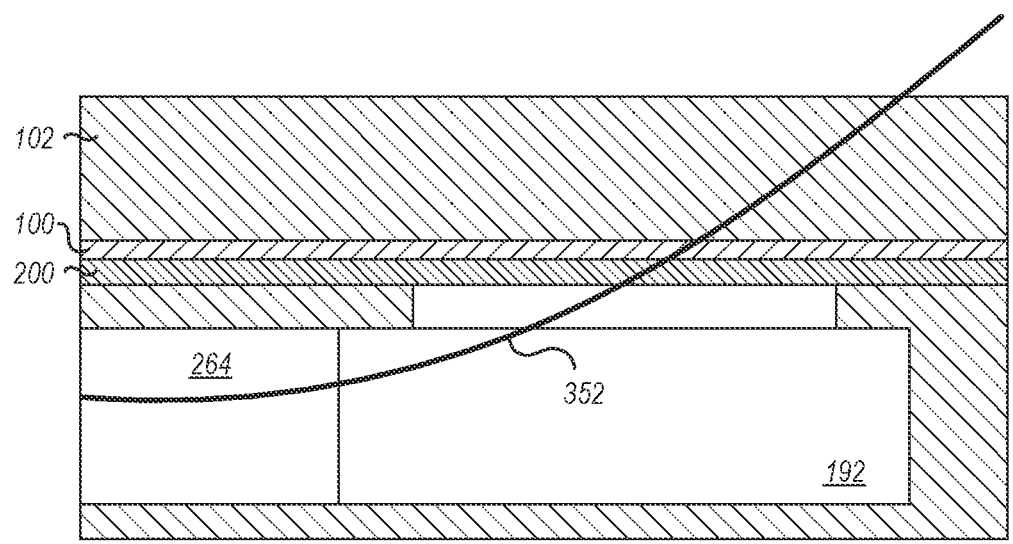
FIG. 37 illustrates a cross-sectional view of a portion of the model assembly with a guidewire disposed through a port and into a chamber, according to one embodiment of the invention.
Figure 38:
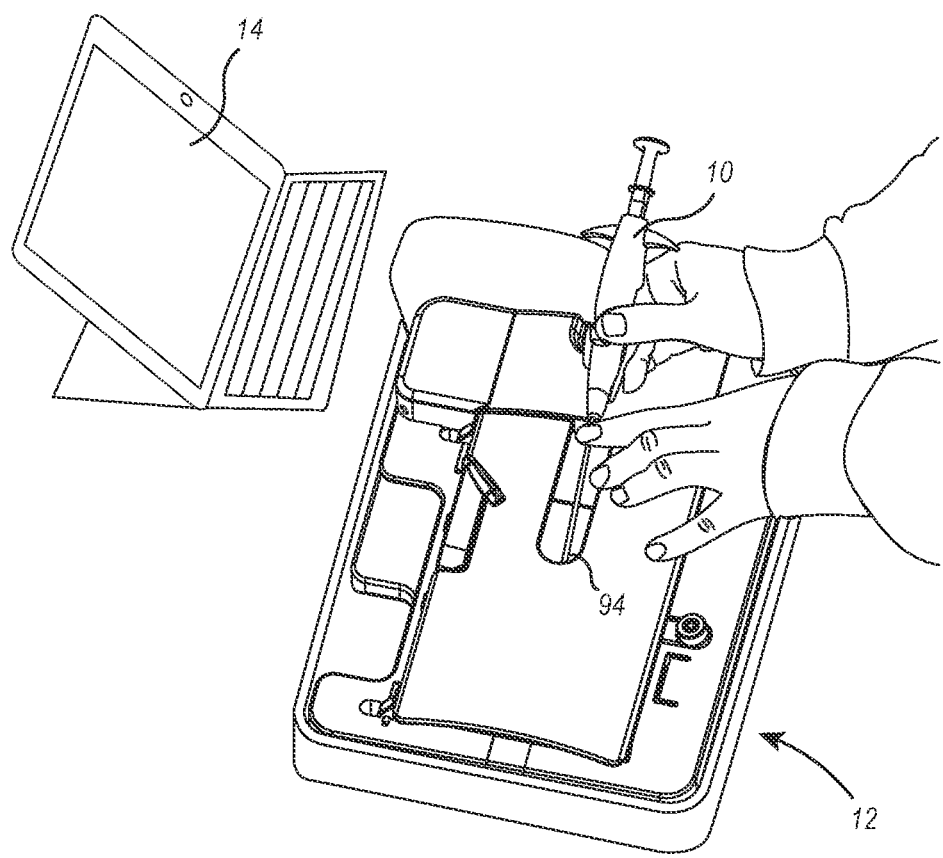
FIG. 38 illustrates a perspective view of the model assembly in use with a medical device disposed through an inlet of an upper cover, according to one embodiment of the invention.
Figure 58:
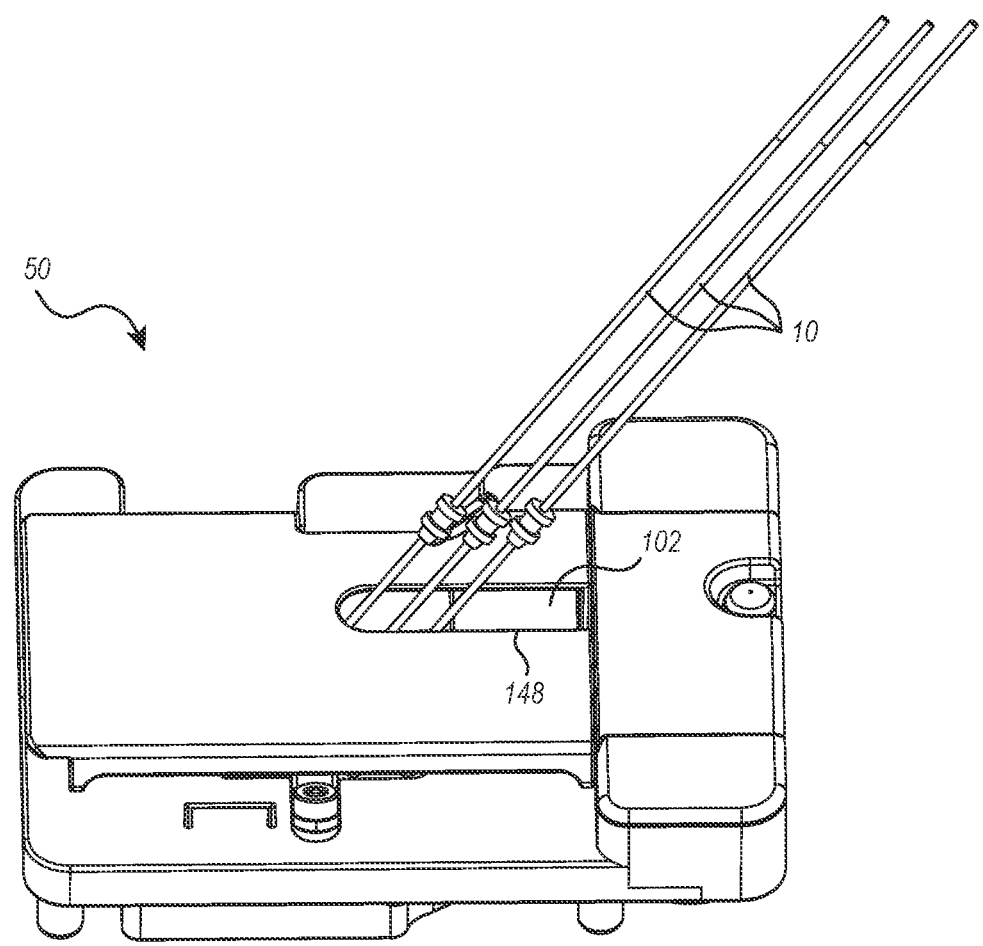
FIG. 58 illustrates a perspective view of another training model assembly in use with multiple introducer sheaths and guidewires extending through a cover inlet, according to one embodiment of the invention.
Figure 59:
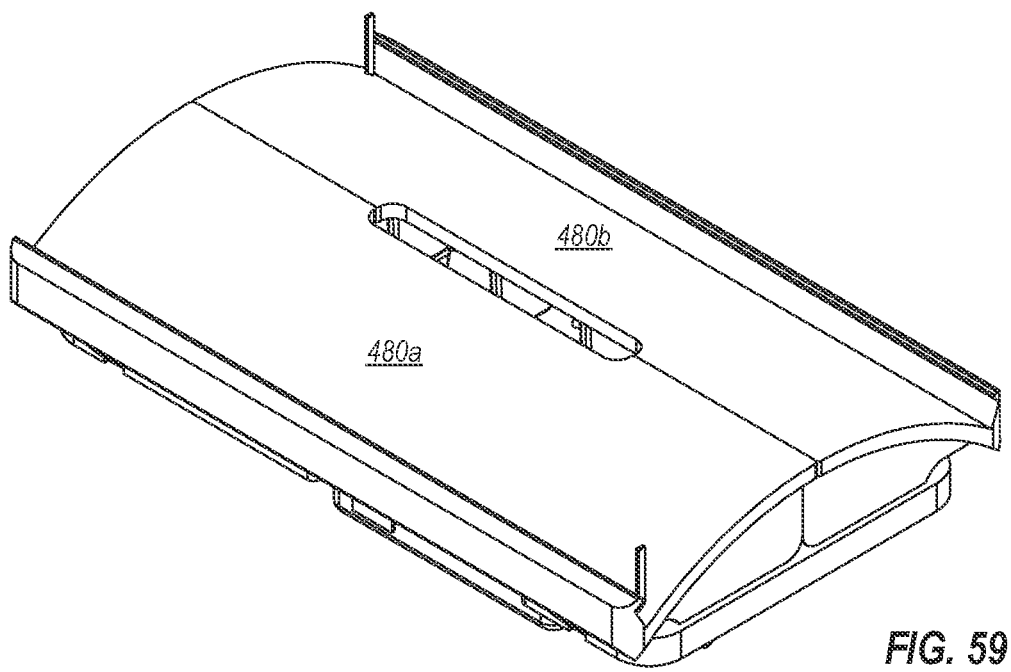
FIG. 59 illustrates a perspective view of another training model assembly having alternate upper covers, where the alternate upper covers are shut, according to one embodiment of the invention.
Figure 60:
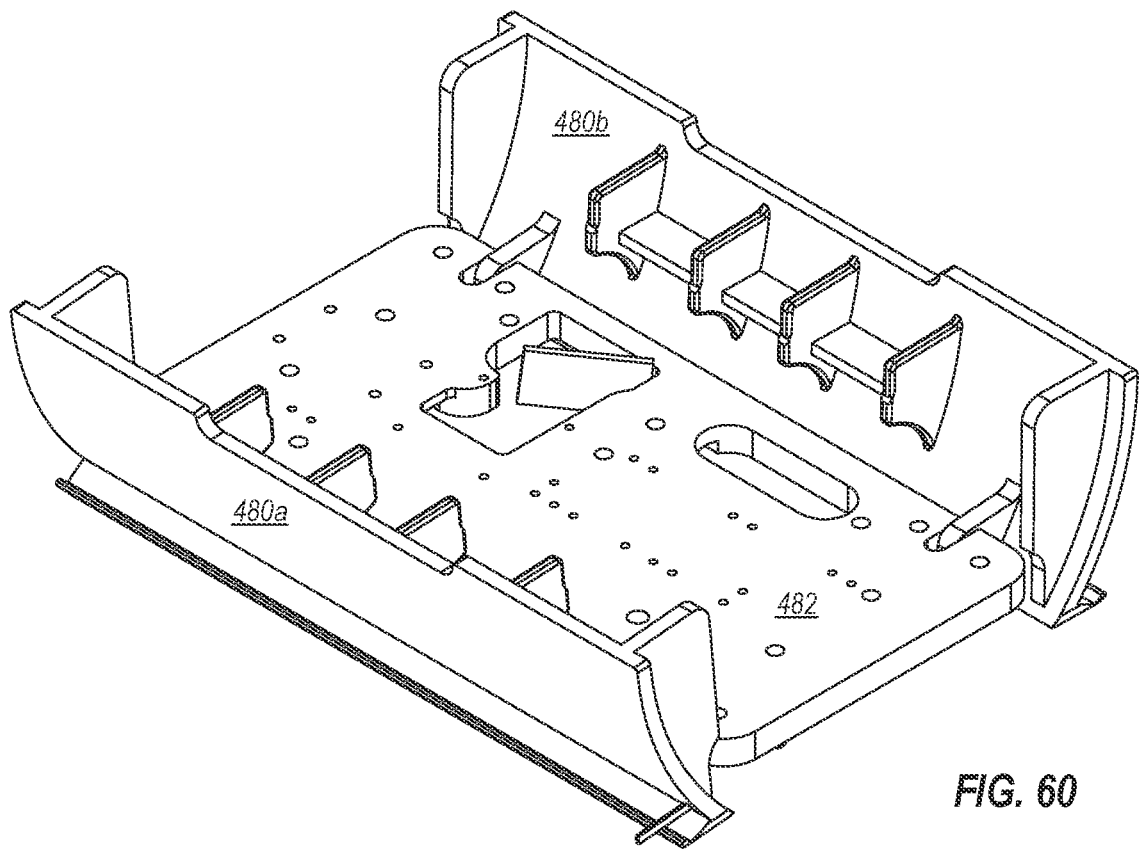
FIG. 60 illustrates a perspective view of another training model assembly having alternate upper covers, where the alternate upper covers are open, according to one embodiment of the invention.
Figure 61:
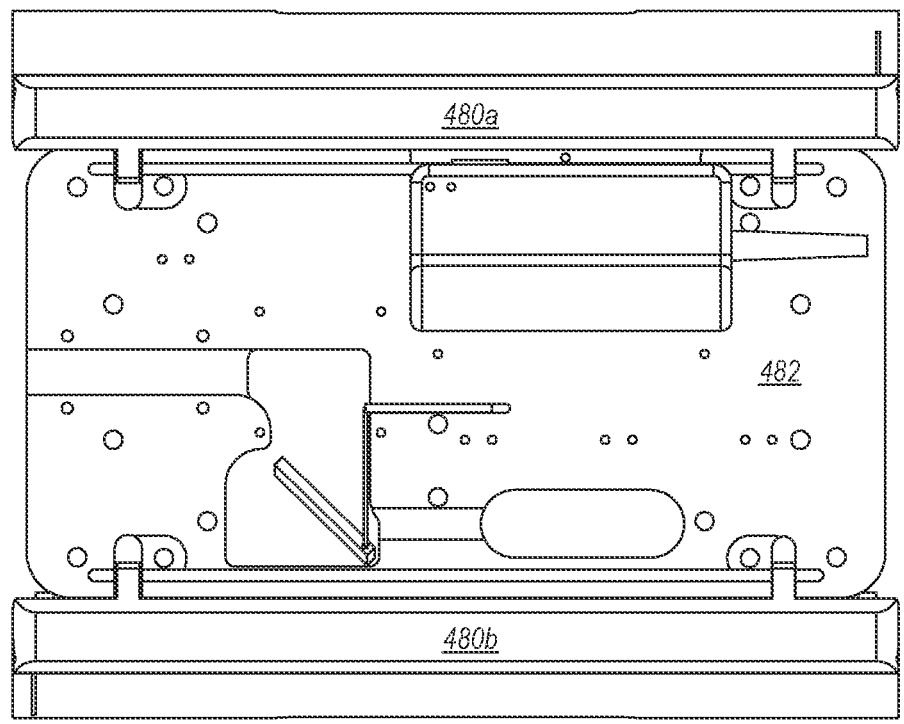
FIG. 61 illustrates a bottom view of another training model assembly, according to one embodiment of the invention.
Figure 62:
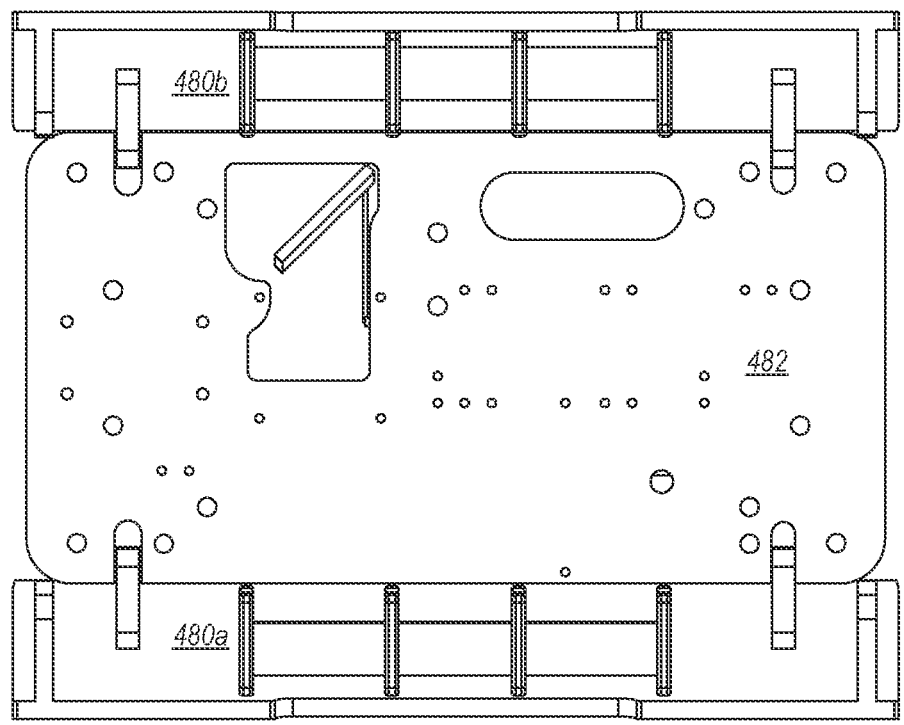
FIG. 62 illustrates a top view of another training model assembly having alternate upper covers, where the alternative covers are open, according to one embodiment of the invention.

As illustrated in FIGS. 36 and 37, a guidewire 352 extends from the cover inlet 94 and the through hole 148 in one direction, with a remainder of the guidewire 352 passing through the anatomical simulant 100 so a distal end of the guidewire 352 extends through the chamber 192 and into the guide chamber 264, to terminate in the first conduit 256. With the guidewire 352 in place, the user can advance the medical device 10, such as a closure device, along the guidewire 352 using either an "over-the-wire" or rapid-exchange technique. As the user advances the medical device 10, they may view advancement progress using the image viewing device 14, as illustrated in FIG. 38. The user can continue to visualize the progress and subsequent deployment and access closure using the image viewing device 14 and optional viewing through the inlet 94. Note, even though as illustrated in FIGS. 36-38, only one guidewire 352 or a single medical device is inserted into the through hole 148, the training system 12 is not limited to be used in these circumstances. In some cases, multiple medical devices may be simultaneously used and inserted into the through hole 148. For example, FIG. 58 illustrates an example of embodiment, in which multiple introducer sheaths and guidewires are inserted into the through hole 148 and inserted through the anatomical simulant therein.

To increase closure difficulty, the block structures 102 can be disposed to close the inlet 94 to limit viewing the anatomical simulant 100 directly, thereby encouraging the user to rely on the image viewing device 14. Training modes using the system 8 can be varied to increase or decrease the difficulty. For instance, difficulty can range from an easier mode, an intermediate mode, and a difficult mode, with the option for various alternate modes. In the easier mode, the imaging device 210 is operational, images are displayed in the image viewing device 14, and the block structures 102 are removed so the anatomical simulant 100 is viewable. In the intermediate mode, the imaging device 210 is operational, images are displayed in the image viewing device 14, and the block structures 102 are mounted to obscure the anatomical simulant 100. In the difficult mode, the imaging device 210 is not operational and/or there are no images displayed in the image viewing device 14, and the block structures 102 are mounted to obscure the anatomical simulant 100.

Once the training is complete, and the medical device 10 is removed, the guidewire 352 can be removed from the anatomical simulant 100 and the flexible member 200, and the anatomical simulant 100 and the flexible member 200 can be removed. The switch 326 can be pushed or operated to turn-off the imaging device 210 and disconnect the imaging device controller 324 from the wireless connection with the image viewing device 14. The model support assembly 56, with the control housing 60, can be removed from the liquid storage container 52, the liquid drained from the model support assembly 56 and the control housing 60, and the liquid poured from the liquid storage container 52. The components of the model assembly 50 are then dried and cleaned, before repacking of the model assembly 50 and the power assembly 30 back into the case 20. Other accessories that do not fit within the case 20 can be stored in the separate container or bag (e.g., a tray 604 of FIGS. 54-56) for subsequent transportation and use.

The previous discussion has been directed to a system, such as a training system or medical device training system, in which the training environment is a "wet" environment having a liquid to simulate bodily fluids. The system of the present invention is not so limited. For instance, when the pump is selectively operated, it is possible to activate the illumination source and the imaging device without activating the pump using the controller assembly. In such a situation, the user can be trained in a "dry" environment with a liquid to simulate bodily fluids. For a "dry" environment, the model assembly can be removed from the liquid storage container or the system need not include the liquid storage container. In still other systems adapted for a "dry" environment, the model assembly need not include a pump or associated control components.

While reference has been made to the system having the particular configuration illustrated in FIGS. 1-38, it will be understood that there are various other configurations contemplated by the disclosure presented herein. For instance, and not by way of limitations, instead of a single upper cover, systems of the present invention can include an upper cover formed of multiple cover portions that are independently movable one to another. Those cover portions can be pivot on the same or opposite sides of the model assembly, or the model lower support, and can optionally form the through hole from the different cover portions. The block structures that block the through hole can be disposed in one or more of the cover portions.

While reference is made to use of the system with a single medical device, it will be understood that the training system is not so limited. In other configurations, the system can accommodate simultaneously or sequentially positioned medical devices through the anatomical simulant. The system described can be modified with larger and/or more elongate inlet, through holes, etc. to accommodate for such a configuration. Additionally, instead of a single anatomical simulant, the mounting region can accommodate a plurality of anatomical simulants positioned adjacent to each other in a direction parallel to or transverse to the short side of the liquid storage container. In such cases, or optionally when only a single anatomical simulant is mounted, a plurality of imaging devices and/or illumination sources can also be used.

Turning to FIGS. 39-45 illustrated is another embodiment of a model assembly 450 according to the present invention. Many of the features and structures of the model assembly 50 of FIGS. 1-39 are applicable to the model assembly 450. For instance, the model assembly 450 can replace the model assembly 50 of the system 8 described herein. As such, like structures will be identified with like reference numeral and the discussion of model assembly 50, and more generally the system 8, are applicable to the model assembly 450, and vice versa. Additionally, the following discussion will emphasize differences between the model assembly 450 and the model assembly 50, understanding that structures, components, and/or features from system 8, such as but not limited to the image viewing device 14, the case 20, the power assembly 30, and the model assembly 50.

Figure 39:
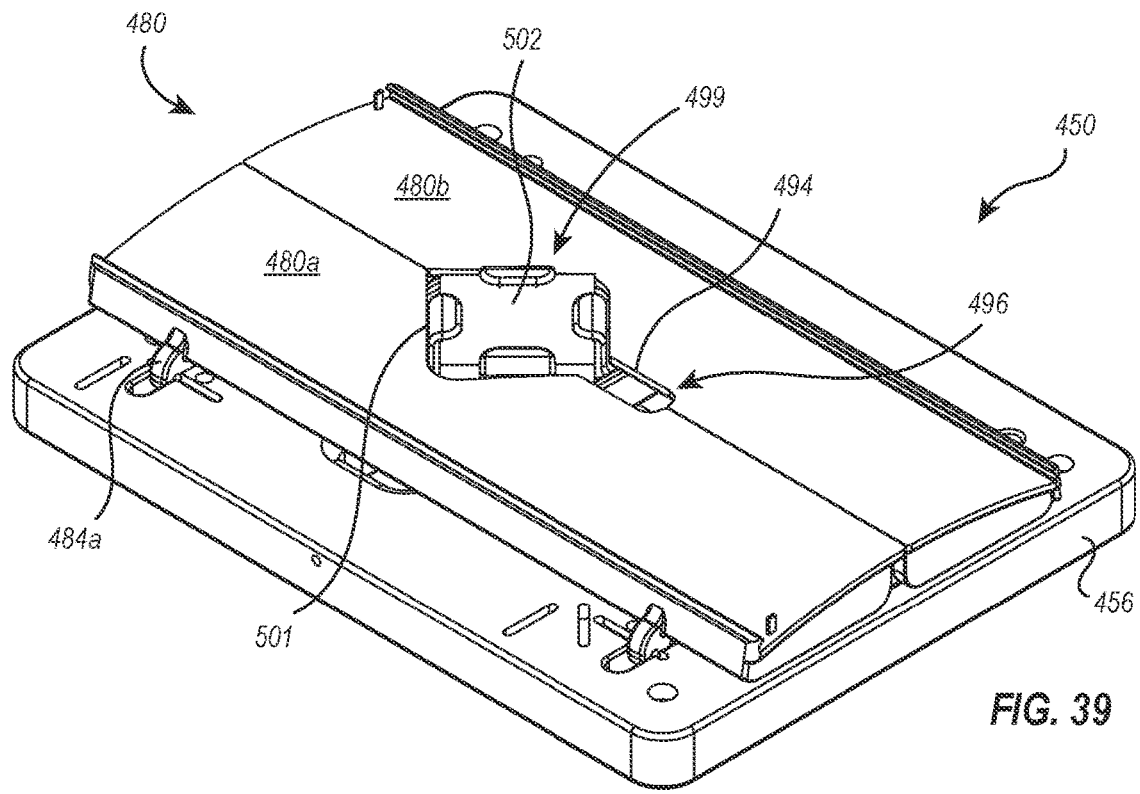
FIG. 39 illustrates a perspective view of another model assembly removed from a liquid storage container with an upper cover in a closed state, according to one embodiment of the invention.
Figure 40:
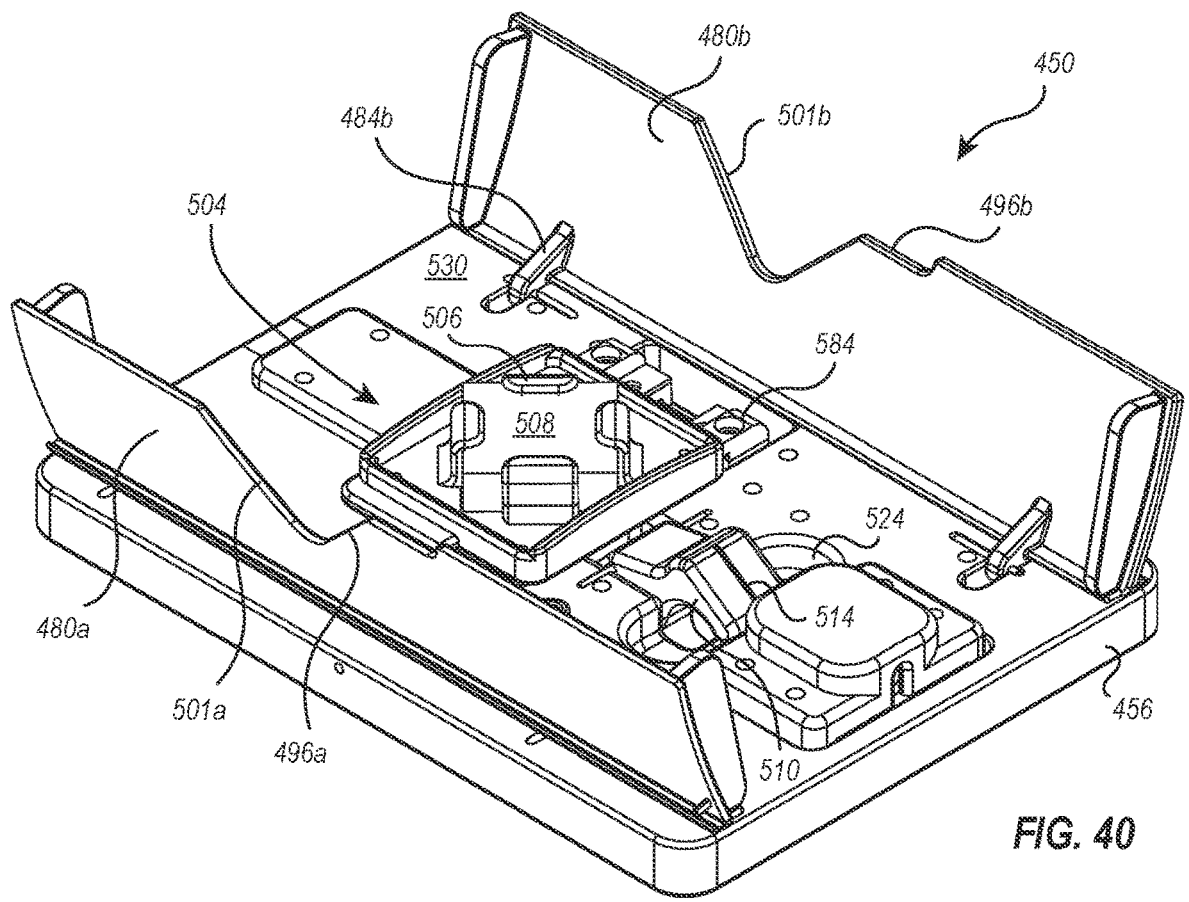
FIG. 40 illustrates a perspective view of another model assembly removed from a liquid storage container with an upper cover in an open state, according to one embodiment of the invention.

As illustrated in FIGS. 39 and 40, the model assembly 450 includes an upper cover 480 that is pivotally mounted to a lower support 482. In contrast to the model assembly 50, the cover 480 includes a first cover portion 480*a* and a second cover portion 480*b* that collectively form the cover inlet 494, while opening in opposite directions one from another about two hinge positions 484*a* and 484*b*. The cover inlet 494 has a first end 496 similar to the cover inlet 94. However, a second end 499 includes a block structure opening 501 to accommodate a block structure 502. The second end 499, as illustrated in FIGS. 39 and 40 is formed by a first block structure opening portion 501*a* formed in the first cover portion 480*a* and a second block structure opening portion 501*a* formed in the second cover portion 480*b*. The first end 496 also includes a first end portions 496*a*, 496*b* formed in, respectively, the first cover portion 480*a* the second cover portion 480*b*.

Figure 41:
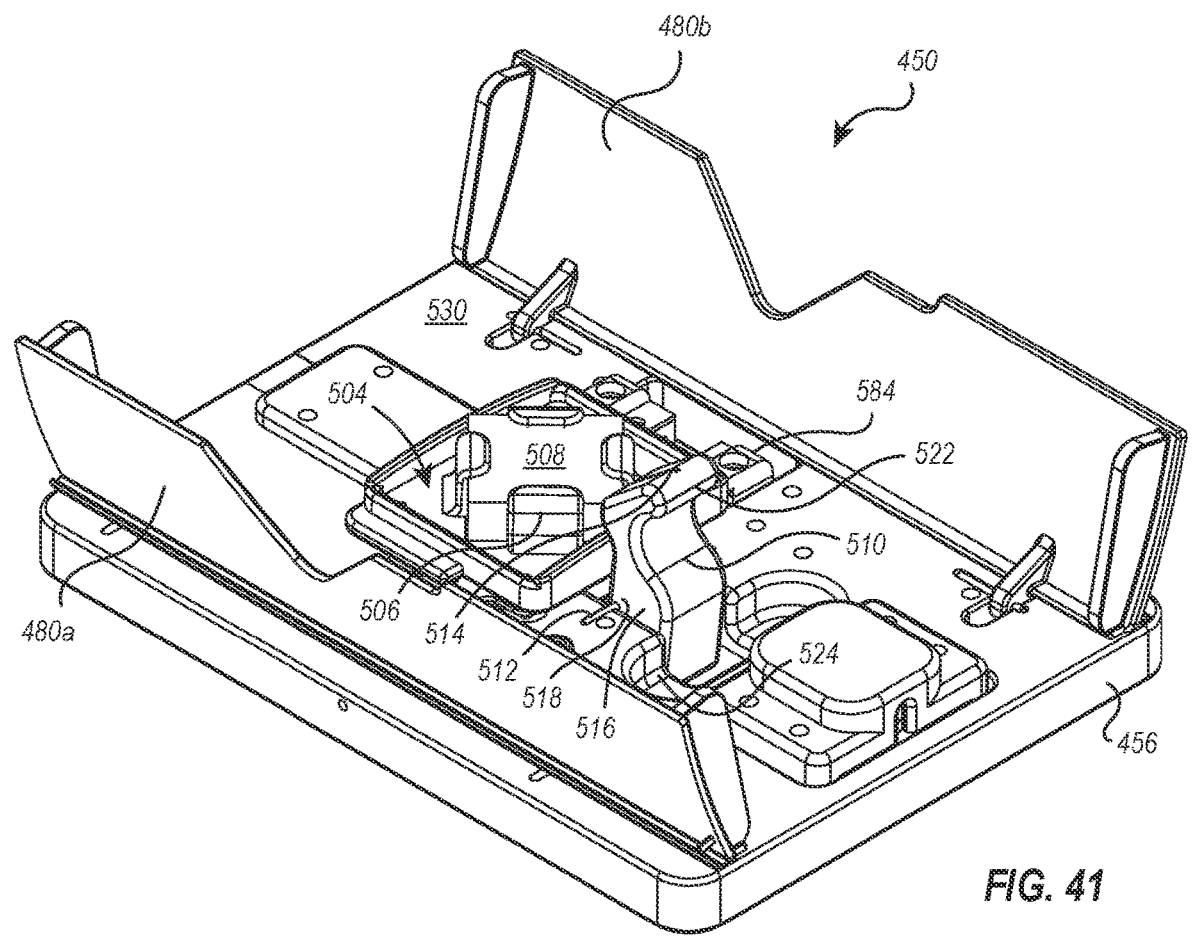
FIG. 41 illustrates a perspective view of another model assembly removed from a liquid storage container with a needle guide in a deployed state, according to one embodiment of the invention.
Figure 42:
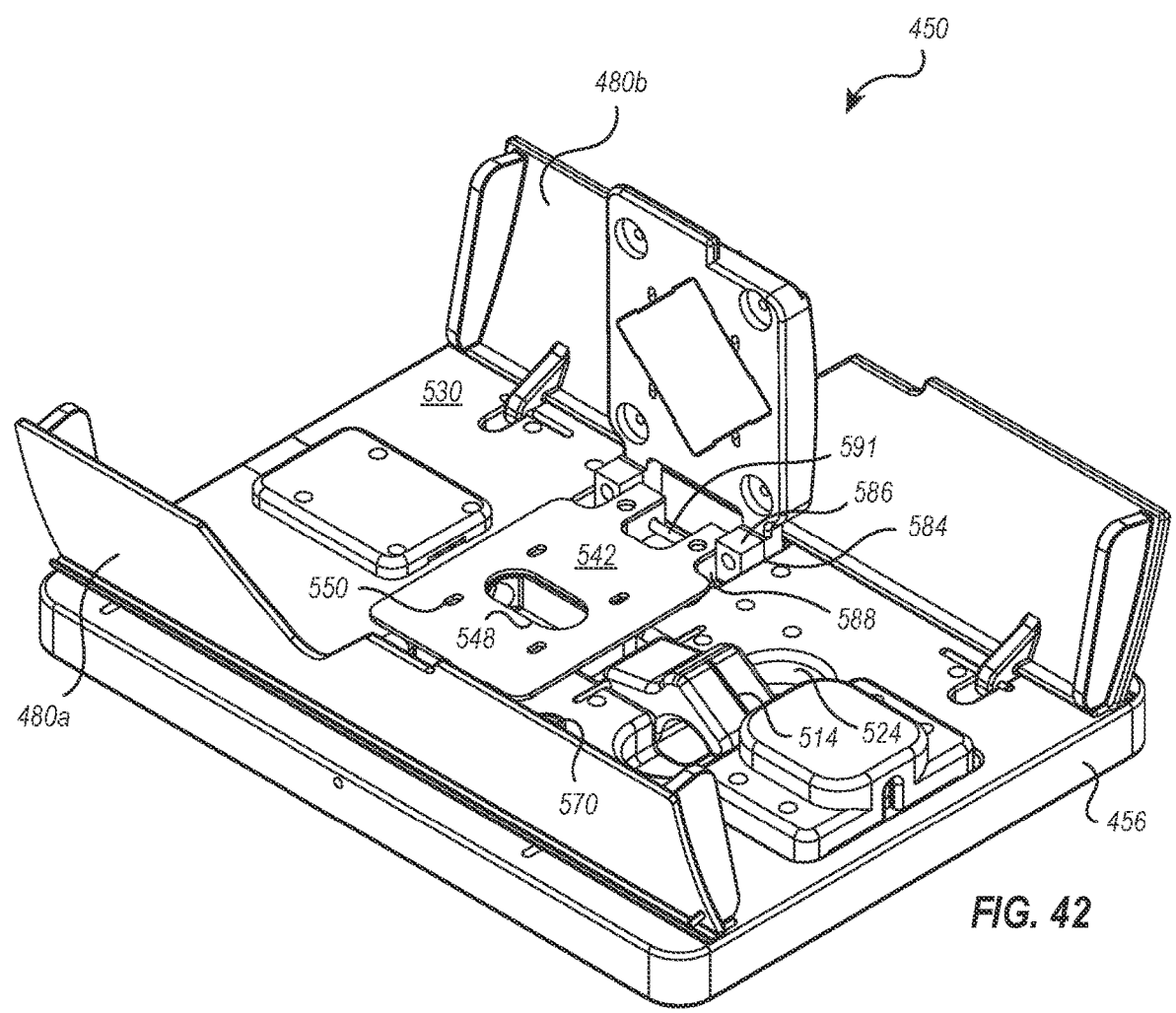
FIG. 42 illustrates a perspective view of another model assembly removed from a liquid storage container with a holder member in an open state, according to one embodiment of the invention.

The block structure 502 extends through the cover inlet 494 and is mounted within a holder 504, with securing members 506 at least partially wrapping around an upper surface 508 of the block structure. In contrast to the holder 104 that is formed on an inner surface of the upper cover 80, the holder 504 is pivotally mounted to the lower support 482 below the cover 480 and above the fixation member 540. This movement allows for repositioning of the block structure 502 and replacement of the block structure 502 following excessive training or testing uses. The holder 504 can rotate or pivot about a hinge position 584, as illustrated in FIGS. 40-42. A leg portion 586 is disposed in and passes through an opening 588 in the lower support 582 with a pivot pin 591 passing through the leg portion 586.

In the illustrated configuration, a fixation member 540 can also rotatably or pivotally mount to the pivot pin 591 and can move independently from the holder 504. This movement adjusts a portion of the fixation plate 542 from the mounting region 560 to reposition the through hole 548 and the securing holes 550 to provide access to the mounting region 560 and the port 590, and the chamber 592 below, as can be seen by comparing the position of the fixation member 540 in FIGS. 42 and 43. As with before, movement of the fixation plate 542 can be aided with a release lever 570 that releases engagement of the fixation plate 542 from one or more magnets or other locking mechanisms.

Figure 43:
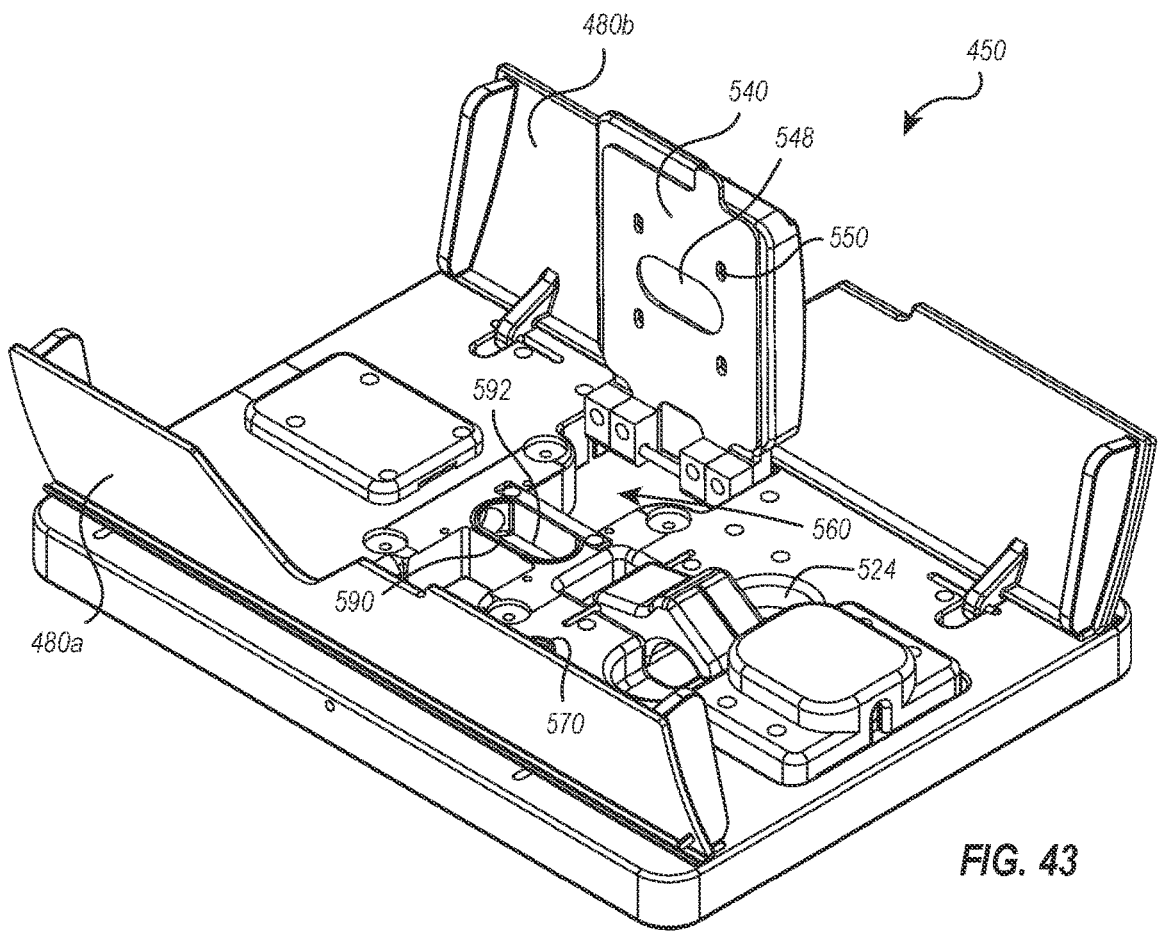
FIG. 43 illustrates a perspective view of another model assembly removed from a liquid storage container with a fixation member in an open state, according to one embodiment of the invention.
Figure 44:
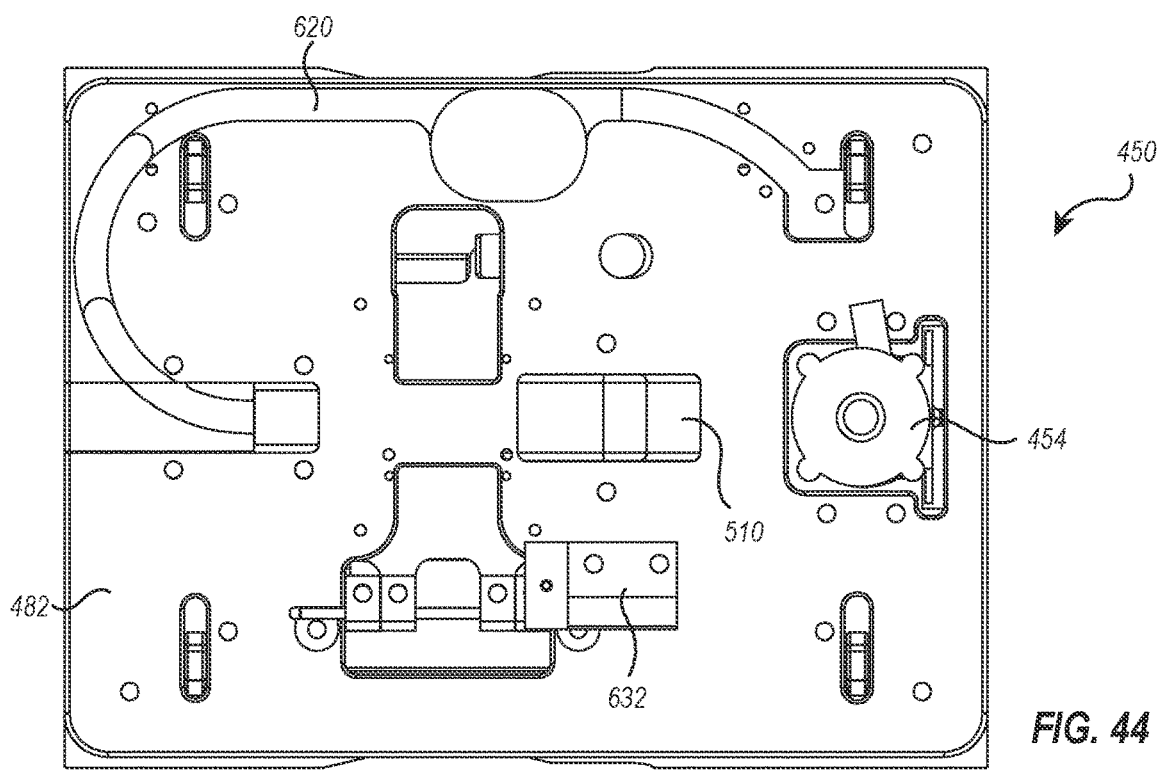
FIG. 44 illustrates a bottom view of another model assembly removed from a liquid storage container, according to one embodiment of the invention.
Figure 45:
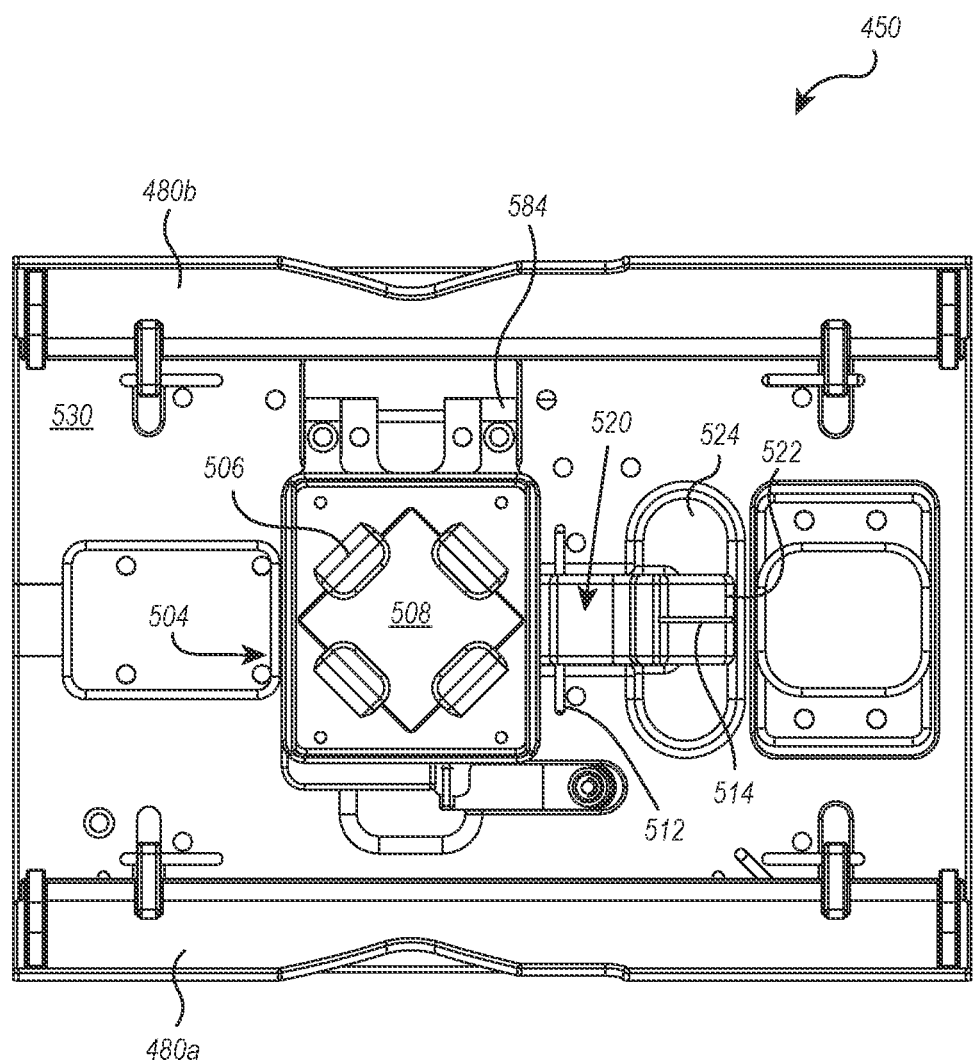
FIG. 45 illustrates a top view of another model assembly removed from a liquid storage container, according to one embodiment of the invention.

With continued reference to FIG. 43-45, disposed to a side of the fixation member 540 within a needle guide cavity 524 is a needle guide 510. The needle guide 510 can be rotated from within the needle guide cavity 524 to position the needle guide channel 514 in alignment with the through hole 548 of the fixation member 540 during training or testing. As before, the needle guide channel 514 aids a user to position a needle at the desired angular orientation relative to the anatomical simulant to simulate a needle stick as part of a medical procedure. The needle can be advanced through the anatomical simulant while the liquid pressurized by a pump 454 (FIG. 44) flows to the anatomical simulant via a conduit in the channel 620. This can all occur while a user visualizes the anatomical simulant from below via an imaging device illuminated, at least in part, by an illumination source mounted to the lower support 482 by the source mount 632.

A portion 516 of the needle guide 510 includes a hole 518 that receives a mounting structure 512, such as an elongate, generally round member or pin, supported by the lower support 482. An elongate body 520 extends from the portion 516 to a needle guide channel end 522 having the needle guide channel 514. The portion 516 and the mounting structure 512 are generally disposed below an upper surface 530, which results in the needle guide channel end 522 following a path from a position toward or in front of an end 496 of the inlet 494 to an intermediate position 498 of the inlet 494.

As before, the portion 516 can be selectively removed from the mounting structure 512, in one configuration, to allow changing of the needle guide 510 and so allow for variations in an angular inclination of the needle guide channel 514 relative to the anatomical simulant and the block structures 502. This allows for variations in the simulated tissue track through the block structures 502 and so variations on how the medical procedure, such as access site closure, can be performed. The needle guide channel 514 can be inclined at various angles, such as those described in relation to needle guide channel 114.

Note, the upper cover 480*a* and 480*b* and the lower support 482 of FIGS. 39-45 are merely examples of embodiments. Additional or different structures may be implemented to achieve the same or similar goals. For example, FIGS. 59-62 further illustrated another embodiment of a model assembly 450 according to the present invention, having alternate upper covers 480*a*, 480*b*, and lower support 482.

Figure 46:
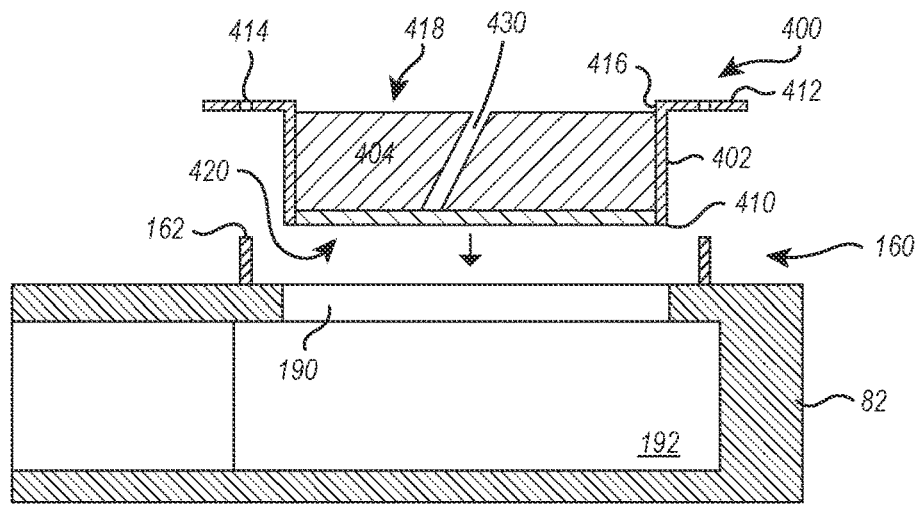
FIG. 46 illustrates a cross-section view of another model assembly, according to one embodiment of the invention.
Figure 47:
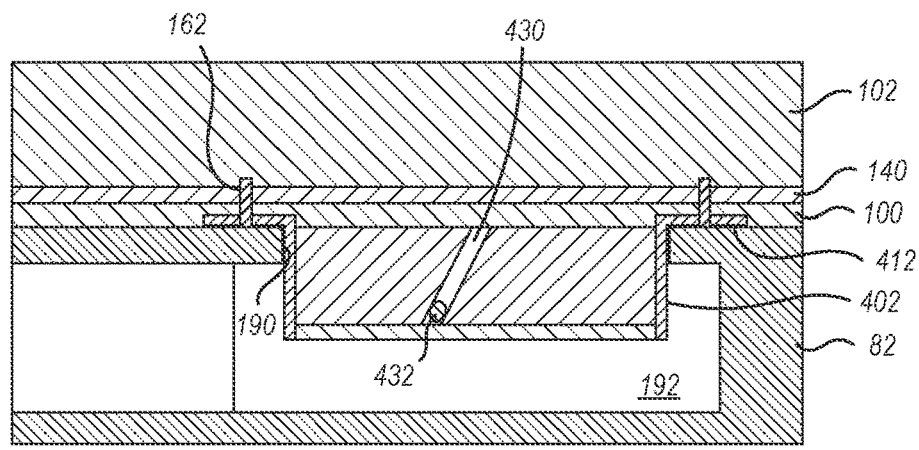
FIG. 47 illustrates a cross-section view of another model assembly, according to one embodiment of the invention.
Figure 48:
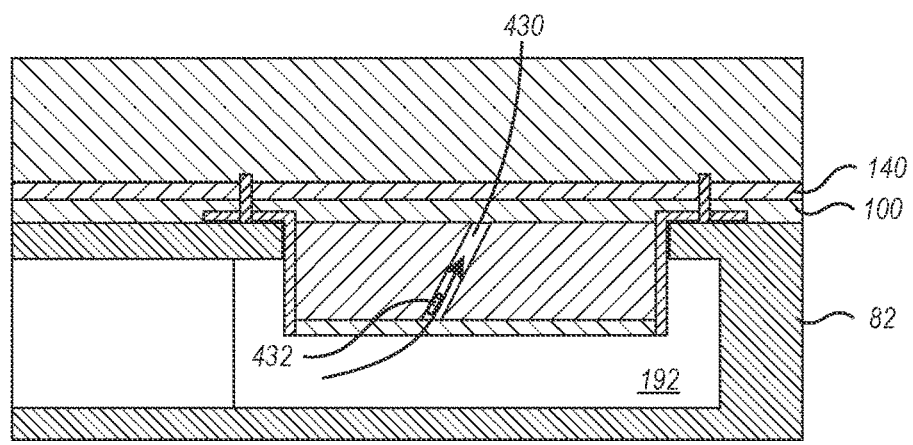
FIG. 48 illustrates a cross-section view of another model assembly, according to one embodiment of the invention.

Turning to FIGS. 46-48, illustrated is another configuration or manner by which an anatomical simulant is presented to a user. Instead of, or in addition to, the anatomical simulants having the form described earlier, it can be understood that a structure simulating tissue or tissues can be in a form of a replaceable simulant assembly that can be mounted in the mounting region of the system. This simulant assembly provides increased flexibility with selecting materials to represent or simulate the tissue or bodily structures. For instance, the replacement simulant assembly, whether alone or in combination with the previously described anatomical simulant 100, can form epithelial tissue, nervous tissue, muscle tissue, and connective tissue so that a user can efficiently and effectively train for different medical techniques using the system. This replacement simulant assembly can also be used to visualize certain procedures where, for instance, the access site is >12 F, such as large-bore vessel closure techniques. Additionally, the replacement simulant assembly can be used to visualize closure systems utilizing two components, one within a bore or lumen of a vessel, for instance, and one on an exterior of the bore or lumen.

As illustrated in FIGS. 46-48, the system 8 can include a replacement simulant assembly 400 that can be selectively disposed within the port 190. The replacement simulant assembly 400 includes a simulant receptacle or tray 402 and an anatomical simulant 404, which can be similar to the other anatomical simulants described herein. The tray 402 includes a body 410 having tabs or flanges 412 with receiving holes 414 that can receive the securing pins 162 near the mounting region 160. A cavity 416 of the body 410 can hold the anatomical simulant 404, with the cavity 416 optionally including detents, surface finishes, or other structures to aid with holding the anatomical simulant 404 within the cavity 416. First open end 418 and second open end 420 of the tray 402 can receive and allow passage of the medical devices used during training or testing, such as the needle 354, the guidewire 352, and the medical device 10.

In the illustrated configuration of FIG. 46, the anatomical simulant 404 includes multiple layers, regions, or portions to simulate different tissue layers. For instance, the anatomical simulant 404 includes a first portion 422 and a second portion 424. The first portion 422 can approximate the block structure 102, and the second portion 424 can approximate either the anatomical simulant 100 or the flexible member 200. While the two portions 422, 424 are illustrated, it will be understood that a greater or lesser number of portions is possible. For instance, the anatomical structure 404 can include only the first portion 422, only the second portion 424, any combination of the first portion 422 and the second portion 424 (including duplicate or multiples of any of the two portions 422, 424), and additional portions beyond the two portions 422, 424.

As shown in FIGS. 46-48, a channel 430 is pre-formed in at least the first portion 422, but optionally in any of the second portion 424. This channel 430 provides a tract for the medical devices 10 (FIGS. 1 and 2) to pass during training or testing. While the channel 430 is pre-formed in this configuration, it will be understood that the channel 430 can be formed as part of the procedure being trained.

In use, the tray 402 can be placed within the port 190 so that at least a portion of the tray 402 and the second open end 420 is positioned in the chamber 192. With the tray 402 held by the securing pins 162, the tray 402 is secured by engagement of the fixation member 140 to the securing pins 162 and magnets 164 (FIG. 14). Optionally, the anatomical simulant 100 and the flexible member 200 can be placed over the tabs 412, and the first open end 418 before the fixation member 140 secures the tray 402.

As the user performs the procedure, one or more of the needle 354, the guidewire 352, and the medical device 10 can pass through the channel 430, optionally perforating the second portion 424. For instance, when the two part closure device is used, the medical device can be advanced through the channel 430 to position an anchor or other component on the chamber side of the second portion 424 and a sealant or plug type closure component 432 on a first portion side of the second portion 424. This can approximate positioning a sealant or plug between a vessel wall and the tissue tract or tissue surrounding the access site through the vessel wall. Because of the pressure generated by the pump, liquid will pass around the component 432 (as illustrated by the arrow) when the component 432 is inaccurately positioned against the second portion 424, while the component 432 is curing, solidifying, or becoming a consistency to prevent liquid flow, or there is incomplete closure and oozing or passage of liquid around the components 432, such as illustrated in FIG. 48. By adding dye or radiative isotope to the liquid, such liquid passage can be visualized on the image viewing device. As such, the system 8 with the replacement simulant assembly 400, or the anatomical simulant 100, provides a system that not only can be used for training users or testing medical devices, but also a system for testing the efficacy of the access closure systems.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

Following are some further example embodiments of the invention. These are presented only by way of example and are not intended to limit the scope of the invention in any way. Further, any example embodiment can be combined with one or more of the example embodiments.

Embodiment 1. A system for presenting an anatomical simulant to a user, the system including a model assembly configured to present an anatomical simulant to a, the model assembly including a liquid storage container configured to selectively hold a liquid, a model support assembly configured to support the anatomical simulant, and a pump configured to move the liquid at least around the anatomical simulant and provide a back pressure to a rear surface of the anatomical simulant to simulate at least one of arterial flow or venous flow.

Embodiment 2. The system of embodiment 1, further including an image viewing system in communication with the model assembly.

Embodiment 3. The system of any of embodiments 1-2, further comprising a power assembly to provide power to the pump.

Embodiment 4. The system of any of embodiments 1-3 wherein the power assembly is removably stored within a carrying structure that selectively receives the model assembly.

Embodiment 5. The system of any of embodiments 1-4, further including a controller configured to control a pump.

Embodiment 6. The system of any of embodiments 1-5, wherein the pump, the power assembly, the controller, and the model support assembly are confined within the liquid storage container for transportation within a case.

Embodiment 7. The system of any of embodiments 1-6, wherein the pump, the power assembly, the controller, the model support assembly, the liquid storage container, and the case form a kit.

Embodiment 8. The system of any of embodiments 1-7, wherein the model support assembly comprises a mounting region to which the anatomical simulant selectively mounts.

Embodiment 9. The system of any of embodiments 1-8, wherein the mounting region comprises a plurality of securing pins configured to be selectively received within holes of the anatomical simulant.

Embodiment 10. The system of any of embodiments 1-9, wherein the model support assembly includes an upper cover with an inlet, a lower support with a mounting region within which the anatomical simulant selectively mounts, and a fixation member movable relative to at least the lower support, the fixation member fixing the anatomical simulant within the mounting region.

Embodiment 11. The system of any of embodiments 1-10, wherein the fixation member applies a compressive force to the anatomical simulant to retain the anatomical simulant in the mounting region.

Embodiment 12. The system of any of embodiments 1-11, further including a port disposed within the mounting region, the port accommodating a medical device advanced through the anatomical simulant during training.

Embodiment 13. The system of any of embodiments 1-12, further including an imaging device disposed within a space between the model support assembly and the liquid storage container.

Embodiment 14. The system of any of embodiments 1-13, wherein the imaging device is an endoscopic imaging device.

Embodiment 15. The system of any of embodiments 1-14, further including an illumination source disposed within a space between the model support assembly and the liquid storage container.

Embodiment 16. The system of any of embodiments 1-15, further including a wall disposed between a chamber illuminated by the illumination source, the wall having a thickness that is sufficient for the wall to be at least partially transmissive to light from the illumination source.

Embodiment 17. The system of any of embodiments 1-16, further including a flow control configured to selectively control flow of liquid from the pump between arterial flow and venous flow.

Embodiment 18. The system of any of embodiments 1-17, further including a controller configured to switch between a pulsating flow and a steady flow.

Embodiment 19. The system of any of embodiments 1-18, further including a pressure actuator configured to selectively change a pressure of the liquid flow towards the anatomical simulant.

Embodiment 20. The system of any of embodiments 1-19, wherein the pressure actuator includes a first conduit in fluid communication with a chamber below the anatomical simulant and a second conduit in fluid communication with a check valve that is in fluid communication with the pump, wherein a pressure exerted by a valve member of the check valve against a seating portion of the check valve can be varied to change a liquid pressure of the liquid.

Embodiment 21. The system of any of embodiments 1-20, further including an actuator arm to control a position of an actuator rod that applies pressure to the valve member.

Embodiment 22. The system of any of embodiments 1-21, wherein the anatomical simulant creates a back pressure in the liquid flowing from the pump which results in the liquid flowing from the pump preferentially flowing to and through the check valve.

Embodiment 23. The system of any of embodiments 1-22, further including a needle guide.

Embodiment 24. The system of any of embodiments 1-23, further including at least one block structure disposed adjacent to an upper cover of the model support assembly.

Embodiment 25. The system of any of embodiments 1-24, wherein the at least one block structure is disposed within a holder that can move independently from the upper cover.

Embodiment 26. The system of any of embodiments 1-25, wherein the at least one block structures is disposed within a holder and moves with the upper cover.

Embodiment 27. The system of any of embodiments 1-26, wherein the at least one block structure is secured within the holder by at least one securing member.

Embodiment 28. The system of any of embodiments 1-27, The system of claim 24, wherein the at least one block structure includes a protruding portion configured to extend through at least a portion of model support assembly.

Embodiment 29. The system of any of embodiments 1-28, wherein the at least one block structure includes a transparent gel.

Embodiment 30. The system of any of embodiments 1-29, wherein the model assembly structure is less than 10 lbs. in weight.

Embodiment 31. The system of any of embodiments 1-30, further including a power assembly including a battery and a battery adapter.

Embodiment 32. The system of any of embodiments 1-31, further including an image viewing system in wireless communication with the model assembly.

Embodiment 33. The system of any of the embodiments 1-32, further including a replacement simulant assembly.

Embodiment 34. The system of any of the embodiments 1-33, where a replacement simulant assembly includes a simulant receptacle and the anatomical simulant.

Embodiment 35. The system of any of the embodiments 1-34, wherein the anatomical simulant includes a preformed channel.

Embodiment 36. A method of accessing to an anatomical simulant, the method including positioning a model assembly to receive an anatomical simulant, mounting the anatomical simulant within a mounting region of a model support assembly of the model assembly while limiting rotational and lateral movement of the anatomical simulant, fixing the anatomical simulant within the mounting region and providing a target opening for a user to access the anatomical simulant, and advancing a medical device through the target opening and the anatomical simulant.

Embodiment 37. The method of any of embodiment 36, further including visualizing the medical device as it passes through the anatomical simulant.

Embodiment 38. The method of any of embodiment 36-37, wherein visualizing the medical device comprising viewing real-time video images of the medical device received from an imaging device mounted within the model assembly on an opposite side of the anatomical simulant from the target opening.

Embodiment 39. The method of any of embodiment 36-38, further including wirelessly connecting the model assembly to an image viewing assembly.

Embodiment 40. The method of any of embodiment 36-39, wherein the image viewing assembly has an iOS or Android operating system.

Embodiment 41. The method of any of embodiment 36-40, further including removing the training model assembly from a case, the model assembly including a liquid storage container configured to selectively hold a liquid, the training model support assembly configured to support the anatomical simulant and a pump configured to move the liquid at least around the anatomical simulant.

Embodiment 42. The method of any of embodiment 36-41, further comprising any one of the systems of Embodiments 1-35.

Embodiment 43. The method of any of embodiment 36-42, wherein the model assembly further includes a power assembly to provide power to the pump.

Embodiment 44. The method of any of embodiment 36-43, wherein the model assembly further includes a controller configured to control the pump.

Embodiment 45. The method of any of embodiment 36-44, wherein the pump, the power assembly, the model support assembly, and the controller are confined within the liquid storage container for transportation within the case.

Embodiment 46. The method of any of embodiment 36-45, further including mounting a flexible member in the mounting region before mounting the anatomical simulant in the mounting region.

Embodiment 47. The method of any of embodiment 36-46, further including positioning a liquid guard relative to the mounting region.

Embodiment 48. The method of any of embodiment 36-47, wherein advancing the medical device comprises advancing a distal end of the medical device into at least a portion of a first conduit carrying pressurized liquid pressurized by a pump.

Embodiment 49. The method of any of embodiment 36-48, wherein fixing the anatomical simulant within the mounting region includes applying a downward pressure to the anatomical simulant.

Embodiment 50. The method of any of embodiment 36-49, further including pumping liquid toward the anatomical simulant.

Embodiment 51. The method of any of embodiment 36-50, wherein further including creating a back pressure in the liquid flowing from the pump to the anatomical simulant to cause the liquid flowing from the pump to preferentially flow to and through a check valve.

Embodiment 52. The method of any of embodiment 36-51, further including visualizing the medical device as it passes through the anatomical simulant with at least one imaging device.

Embodiment 53. The method of any of embodiment 36-52, wherein the at least one imaging device is disposed above the anatomical simulant.

Embodiment 54. The method of any of embodiment 36-53, wherein the at least one imaging device is disposed below the anatomical simulant.

Embodiment 55. The method of any of embodiment 36-54, wherein the at least one imaging device includes a first imaging device and a second imaging device, the first imaging device being disposed above the anatomical simulant and the second imaging device being disposed below the anatomical simulant.

Embodiment 56. The method of any of embodiment 36-55, further including visualizing a junction of a block structure and the anatomical simulant.

Embodiment 57. The method of any of embodiment 36-56, wherein the anatomical simulant forms part of a replacement simulant assembly.

Embodiment 58. The method of any of embodiment 36-57, further including visualizing the medical device as it passes through the anatomical simulant and a component of a closure system associated with the medical device is deployed between adjacent layers of the anatomical simulant.

Embodiment 59. The method of any of embodiment 36-58, wherein the anatomical simulant includes a pre-formed channel and visualizing the medical device comprises visualizing the medical device passing along the pre-formed channel to a junction between a first portion of the anatomical simulant and a second portion of the anatomical simulant.

Additional information and details regarding the training system of the present invention are described in the attached Appendices, which are incorporated herein by this reference. It will be understood that any of the information and details in the Appendices can be combined and/or substituted for any element, structure, features, function, etc. as described in other embodiment and configuration disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for presenting an anatomical simulant to a user, the system comprising:
   a model assembly configured to present an anatomical simulant to a user, the model assembly comprising:
      a liquid storage container configured to selectively hold a liquid;
      a model support assembly configured to support the anatomical simulant; and
      a pump configured to move the liquid into a chamber in the model support assembly that is closed by the anatomical simulant to provide a back pressure to a rear surface of the anatomical simulant adjacent to the chamber to simulate at least one of arterial flow or venous flow.

2. The system of claim 1, further comprising an image viewing system in communication with the model assembly.

3. The system of claim 2, further comprising a power assembly to provide power to the pump.

4. The system of claim 3, further comprising a controller configured to control the pump.

5. The system of claim 4, wherein the pump, a portion of the power assembly, the controller, and the model support assembly are confined within the liquid storage container for transportation within a case.

6. The system of claim 5, wherein the pump, the power assembly, the controller, the model support assembly, the liquid storage container, and the case form a kit.

7. The system of claim 1, wherein the model support assembly comprises a mounting region to which the anatomical simulant selectively mounts.

8. The system of claim 1, wherein the model support assembly comprises:
   an upper cover with an inlet;
   a lower support with a mounting region within which the anatomical simulant selectively mounts; and
   a fixation member movable relative to at least the lower support, the fixation member fixing the anatomical simulant within the mounting region.

9. The system of claim 8, wherein the fixation member applies a compressive force to the anatomical simulant to retain the anatomical simulant in the mounting region.

10. The system of claim 8, further comprising a port disposed within the mounting region, the port accommodating a medical device advanced through the anatomical simulant during training.

11. The system of claim 1, further comprising an imaging device disposed within a space between the model support assembly and the liquid storage container.

12. The system of claim 1, further comprising an illumination source disposed within a space between the model support assembly and the liquid storage container.

13. The system of claim 1, further comprising a flow control configured to selectively control flow of liquid from the pump between arterial flow and venous flow.

14. The system of claim 1, further comprising a pressure actuator configured to selectively change a pressure of the liquid flow towards the anatomical simulant.

15. The system of claim 1, further comprising a needle guide.

16. A system for presenting an anatomical simulant to a user, the system comprising:
   a model assembly configured to present an anatomical simulant to a user, the model assembly comprising:
      a liquid storage container configured to selectively hold a liquid;
      a model support assembly configured to support the anatomical simulant; and
      a pump configured to move the liquid at least around the anatomical simulant and provide a back pressure to a rear surface of the anatomical simulant to simulate at least one of arterial flow or venous flow,
   wherein the model support assembly comprises:
      an upper cover with an inlet;
      a lower support with a mounting region within which the anatomical simulant selectively mounts; and
      a fixation member movable relative to at least the lower support, the fixation member fixing the anatomical simulant within the mounting region, the upper cover being movable between an open position and a closed position and overlapping the lower support and the fixation member in the closed position.

17. The system of claim 16, wherein the fixation member applies a compressive force to the anatomical simulant to retain the anatomical simulant in the mounting region.

18. The system of claim 16, further comprising a port disposed within the mounting region, the port accommodating a medical device advanced through the anatomical simulant during training.

19. A system for presenting an anatomical simulant to a user, the system comprising:
   a model assembly configured to present an anatomical simulant to a user, the model assembly comprising:
      a liquid storage container configured to selectively hold a liquid;
      a model support assembly configured to support the anatomical simulant; and
      a pump configured to move the liquid at least around the anatomical simulant and provide a back pressure to a rear surface of the anatomical simulant to simulate at least one of arterial flow or venous flow,
   wherein the model support assembly comprises:
      an upper cover with an inlet;
      a lower support with a mounting region within which the anatomical simulant selectively mounts; and
      a fixation member movable relative to at least the lower support, the fixation member fixing the anatomical simulant within the mounting region, wherein the mounting region comprises a port, the upper cover being movable between an open position and a closed position and the port being aligned with the inlet in the upper cover with the upper cover moved to overlap the lower support and the fixation member in the closed position.

20. The system of claim 19, wherein the fixation member applies a compressive force to the anatomical simulant to retain the anatomical simulant in the mounting region.

* * * * *